(12) United States Patent
Yanagi et al.

(10) Patent No.: US 7,756,937 B2
(45) Date of Patent: Jul. 13, 2010

(54) NETWORK DEVICE

(75) Inventors: Satoru Yanagi, Nagoya (JP); Yasuhiro Kudo, Ichinomiya (JP); Masaaki Hibino, Yokkaichi (JP); Shohei Tsujimoto, Nagoya (JP); Takeshi Izaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 268 days.

(21) Appl. No.: 11/838,372

(22) Filed: Aug. 14, 2007

(65) Prior Publication Data
US 2008/0046521 A1 Feb. 21, 2008

(30) Foreign Application Priority Data
Aug. 18, 2006 (JP) ............................. 2006-223450
Aug. 21, 2006 (JP) ............................. 2006-224491

(51) Int. Cl.
G06F 15/16 (2006.01)
G06F 15/177 (2006.01)
G06F 15/173 (2006.01)
G01M 19/00 (2006.01)

(52) U.S. Cl. ...................... 709/206; 709/207; 709/220; 709/223; 702/122

(58) Field of Classification Search .................. 709/207
See application file for complete search history.

(56) References Cited

U.S. PATENT DOCUMENTS

| | | | |
|---|---|---|---|
| 5,396,537 A * | 3/1995 | Schwendeman | 340/7.23 |
| 5,905,495 A | 5/1999 | Tanaka et al. | |
| 6,035,324 A * | 3/2000 | Chang et al. | 709/203 |
| 6,230,189 B1 * | 5/2001 | Sato et al. | 709/206 |
| 6,275,570 B1 * | 8/2001 | Homan et al. | 379/88.17 |
| 6,434,405 B1 | 8/2002 | Sashihara | |
| 6,662,312 B1 * | 12/2003 | Keller et al. | 714/38 |

(Continued)

FOREIGN PATENT DOCUMENTS
EP 0812100 A2 10/1997

(Continued)

OTHER PUBLICATIONS

J. Myers, SMTP Service Extension for Authentication, RFC 2544, Mar. 1999.*

(Continued)

Primary Examiner—Saleh Najjar
Assistant Examiner—Robert Shaw
(74) Attorney, Agent, or Firm—Baker Botts L.L.P.

(57) ABSTRACT

A network device is to be connected with a communication network. The network device is capable of executing a communication function by utilizing the communication network. The network device is provided with an input device, a storage, a communication device, and a communication test device. The input device inputs communication setting data for executing the communication function. The storage is capable of storing at least two patterns of the communication setting data. The communication device executes the communication function by utilizing one pattern of the communication setting data stored in the storage. The communication test device tests whether it is possible to execute the communication function by utilizing the other pattern of the communication setting data stored in the storage while maintaining a state where it is possible for the communication device to execute the communication function by utilizing the one pattern of the communication setting data.

20 Claims, 42 Drawing Sheets

U.S. PATENT DOCUMENTS

| | | | |
|---|---|---|---|
| 6,775,239 B1* | 8/2004 | Akita et al. | 370/248 |
| 6,775,559 B1* | 8/2004 | Weghorst et al. | 709/224 |
| 6,825,947 B1 | 11/2004 | Asai | |
| 7,346,659 B2 | 3/2008 | Matsuura et al. | |
| 7,509,678 B2* | 3/2009 | Pearson et al. | 726/23 |
| 2003/0040280 A1* | 2/2003 | Koskelainen | 455/67.1 |
| 2003/0074412 A1 | 4/2003 | Muto | |
| 2003/0172166 A1* | 9/2003 | Judge et al. | 709/229 |
| 2004/0123168 A1* | 6/2004 | Joo et al. | 713/300 |
| 2004/0133775 A1 | 7/2004 | Callas et al. | |
| 2004/0170171 A1* | 9/2004 | Kanekar et al. | 370/392 |
| 2004/0181580 A1 | 9/2004 | Baranshamaje | |
| 2004/0268148 A1* | 12/2004 | Karjala et al. | 713/201 |
| 2005/0108530 A1* | 5/2005 | Tonegawa | 713/170 |
| 2005/0125528 A1 | 6/2005 | Burke, II et al. | |
| 2005/0193111 A1 | 9/2005 | Roy | |
| 2006/0009243 A1 | 1/2006 | Danhan et al. | |
| 2006/0010426 A1* | 1/2006 | Lewis et al. | 717/124 |
| 2006/0036690 A1 | 2/2006 | O'Neil | |
| 2006/0041505 A1* | 2/2006 | Enyart | 705/40 |
| 2006/0212703 A1 | 9/2006 | Kojima | |
| 2006/0253597 A1* | 11/2006 | Mujica | 709/229 |
| 2006/0277265 A1* | 12/2006 | Backholm et al. | 709/206 |
| 2006/0294365 A1* | 12/2006 | Bae | 713/155 |
| 2007/0260691 A1* | 11/2007 | Kallqvist et al. | 709/206 |
| 2008/0046523 A1 | 2/2008 | Yanagi et al. | |

FOREIGN PATENT DOCUMENTS

| | | | |
|---|---|---|---|
| JP | H01-113678 A | | 5/1989 |
| JP | H11-13678 A | | 5/1989 |
| JP | H01-145737 A1 | | 6/1989 |
| JP | H11-45737 A | | 6/1989 |
| JP | H03-263151 A | | 11/1991 |
| JP | H04-281536 A | | 10/1992 |
| JP | 2581714 B2 | * | 2/1997 |
| JP | 11245829 A | | 9/1999 |
| JP | 2000330890 A | * | 11/2000 |
| JP | 2001-044995 A | | 2/2001 |
| JP | 2001186128 A | | 7/2001 |
| JP | 2004171338 A | | 6/2004 |
| JP | 2004213534 A | | 7/2004 |
| JP | 2004282650 A | | 10/2004 |
| WO | 2005015925 A2 | | 2/2005 |
| WO | 2005057899 A1 | | 6/2005 |
| WO | 2006058967 A1 | | 6/2006 |

OTHER PUBLICATIONS

European Patent Office; European Search Report in Application No. 07 253 260.9 (counterpart to U.S. Appl. No. 11/840,865, which is a co-pending application related to the above-captioned application) mailed Apr. 22, 2009.

European Patent Office, European Search Report for Related EP Application No. 07253259 dated Nov. 13, 2007.

"SMTP Service Extension for Authentication" RFC 2554, Internet Engineering Task Force, Mar. 1999.

"Simple Mail Transfer Protocol", RFC 2821, Internet Engineering Task Force, Apr. 2001.

U.S. Patent and Trademark Office, Office Action in co-pending U.S. Appl. No. 11/840,865, Notification Date Dec. 28, 2009.

Notification of Reasons for Refusal for Japanese Patent Application No. 2006-223450, date Jul. 3, 2008.

Notification of Reasons for Refusal for Japanese Patent Application No. 2006-224491, date Jul. 30, 2008.

Notification of Reasons for Refusal for Japanese Patent Application No. 2006-223450, dated Jul. 15, 2008.

Notification of Reasons for Refusal for Japanese Patent Application No. 2006-224491, dated Aug. 5, 2008.

European Patent Office, European Search Report for EP Appl'n. No. 07253260 mailed Oct. 24, 2007.

Notice of Reasons for Rejection for Japanese Patent Application No. 2006-223451, dated Sep. 9, 2008.

* cited by examiner

FIG. 13

| Embodiment | Device for Storing Test Setting Data | Number of Patterns That the Divice can Store | Others |
|---|---|---|---|
| 1 | Terminal Device | 1 | |
| 2 | Terminal Device | 2 or More | Retest Each of Setting Data |
| 3 | Terminal Device | 2 or More | Retest Selected Pattern |
| 4 | Multi-Function Device | 1 | Input Retest Instruction Output by Terminal Device |
| 5 | Multi-Function Device | 1 | Retest Instruction is Input by User Operation |
| 6 | Multi-Function Device | 2 or More | ·Input Retest Instruction Output by Terminal Device<br>·Retest Each of Setting Data |
| 7 | Multi-Function Device | 2 or More | ·Input Retest Instruction Output by Terminal Device<br>·Retest Selected Pattern |
| 8 | Multi-Function Device | 2 or More | ·Retest Instruction is Input by User Operation<br>·Retest Each of Setting Data |
| 9 | Multi-Function Device | 2 or More | ·Retest Instruction is Input by User Operation<br>·Retest Selected Pattern |

(Header)
From: device@xxx.xxx
To: user_C@mail.check.com
Subject: Test E-mail Sending Configuration
...

(Body)
<Result>
It is not Possible to Find SMTP Server. Please Check SMTP Server Name.

(Header)
From: device@xxx.xxx
To: user_C@mail.check.com
Subject: Test E-mail Receiving Configuration
...

(Body)
<Result>
Failed User Authentication. Please Check POP3 User Name and POP3 Password.

NETWORK DEVICE

CROSS-REFERENCE TO RELATED APPLICATION

This application claims priority to Japanese Patent Application No. 2006-223450, filed on Aug. 18, 2006, the contents of which are hereby incorporated by reference into the present application. This application also claims priority to Japanese Patent Application No. 2006-224491, filed on Aug. 21, 2006, the contents of which are hereby incorporated by reference into the present application.

BACKGROUND OF THE INVENTION

1. Field of the Invention

The present invention relates to a network device to be utilized while connected with a communication network.

2. Description of the Related Art

Communication (sending and/or receiving) of electronic mail between a plurality of network devices connected with the internet or the like is widely performed. In order to perform communication of electronic mail utilizing a network device, various types of communication setting data should be stored in the network device. For example, data specifying an electronic mail communication server, data specifying a user, a password, data specifying a user authentication method, etc. should be stored in the network device. The network device performs communication of electronic mail utilizing the stored communication setting data. Japanese Patent Application No. 2000-330890 discloses an example of a network device.

BRIEF SUMMARY OF THE INVENTION

In the case where a user wants to change the communication setting data stored in the network device, the user inputs new communication setting data to the network device. The network device stores the new communication setting data, and executes a communication function utilizing this new communication setting data (in the above example, this communication function is an electronic mail communication function).

As described above, the communication setting data includes a plurality of types of data. As a result, input mistakes due to human error may occur. At the step where the communication setting data is input, the network device cannot determine whether the communication setting data is data that will function correctly. Even if communication setting data that will not function correctly has been input, the network device cannot recognize this until it attempts to actually execute the communication function using this communication setting data. In the case where the network device attempts to execute the communication function using this new communication setting data, the network device is no longer able to execute the communication function using the old communication setting data that did function correctly. As a result, when communication setting data that does not function correctly has been input, the network device is no longer able to execute the communication function.

The present specification discloses a technique capable of suppressing the occurrence of this phenomenon where the network device is no longer able to execute the communication function.

The contents of the technique disclosed in the present specification will be described with reference to FIG. 1. FIG. 1 shows a simplification of a network device set forth in the present specification. Further, FIG. 1 is merely an example of a network device. The technical scope of the present invention is not restricted by the contents of FIG. 1 or the following description concerning FIG. 1. The technical scope of the present invention is determined objectively by the contents in the claims.

A network device 10 is connected with a communication network and executes a communication function by utilizing the communication network. The network device 10 is provided with an input device 12, a storage 14, a communication device 16, and a communication test device 18. The input device 12 inputs communication setting data for executing the communication function. The communication setting data may be input by a user operating an operation panel (not shown) provided on the network device 10. The communication setting data may be input in advance by the manufacturer of the network device 10. Further, the communication setting data may be input to the input device 12 from an external device.

The storage 14 is capable of storing at least two patterns of the communication setting data. In the example shown in FIG. 1, a first pattern of the communication setting data and a second pattern of the communication setting data are being stored.

The communication device 16 executes the communication function by utilizing one pattern of the communication setting data (for example, the first pattern of the communication setting data) stored in the storage 14.

The communication test device 18 tests whether it is possible to execute the communication function by utilizing the other pattern of the communication setting data (for example, the second pattern of the communication setting data) stored in the storage 14 while maintaining a state where it is possible for the communication device 16 to execute the communication function by utilizing the one pattern of the communication setting data.

The communication device 16 is capable of executing the communication function by utilizing the first pattern of the communication setting data stored in the storage 14. For example, the communication device 16 is capable of sending and/or receiving electronic mail. The communication test device 18 is capable of testing whether the second pattern of the communication setting data is data that will function correctly. The user is capable of testing the second pattern of the communication setting data before commanding that the communication device 16 utilizes this second pattern of the communication setting data. For example, in the case where the test result confirms that the second pattern of the communication setting data is data that will not function correctly, the user can prevent the communication device 16 from utilizing this second pattern of the communication setting data. With the present technique, it is possible to suppress the occurrence of the phenomenon where communication setting data that will not function correctly is utilized by the communication device 16. As a result, it is possible to suppress the occurrence of the phenomenon where the network device is no longer able to execute the communication function.

In a conventional network device, in the case where new communication setting data that has been input is data that will not function correctly, the user should perform an operation commanding the network device to execute the communication function utilizing communication setting data that does function correctly. For example, the user performs an operation to correct the new communication setting data, or performs an operation to re-input the old communication setting data that did function correctly. Even in the case where the network device retains the old communication setting data that did function correctly, the user needs to perform an operation to command the network device to utilize this old communication setting data. It may take some time until these operations are performed. The conventional network device may be maintained for a long period in a state where the communication device is unable to execute the communication function.

By contrast, the network device 10 is capable of maintaining a state where it is possible for the communication device 16 to execute the communication function by utilizing the first pattern of the communication setting data even while the second pattern of the communication setting data is being tested. Here, the term "maintaining a state where it is possible for the communication device 16 to execute the communication function" may include the following:

(1) In one embodiment, the communication device 16 and the communication test device 18 are realized by one controller. In this case, the controller is programmed such that the communication device 16 executes an interrupt process and executes the communication function utilizing the first pattern of the communication setting data while the communication test device 18 is testing the second pattern of the communication setting data.

(2) The communication device 16 may not execute the communication function while the communication test device 18 is testing the second pattern of the communication setting data. The communication device 16 may be programmed to continue utilizing the first pattern of the communication setting data continuously in the case where the test result confirms that the second pattern of the communication setting data is data that does not function correctly. That is, the communication device 16 may continue utilizing the first pattern of the communication setting data automatically after the test result has been obtained without the user performing an operation commanding that the first pattern of the communication setting data is to be utilized. Moreover, the communication device 16 may continue utilizing the first pattern of the communication setting data continuously in the case where the test result confirms that the second pattern of the communication setting data is data that does function correctly, or the communication device 16 may stop utilizing the first pattern of the communication setting data and utilize the second pattern of the communication setting data.

(3) The communication device 16 and the communication test device 18 may be configured by separate controllers. The communication device 16 and the communication test device 18 are able to execute processes simultaneously in parallel. According to this configuration, a state can be maintained where the communication device 16 can execute the communication function even in the case where the communication test device 18 is executing a test. It is consequently possible to suppress the phenomenon where the communication device 16 is unable to execute the communication function over a long period.

BRIEF DESCRIPTION OF THE DRAWINGS

FIG. 13 shows a figure for summarizing the embodiments.

FIG. 34 shows an example of reply mail.

FIG. 35 shows an example of reply mail.

DETAILED DESCRIPTION OF THE PREFERRED EMBODIMENTS

First Embodiment

Figure 1:
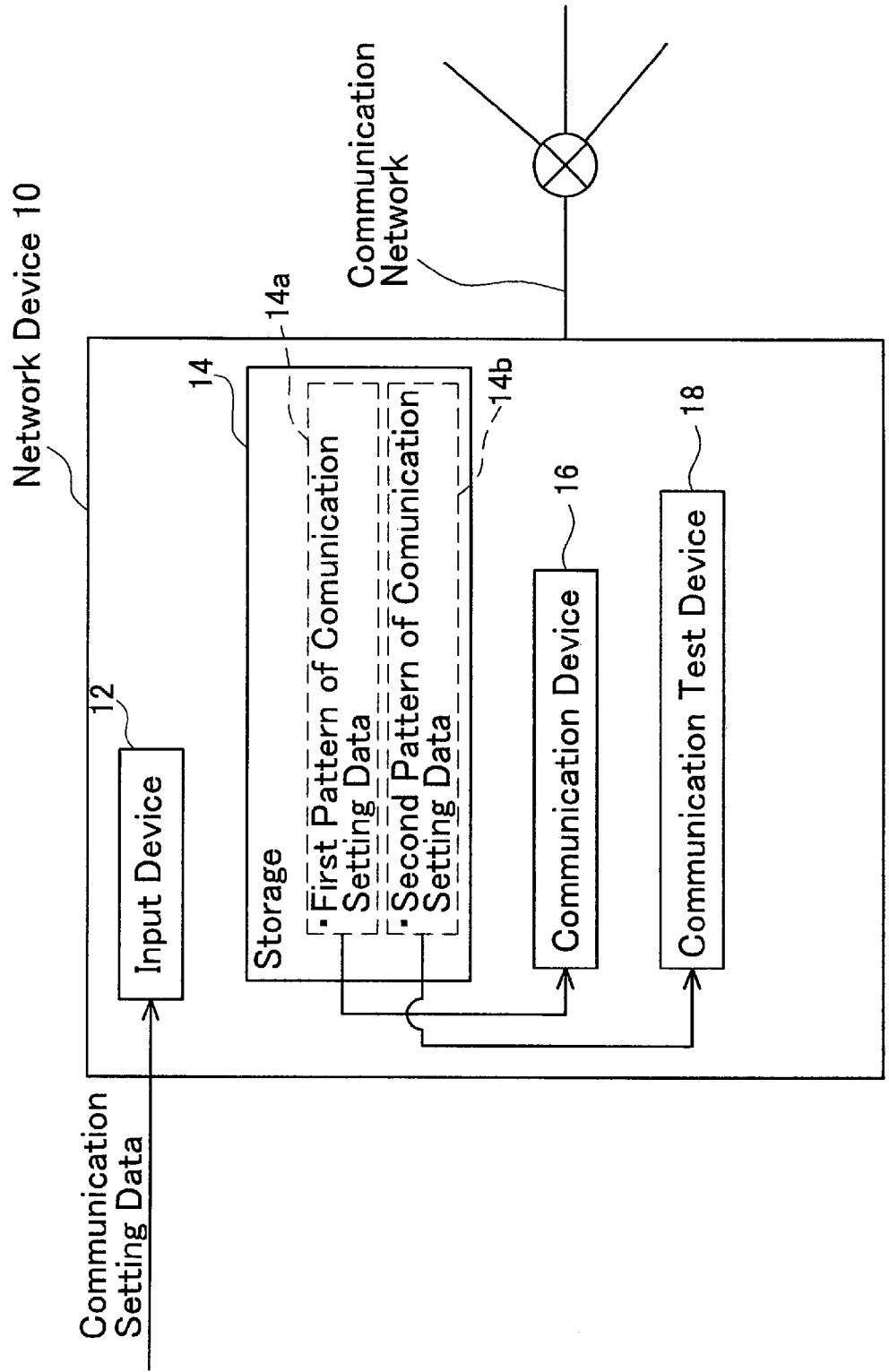
FIG. 1 shows the configuration of a network device disclosed in the present specification.
Figure 2:
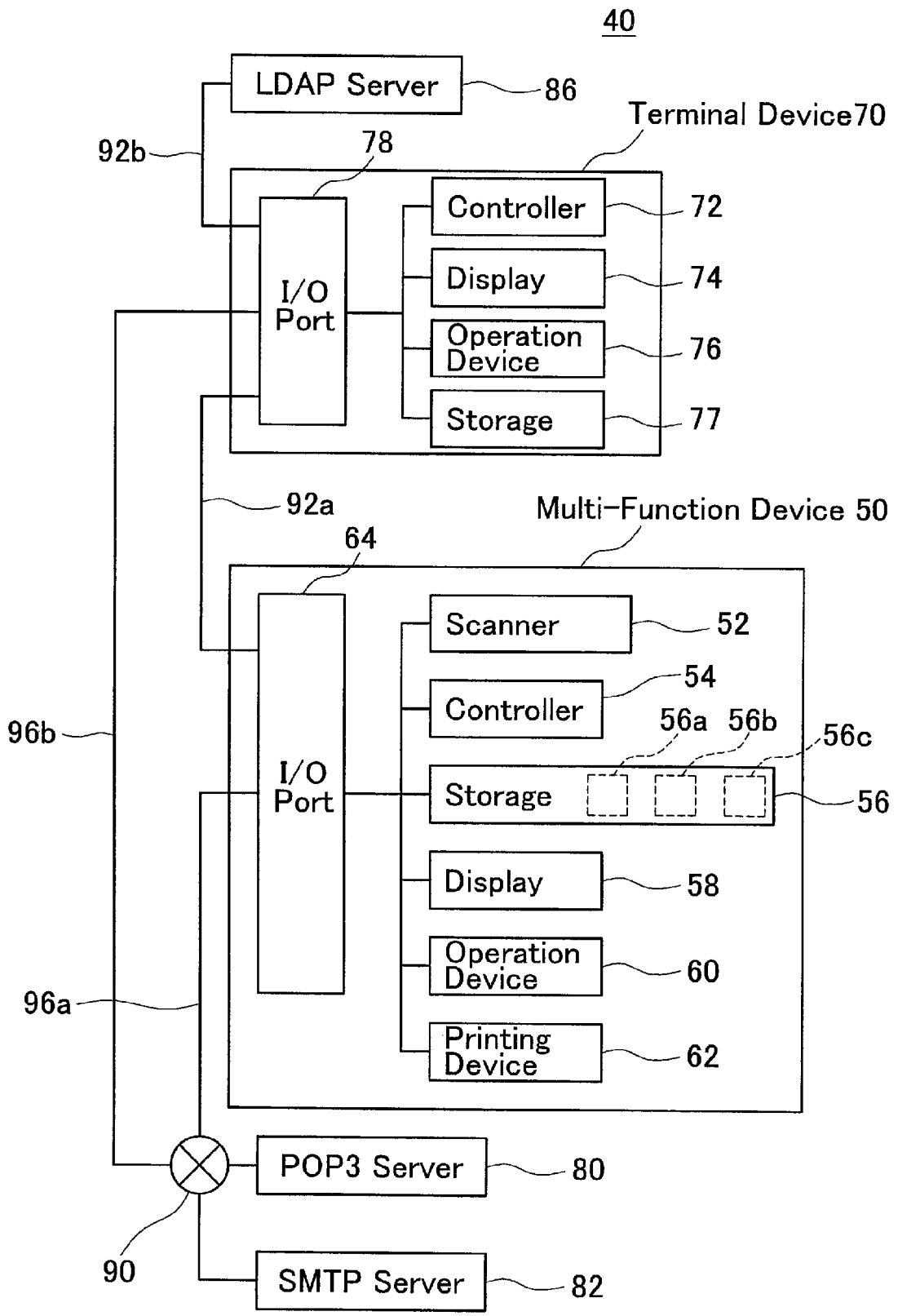
FIG. 2 shows a network system of the present embodiment.

A first embodiment will be described with reference to figures. FIG. 2 shows a simplification of a configuration of a network system 40. The network system 40 comprises a multi-function device 50, a terminal device 70, a POP3 server 80, an SMTP server 82, an LDAP server 86, etc.

(Configuration of the Multi-Function Device)

The multi-function device 50 comprises a scanner 52, a controller 54, a storage 56, a display 58, an operation device 60, a printing device 62, an I/O port 64, etc. The scanner 52 has a CCD (Charge Coupled Device) or CIS (Contact Image Sensor). The scanner 52 scans a document and creates image data. The controller 54 includes a CPU or the like. The controller 54 exerts general control of the processes executed by the multi-function device 50. The storage 56 includes a ROM, RAM, EEPROM, etc. The storage 56 stores programs to be executed by the controller 54, and temporarily stores data to be utilized during the process of executing these programs. The storage 56 of the present embodiment has a main setting data storage area 56a, a sub setting data storage area 56b, and a temporary storage area 56c, etc. The main setting data storage area 56a stores communication setting data actually utilized in e-mail communication. The sub setting data storage area 56b stores communication setting data utilized in testing. The specific contents of the communication setting data will be described in detail later. Further, the communication setting data actually utilized in e-mail communication will be termed "main communication setting data" below, and the communication setting data utilized in testing will be termed "sub communication setting data". The temporary storage area 56c can store various types of data temporarily. For example, the temporary storage area 56c can store the image data scanned by the scanner 52. The display 58 has a liquid crystal display, etc. The display 58 is capable of displaying various types of data. The operation device 60 has a plurality of keys. The user can input various items of information to the multi-function device 50 by operating the operation device 60. The printing device 62 prints the image data created by the scanner 52 onto a print medium. Although this will be described in detail later, the multi-function device 50 is capable of performing communication utilizing e-mail. The printing device 62 can print onto a print medium the contents of an e-mail that has been received.

An internet communication line 96a is connected with the I/O port 64. The multi-function device 50 is connected with the internet 90 via the internet communication line 96a. Further, a LAN communication line 92a is connected with the I/O port 64. The LAN communication line 92a is connected with the terminal device 70. The multi-function device 50 and the terminal device 70 are connected in a communicable manner via the LAN communication line 92a. In FIG. 2, only one terminal device 70 is shown. However, a plurality of terminal devices 70 is actually present. The multi-function device 50 is connected in a communicable manner with the plurality of terminal devices 70 via the LAN communication line 92a. Moreover, the terminal devices 70 are connected with the internet 90. As a result, the multi-function device 50 and the terminal devices 70 are connected in a communicable manner via the internet 90. The I/O port 64 can input and output various data via the internet or via the LAN. The I/O port 64 is capable of, for example, sending or receiving e-mail. Further, the I/O port 64 is capable of inputting instructions or data (for example, communication setting data) output from the terminal device 70 via the LAN.

(Configuration of the Terminal Device)

The terminal device 70 has a controller 72, a display 74, an operation device 76, a storage 77, an I/O port 78, etc. The controller 72 exerts general control over the processes executed by the terminal device 70. The display 74 is capable of displaying various types of information. The user can input various items of information to the terminal device 70 by operating the operation device 76. The storage 77 is capable of storing various types of data. For example, the storage 77 is capable of continuously storing the sub communication setting data even after the multi-function device 50 has executed a sending test or a receiving test (to be described). The LAN communication line 92a, a LAN communication line 92b, and an internet communication line 96b are connected with the I/O port 78. The LAN communication line 92a is connected with the multi-function device 50. The LAN communication line 92b is connected with the LDAP server 86. The terminal device 70 is connected with the internet 90 via the internet communication line 96b. The I/O port 78 can input and output various data via the internet or via the LAN. The I/O port 78 is capable of, for example, sending or receiving e-mail. Further, the I/O port 78 is capable of inputting instructions or data (for example, communication setting data) to the multi-function device 50 via the LAN.

(Configuration of the Servers)

The POP3 server 80 is connected with the internet 90. The POP3 server 80 is a server for receiving e-mail. E-mail sent to the multi-function device 50 or the terminal device 70 is retained temporarily in the POP3 server 80. The multi-function device 50 or the terminal device 70 can receive the e-mail being retained in the POP3 server 80 by accessing this POP3 server 80. The SMTP server 82 is connected with the internet 90. The SMTP server 82 is a server for sending e-mail. The multi-function device 50 or the terminal device 70 can send e-mail utilizing the SMTP server 82. The LDAP server 86 is connected with the LAN communication line 92b. The LDAP server 86 is capable of storing various types of data. The data that is being stored in the LDAP server 86 is utilized by the terminal device 70.

(Types of Data Output from the Devices)

Figure 3:
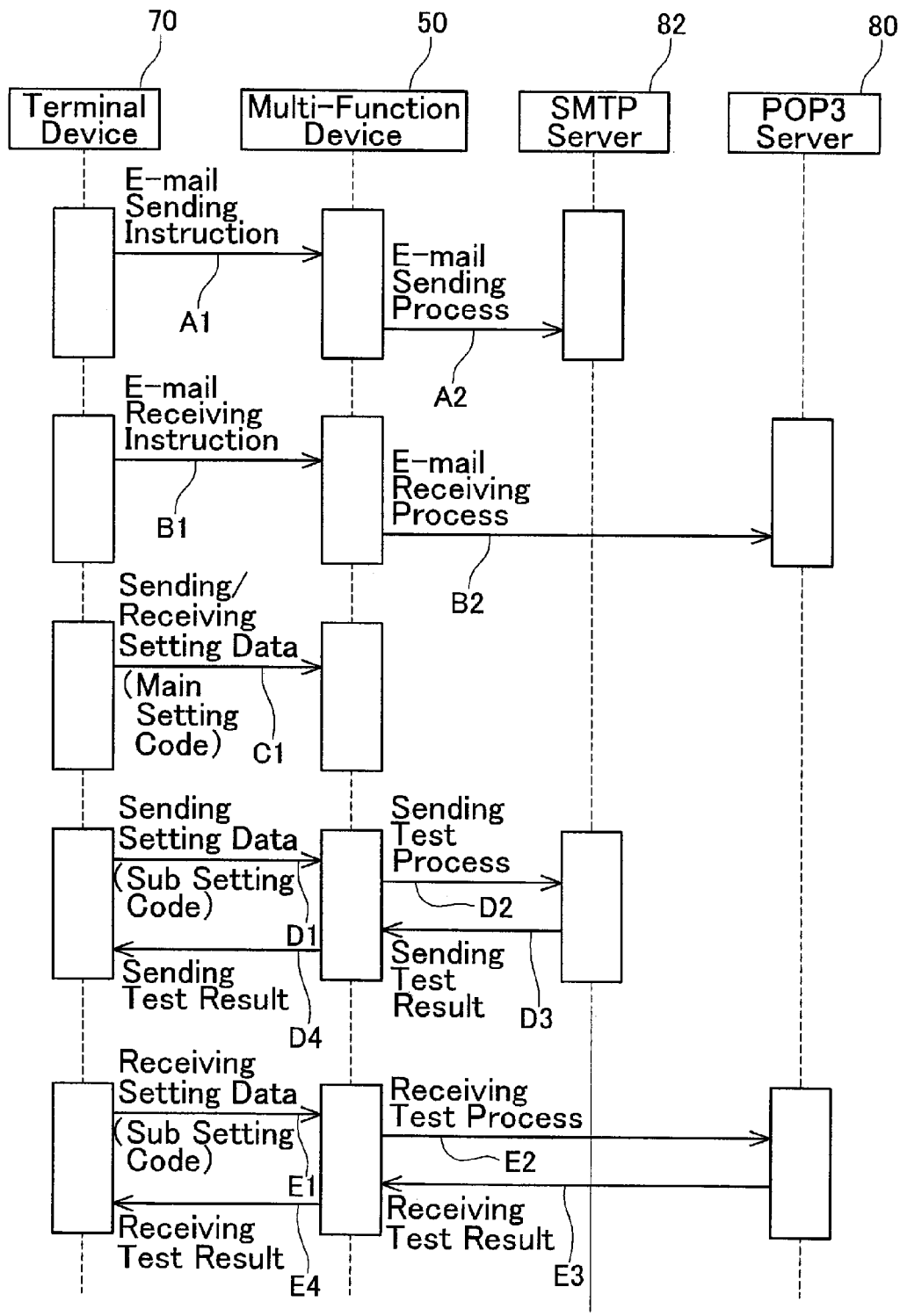
FIG. 3 is a figure describing signals and data exchanged between devices.

Next, the types of signals and data will be described that are communicated between the terminal device 70, the multi-function device 50, the SMTP server 82, and the POP3 server 80. FIG. 3 shows signals and data communicated between the devices 50, 70, 80, and 82.

The terminal device 70 is capable of outputting an e-mail sending instruction to the multi-function device 50 (A1). When this sending instruction is input to the multi-function device 50, the multi-function device 50 executes an e-mail sending process (A2). The multi-function device 50 executes a TCP connection with the SMTP server 82. Next, the multi-function device 50 outputs a user ID and a password, etc. to the SMTP server 82. In the case where SMTP server 82 requires user authentication by the SMTP-AUTH, the SMTP server 82 executes the user authentication utilizing the user ID and the password. If the user authentication of the SMTP server 82 is successful, the multi-function device 50 outputs the text of the e-mail to the SMTP server 82. The multi-function device 50 is, for example, storing image data scanned by the scanner 52 (see FIG. 2). This image data is sent by e-mail. By performing the above processes, the multi-function device 50 can send the e-mail via the SMTP server 82. Further, in the case where the SMTP server 82 does not require user authentication by the SMTP-AUTH, the process of the SMTP server 82 executing the user authentication is skipped. Further, in the case where the SMTP server 82 does not have the SMTP-AUTH function, but has the POP before SMTP function, the user authentication is executed by the POP3 server 80. This user authentication will be described in detail later.

Moreover, in the present embodiment, the e-mail sending instruction is sent from the terminal device 70 via the LAN communication line 92a (see FIG. 2) to the multi-function device 50. Further, the multi-function device 50 and the SMTP server 82 communicate signals or data utilizing the internet communication line 96a.

The terminal device 70 is capable of outputting an e-mail receiving instruction to the multi-function device 50 (B1). When this receiving instruction is input to the multi-function device 50, the multi-function device 50 executes an e-mail receiving process (B2). The multi-function device 50 executes a TCP connection with the POP3 server 80, and outputs a user ID or a password to the POP3 server 80. This point is the same as the e-mail sending process. The POP3 server 80 temporarily retains the e-mail sent to the multi-function device 50. If the user authentication is successful, the POP3 server 80 sends the retained e-mail to the multi-function device 50. When the multi-function device 50 has received the e-mail, it prints the contents of the e-mail utilizing the printing device 62.

Furthermore, in the present embodiment, the e-mail receiving instruction is sent from the terminal device 70 via the LAN communication line 92a (see FIG. 2) to the multi-function device 50. Further, the multi-function device 50 and the POP3 server 80 communicate signals or data utilizing the internet communication line 96a.

Figure 4:
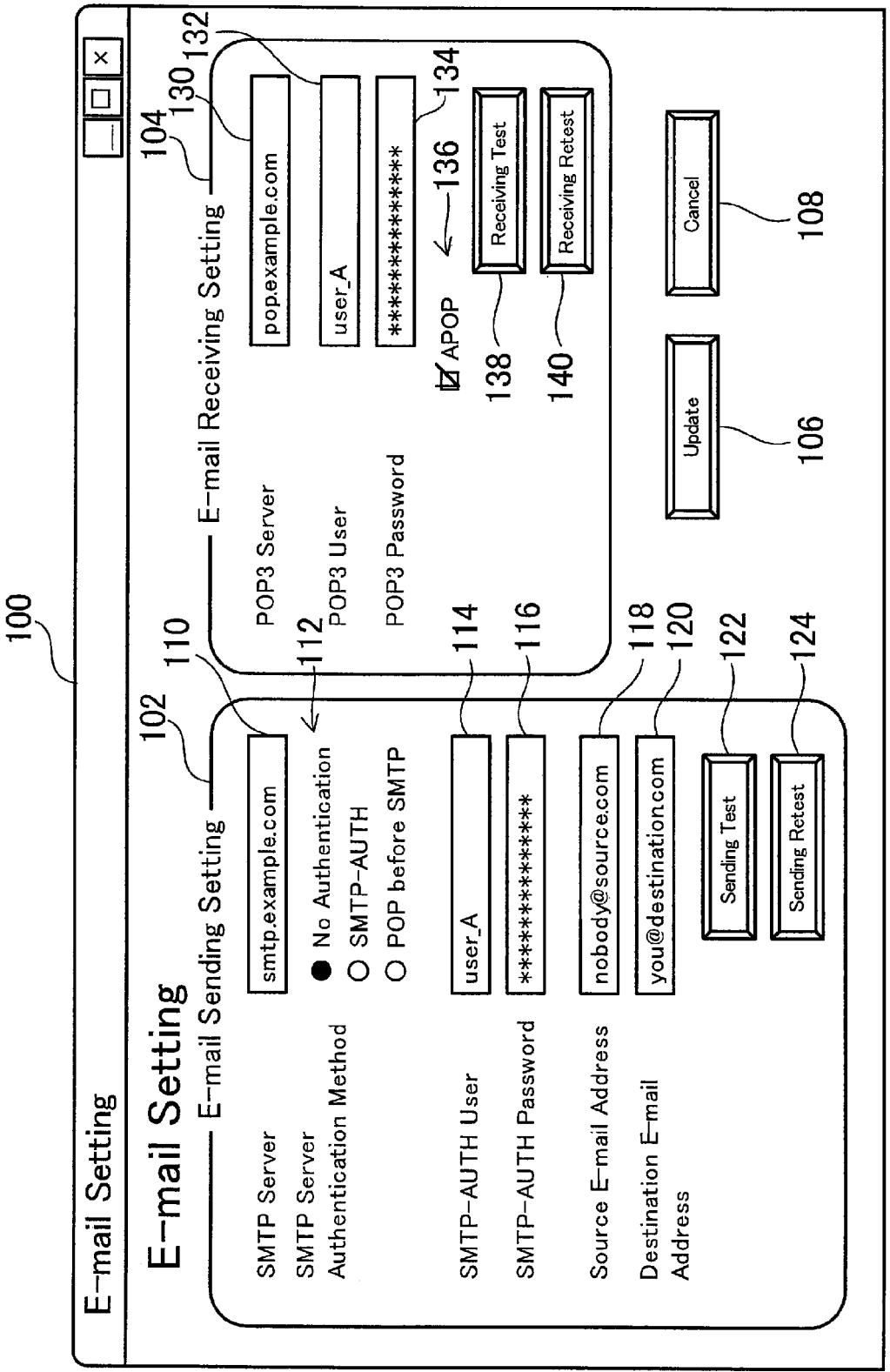
FIG. 4 shows a window for inputting communication setting data.

The terminal device 70 is capable of outputting the main communication setting data (the sending setting data and the receiving setting data) to the multi-function device 50 (C1). The contents of the communication setting data will be described in detail with reference to FIG. 4. The terminal device 70 stores setting data inputting software. When this software is activated, the window 100 shown in FIG. 4 is displayed on the display 74 (see FIG. 2). The user can input the communication setting data for the multi-function device 50 into the window 100 utilizing the operation device 76 (see FIG. 2). Below, inputting the communication setting data utilizing a mouse and a keyboard will be described. The communication setting data comprises sending setting data utilized when e-mail is to be sent, and receiving setting data utilized for receiving e-mail. The window 100 has a region 102 for inputting the sending setting data, and a region 104 for inputting the receiving setting data.

The sending setting data includes a plurality of setting items 110, 112, 114, 116, 118, and 120. The setting item 110 contains an address for specifying the SMTP server 82. The setting item 112 contains data specifying the user authentication method of the SMTP server 82. The user authentication method of the SMTP server 82 is selected out of "No Authentication", "SMTP-AUTH", and "POP before SMTP". The setting items 114 and 116 contain data to be input in the case where SMTP-AUTH was selected. The setting item 114 contains data specifying the user name. The setting item 116 contains the password. The user name and the password are utilized when the SMTP server 82 executes the user authentication. The setting item 118 contains an e-mail address of the terminal device 70. As described above, the system 40 contains a plurality of terminal devices 70. Each terminal device 70 has a unique e-mail address. The e-mail address of the terminal device 70 which output the sending setting data to the multi-function device 50 is input to the setting item 118. The setting item 120 contains an e-mail address of a test mail destination. The setting item 120 is required only for sub sending setting data. That is, the setting item 120 is blank when main sending setting data is input.

The receiving setting data includes a plurality of setting items 130, 132, 134, and 136. The setting item 130 contains an address for specifying the POP3 server 80. The setting item 132 contains data specifying the user name. The setting item 134 contains the password. The user name and the password are utilized when the POP3 server 80 executes the user authentication. The setting item 136 contains data specifying the user authentication method of the POP3 server 80. The user authentication method of the POP3 server 80 is selected out of "POP3 Authentication" and "APOP Authentication". When the setting item 136 has been clicked on and has been checked (the state shown in FIG. 4), this means that APOP Authentication has been selected. In the case where the setting item 136 is blank, this means that POP3 Authentication has been selected.

The window 100 has a plurality of buttons 106, 108, 122, 124, 138, and 140. When the update button 106 is clicked on, the communication setting data (the sending setting data and receiving setting data) that has been input to the window 100 is output to the multi-function device 50 (see C1 of FIG. 3). Code specifying the main setting is added to the communication setting data. When the communication setting data having the main setting code added thereto is input to the multi-function device 50, the multi-function device 50 stores this communication setting data in the main setting data storage area 56a. When the cancel button 108 is clicked on, the communication setting data that has been input to the window 100 is erased. In this case, the communication setting data is not output.

When the sending test button 122 is clicked on, the sending setting data that has been input to the window 100 is output to the multi-function device 50 (D1 of FIG. 3). Code specifying the sub setting is added to the sending setting data. Moreover, in the case where POP before SMTP has been selected in the setting item 112 of FIG. 4, not only the sending setting data but also the receiving setting data (setting items 130 to 136) is output to the multi-function device 50. This point will be described in detail later. When the sending setting data having the sub setting code added thereto is input to the multi-function device 50, the multi-function device 50 stores this sending setting data in the sub setting data storage area 56b. The multi-function device 50 utilizes this sending setting data being stored in the sub setting data storage area 56b to execute the sending test process (D2). The multi-function device 50 obtains a sending test result by communicating with the SMTP server 82 (D3). The sending test result is output to the terminal device 70 (D4).

In the terminal device 70 of the present embodiment, the sending setting data that was output to the multi-function device 50 in the process of D1 of FIG. 3 is stored continuously in the storage 77 (see FIG. 2). That is, the terminal device 70 stores the sending setting data that has already undergone the sending test. When the sending retest button 124 is clicked on, the sending setting data that has already undergone the sending test is re-output to the multi-function device 50. When the re-output sending setting data is input to the multi-function device 50, the multi-function device 50 executes a sending retest on this sending setting data. In the case of the present embodiment, when the sending retest button 124 is clicked on, the processes executed by the devices 50, 70, and 82 are substantially the same as those in D1 to D4. Therefore, the processes executed when the sending retest button 124 is clicked on are omitted in FIG. 4.

When the receiving test button 138 is clicked on, the receiving setting data that has been input to the window 100 is output to the multi-function device 50 (E1 of FIG. 3). Code specifying the sub setting is added to the receiving setting data. When the receiving setting data having the sub setting code added thereto is input to the multi-function device 50, the multi-function device 50 stores this receiving setting data in the sub setting data storage area 56b. The multi-function device 50 utilizes this receiving setting data being stored in the sub setting data storage area 56b to execute the receiving test process (E2). The multi-function device 50 obtains a receiving test result by communicating with the POP3 server 80 (E3). The receiving test result is output to the terminal device 70 (E4).

With the terminal device 70, the receiving setting data that was output to the multi-function device 50 in the process E1 of FIG. 3 is stored continuously in the storage 77 (see FIG. 2). That is, the terminal device 70 stores the receiving setting data that has already undergone the receiving test. When the receiving retest button 140 is clicked on, the receiving setting data that has already undergone the receiving test is re-output to the multi-function device 50. When the re-output receiving setting data is input to the multi-function device 50, the multi-function device 50 executes a receiving retest on this receiving setting data. In the case of the present embodiment, when the receiving retest button 140 is clicked on, the processes executed by the devices 50, 70, and 80 are substantially the same as those in E1 to E4. Therefore, the processes executed when the receiving retest button 140 is clicked on are omitted in FIG. 4.

(Main Process of the Terminal Device)

Figure 5:
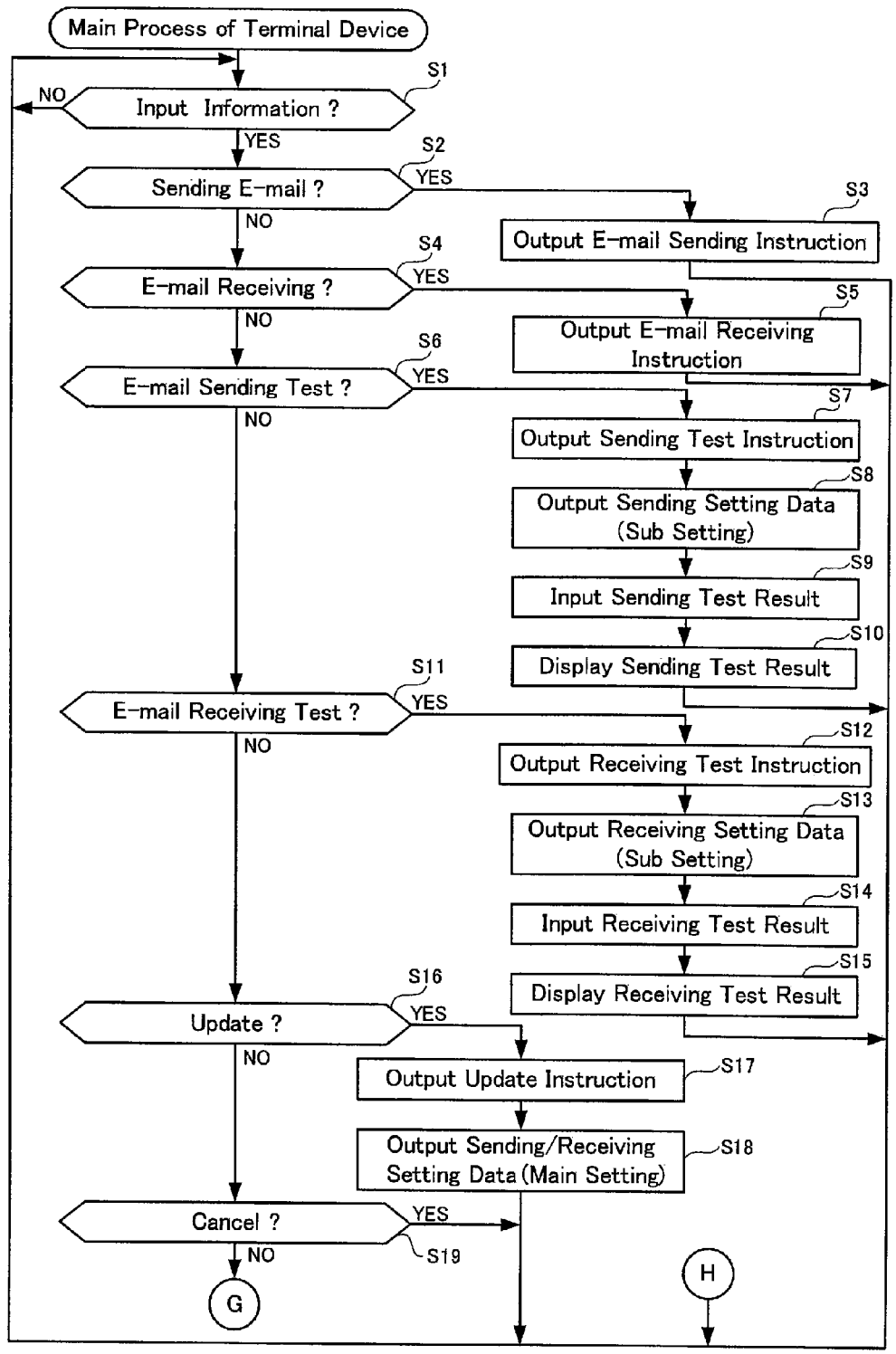
FIG. 5 shows a flow chart of a main process of a terminal device.

Next, the contents of the process executed by the terminal device 70 will be described in detail. The following process is executed by the controller 72 (see FIG. 2) of the terminal device 70. FIG. 5 shows a flow chart of a main process executed by the terminal device 70. The user can input various types of information utilizing the operation device 76 (see FIG. 2). The terminal device 70 monitors whether information has been input by the user (S1). In the case where information has been input (YES in S1), a process is executed in accordance with the type of information. The terminal device 70 determines whether the information input in S1 is a command for sending e-mail from the multi-function device 50 (S2). In the case where S2 is YES, the terminal device 70 outputs the e-mail sending instruction to the multi-function device 50 (S3). This step corresponds to A1 of FIG. 3. The terminal device 70 returns to S1 when S3 ends. In the case where S2 is NO, the terminal device 70 determines whether the information input in S1 is a command for the multi-function device 50 to receive e-mail (S4). In the case where S4 is YES, the terminal device 70 outputs the e-mail receiving instruction to the multi-function device 50 (S5). This step corresponds to B1 of FIG. 3. The terminal device 70 returns to S1 when S5 ends.

In the case where S4 is NO, the terminal device 70 determines whether the information input in S1 is a command to execute the e-mail sending test (S6) in the multi-function device 50. This step is determined as YES in the case where the sending test button 122 (see FIG. 4) has been clicked on after the sending setting data has been input to the window 100. In the case where S6 is YES, the terminal device 70 outputs the sending test instruction to the multi-function device 50 (S7). Next, the terminal device 70 outputs the sending setting data to the multi-function device 50 (S8). Code specifying that this is for the sub setting is added to the sending setting data. This step S8 corresponds to D1 of FIG. 3. Moreover, in the case where POP before SMTP has been selected in the setting item 112 of FIG. 4, not only the sending setting data but also the receiving setting data is output to the multi-function device 50 in S8. As a result, in the case where POP before SMTP has been selected, the user must also input data into the setting items 130 to 136 of the receiving setting data. When the processes of S7 and S8 are executed, the sending test process is executed by the multi-function device 50. When S8 ends, the sending test result output from the multi-function device 50 is input to the terminal device 70 (S9). The terminal device 70 displays (S10) the sending test result on the display 74 (see FIG. 2). The user can thus learn the sending test result. The terminal device 70 returns to S1 when S10 ends.

In the case where S6 is NO, the terminal device 70 determines whether the information input in S1 is a command to execute the e-mail receiving test (S11) in the multi-function device 50. This step is determined as YES in the case where the receiving test button 138 (see FIG. 4) has been clicked on after the receiving setting data has been input to the window 100. In the case where S11 is YES, the terminal device 70 outputs the receiving test instruction to the multi-function device 50 (S12). Next, the terminal device 70 outputs the receiving setting data to the multi-function device 50 (S13). Code specifying that this is for the sub setting is added to the receiving setting data. This step S13 corresponds to E1 of FIG. 3. When the processes of S12 and S13 are executed, the receiving test process is executed by the multi-function device 50. When S13 ends, the receiving test result output from the multi-function device 50 is input to the terminal device 70 (S14). The terminal device 70 displays (S15) the receiving test result on the display 74 (see FIG. 2). The user can thus learn the receiving test result. The terminal device 70 returns to S1 when S15 ends.

In the case where S11 is NO, the terminal device 70 determines whether the information input in S1 is a command to update the main communication setting data (S16) in the multi-function device 50. This step is determined as YES in the case where the update button 106 (see FIG. 4) has been clicked on after the sending setting data and receiving setting data have been input to the window 100. In the case where S16 is YES, the terminal device 70 outputs a setting update instruction to the multi-function device 50 (S17). Next, the terminal device 70 outputs the sending setting data and the receiving setting data to the multi-function device 50 (S18). Code specifying that this is for the main setting is added to the communication setting data. This step S18 corresponds to C1 of FIG. 3. When the process of S18 is executed, the main communication setting data is updated by the multi-function device 50. The terminal device 70 returns to S1 when S18 ends. In the case where S16 is NO, the terminal device 70 determines whether the information input in S1 is a command to cancel the communication setting data (S19). This step is determined as YES in the case where the cancel button 108 in the window 100 (see FIG. 4) has been clicked on. In the case where S19 is YES, the terminal device 70 returns to S1.

Figure 6:
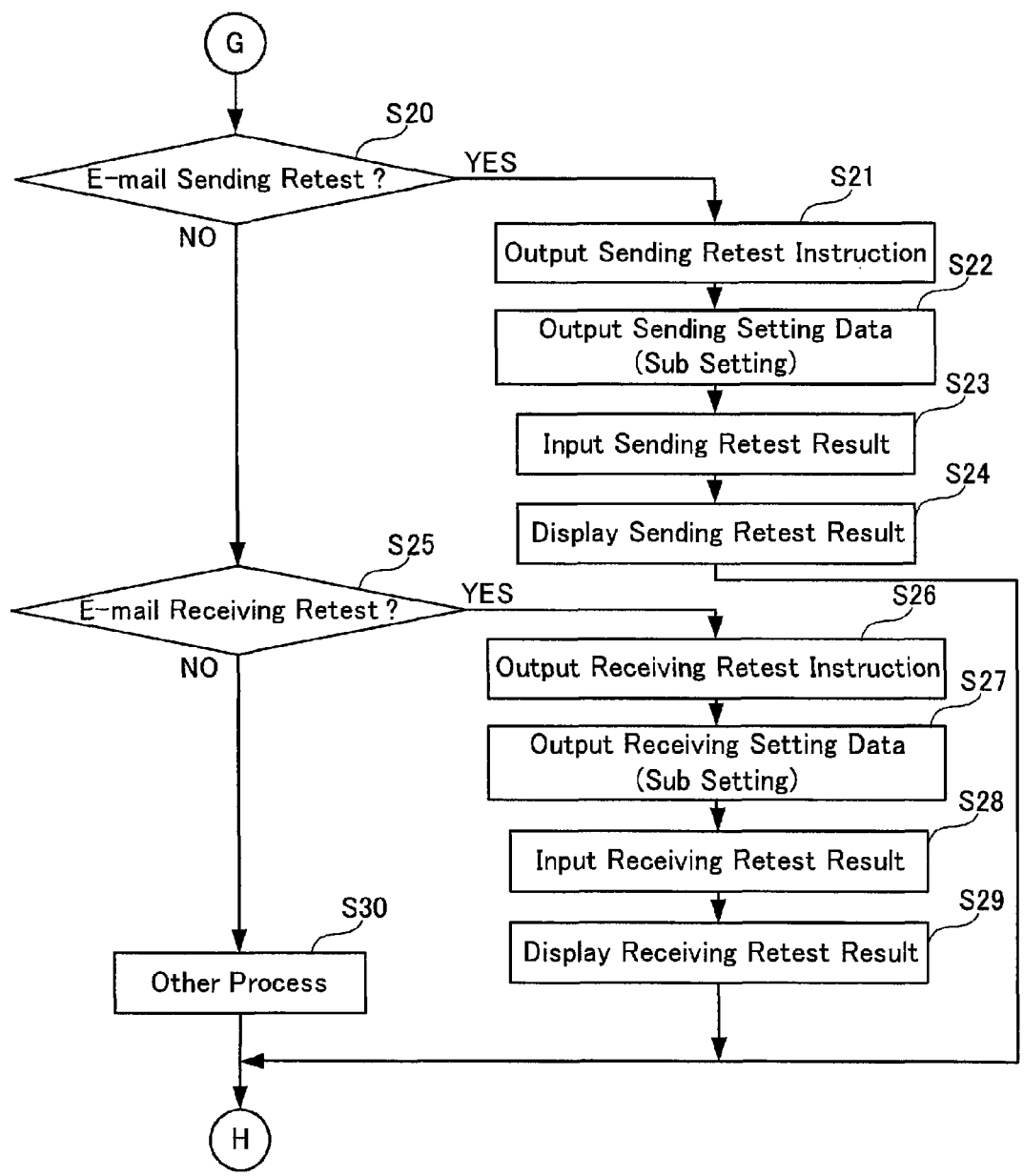
FIG. 6 shows the flow chart of the main process of the terminal device (continued from FIG. 5).

In the case where S19 is NO, the terminal device 70 proceeds to S20 of FIG. 6. In S20, the terminal device 70 determines whether the information input in S1 is a command to execute the sending retest. The sending setting data that was output to the multi-function device 50 in the process of S8 (see FIG. 5) is being stored in the storage 77 of the terminal device 70. In the present embodiment, only one pattern of the sending setting data output in the previous process of S8 is being stored. That is, the storage 77 is storing only the sending setting data that underwent the most recent sending test. The user can execute a retest of the sending setting data that has already undergone the sending test by clicking on the sending retest button 124 (see FIG. 4). Since the sending setting data for retesting is being stored in the storage 77, the user does not need to re-input the sending setting data for retesting. S20 step is determined as YES in the case where the sending retest button 124 has been clicked on. In the case where S20 is YES, the terminal device 70 outputs the sending retest instruction to the multi-function device 50 (S21). Next, the terminal device 70 outputs the sending setting data stored in the storage 77 to the multi-function device 50 (S22). Code specifying that this is for the sub setting is added to the sending setting data. When the processes of S21 and S22 are executed, the sending retest process is executed by the multi-function device 50. That is, the sending retest is executed. When S22 ends, the sending retest result output from the multi-function device 50 is input to the terminal device 70 (S23). The terminal device 70 displays (S24) the sending retest result on the display 74 (see FIG. 2). The user can thus learn the sending retest result. The terminal device 70 returns to S1 when S24 ends.

In the case where S20 is NO, the terminal device 70 determines whether the information input in S1 is a command to execute the e-mail receiving retest (S25). The receiving setting data that was output to the multi-function device 50 in the process of S13 (see FIG. 5) is being stored in the storage 77 of the terminal device 70. In the present embodiment, only one pattern of the receiving setting data output in the previous process of S13 is being stored. That is, the storage 77 is storing only the receiving setting data that underwent the most recent receiving test. The user can execute a retest of the receiving setting data that has already undergone the receiving test by clicking on the receiving retest button 140 (see FIG. 4). Since the receiving setting data for retesting is being stored in the storage 77, the user does not need to re-input the receiving setting data for retesting. S25 step is determined as YES in the case where the receiving retest button 140 has been clicked on. In the case where S25 is YES, the terminal device 70 outputs the receiving retest instruction to the multi-function device 50 (S26). Next, the terminal device 70 outputs the receiving setting data stored in the storage 77 to the multi-function device 50 (S27). Code specifying that this is for the sub setting is added to the receiving setting data. When the processes of S26 and S27 are executed, the receiving retest process is executed by the multi-function device 50. When S27 ends, the receiving retest result output from the multi-function device 50 is input to the terminal device 70 (S28). The terminal device 70 displays (S29) the receiving retest result on the display 74 (see FIG. 2). The user can thus learn the receiving retest result. The terminal device 70 returns to S1 when S29 ends. In the case where S25 is NO, another process corresponding to the information input in S1 is executed (S30). Since this other process that is executed is a known process executed by a PC or the like, a detailed description thereof is omitted.

(Main Process of the Multi-Function Device)

Figure 7:
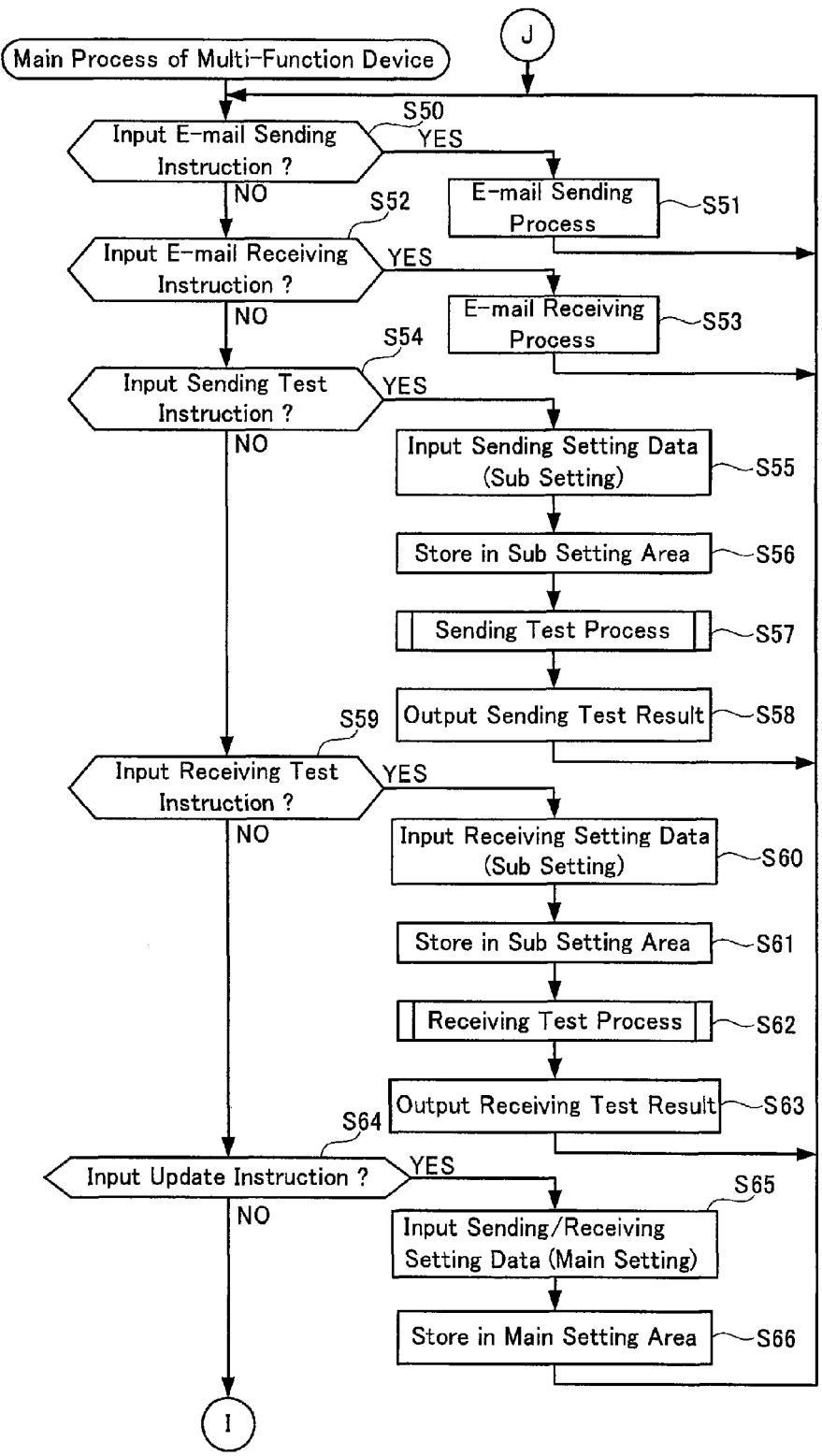
FIG. 7 shows a flow chart of a main process of a multi-function device.

Next, the contents of a main process executed by the multi-function device 50 will be described in detail. The process below is executed by the controller 54 (see FIG. 2) of the multi-function device 50. FIG. 7 shows a flow chart of the main process executed by the multi-function device 50. The multifunction device 50 monitors whether the e-mail sending instruction output from the terminal device 70 has been input (S50). In the case where S50 is YES, the multi-function device 50 executes the e-mail sending process (S51). The multi-function device 50 executes the e-mail sending process utilizing the sending setting data that is being stored in the main setting data storage area 56a. The multi-function device 50 is, for example, storing image data scanned by the scanner 52 (see FIG. 2). This image data is sent by e-mail. The destination of the e-mail may be set in advance in the multi-function device 50, or may be included in the e-mail sending instruction output from the terminal device 70. The e-mail is sent to the destination via the SMTP server 82. The step S51 corresponds to A2 of FIG. 3.

The multi-function device 50 monitors whether the e-mail receiving instruction output from the terminal device 70 has been input (S52). In the case where S52 is YES, the multi-function device 50 executes the e-mail receiving process (S53). The multi-function device 50 executes the e-mail receiving process utilizing the receiving setting data that is being stored in the main setting data storage area 56a. The multi-function device 50 can receive the e-mail being retained in the POP3 server 80 by accessing this POP3 server 80. The step S53 corresponds to B2 of FIG. 3. The multi-function device 50 prints the contents of the e-mail that has been received utilizing the printing device 62 (see FIG. 2).

The multi-function device 50 monitors whether the sending test instruction output from the terminal device 70 has been input (S54). In the case where S54 is YES, the multi-function device 50 inputs the sending setting data output from the terminal device 70 (S55). Code specifying that this is for the sub setting is added to the sending setting data. The multi-function device 50 is capable of recognizing that this is sub sending setting data. The step S55 corresponds to D1 of FIG. 3. Moreover, as described above, in the case where POP before SMTP has been selected in the setting item 112 of FIG. 4 during S8 of FIG. 5, both the sending setting data and the receiving setting data are output. In this case, both the sending setting data and the receiving setting data are input in S55.

The multi-function device 50 stores the sending setting data that has been input in the sub setting data storage area 56b (S56). In the case where both the sending setting data and the receiving setting data have been input in S55, the multi-function device 50 stores both the sending setting data and the receiving setting data in the setting data storage area 56b. Next, the multi-function device 50 executes the sending test process (S57). The contents of the sending test process will be described in detail later. When the sending test process has been executed, the sending test result is obtained. The multi-function device 50 outputs the sending test result to the terminal device 70 (S58). The sending test result is input by the terminal device 70 (S9 of FIG. 5). The process of S58 corresponds to D4 of FIG. 3.

The multi-function device 50 monitors whether the receiving test instruction output from the terminal device 70 has been input (S59). In the case where S59 is YES, the multi-function device 50 inputs the receiving setting data output from the terminal device 70 (S60). Code specifying that this is for the sub setting is added to the receiving setting data. The multi-function device 50 is capable of recognizing that this is sub setting receiving setting data. The step S60 corresponds to E1 of FIG. 3. The multi-function device 50 stores the receiving setting data that has been input in the sub setting data storage area 56b (S61). Next, the multi-function device 50 executes the receiving test process (S62). The contents of the receiving test process will be described in detail later. When the receiving test process has been executed, the receiving test result is obtained. The multi-function device 50 outputs the receiving test result to the terminal device 70 (S63). The receiving test result is input by the terminal device 70 (S14 of FIG. 5). The process of S63 corresponds to E4 of FIG. 3.

The multi-function device 50 monitors whether the setting update instruction output from the terminal device 70 has been input (S64). In the case where S64 is YES, the multi-function device 50 inputs the communication setting data output from the terminal device 70 (S65). Code specifying that this is for the main setting is added to the communication setting data. The multi-function device 50 is capable of recognizing that this is main communication setting data. Both the sending setting data and the receiving setting data are included in this communication setting data. The step S65 corresponds to C1 of FIG. 3. The multi-function device 50 stores the communication setting data that has been input in the main setting data storage area 56*a* (S66). The communication setting data for utilizing the e-mail sending process of S51 or the e-mail receiving process of S53 is thus updated. The multi-function device 50 is capable of performing e-mail communication utilizing the updated communication setting data.

Figure 8:
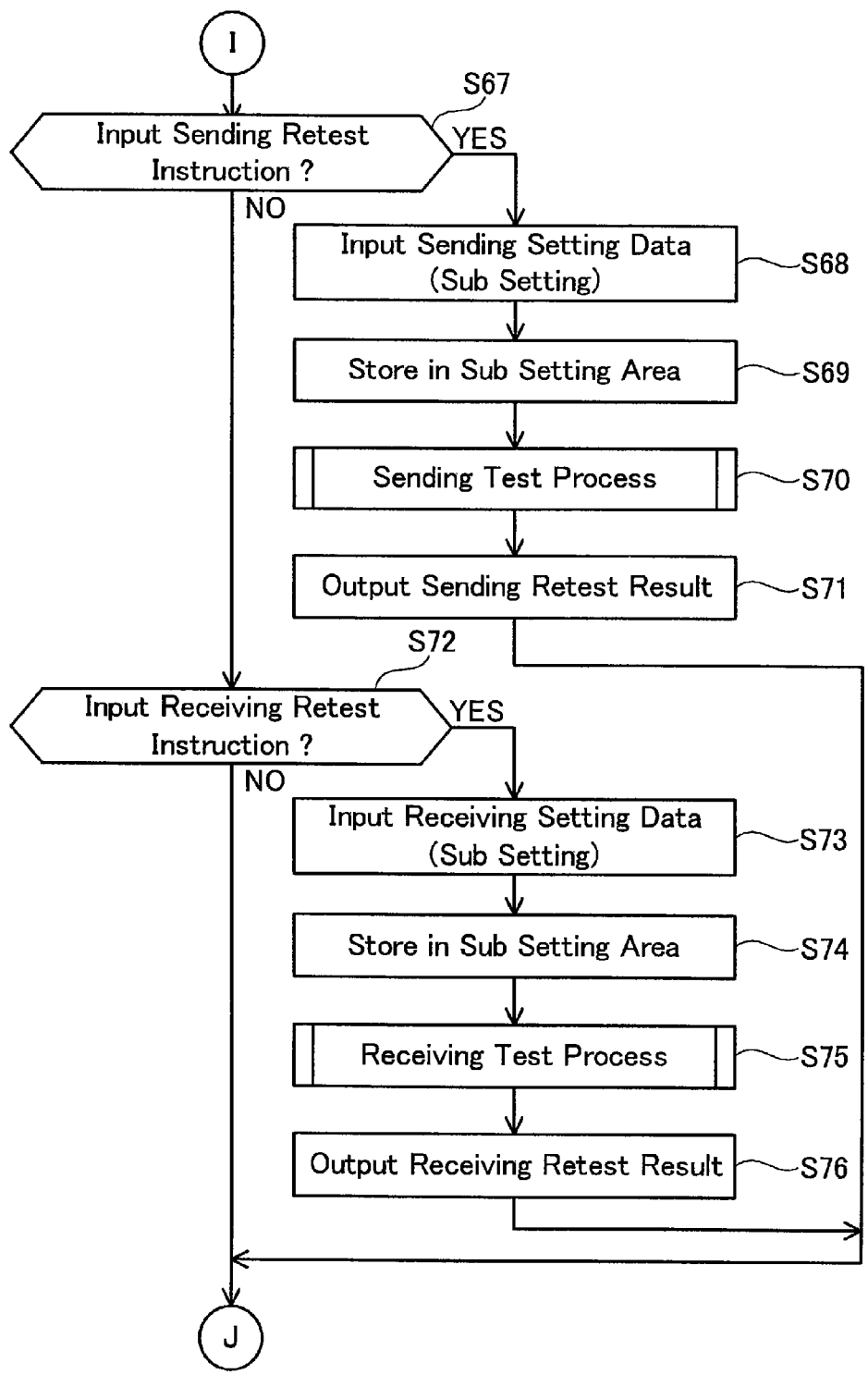
FIG. 8 shows the flow chart of the main process of the multi-function device (continued from FIG. 7).

In the case where S64 is NO, the multi-function device 50 proceeds to S67 of FIG. 8. In S67, the multi-function device 50 determines whether the sending retest instruction output from the terminal device 70 has been input. In the case where S67 is YES, the multi-function device 50 inputs the sending setting data output from the terminal device 70 (S68). Code specifying that this is for the sub setting is added to the sending setting data. The sending setting data that is input in S68 is data that has already undergone the sending test process. By contrast, the sending setting data that is input in S55 (see FIG. 7) is data that is first input to the terminal device 70 by the user, and is data that has not undergone the sending test process. The process of S69 to S71 is the same as the process of S56 to S58 of FIG. 7. Therefore, a description of S69 to S71 is omitted.

In the case where S67 is NO, the multi-function device 50 proceeds to S72. In S72, the multi-function device 50 determines whether the receiving retest instruction output from the terminal device 70 has been input. In the case where S72 is YES, the multi-function device 50 inputs the receiving setting data output from the terminal device 70 (S73). Code specifying that this is for the sub setting is added to the receiving setting data. The receiving setting data that is input in S73 is data that has already undergone the receiving test process. By contrast, the receiving setting data that is input in S60 (see FIG. 7) is data that is first input to the terminal device 70 by the user, and is data that has not undergone the receiving test process. The process of S74 to S76 is the same as the process of S61 to S63 of FIG. 7. Therefore, a description of S74 to S76 is omitted.

In the case where S72 is NO, the multi-function device 50 returns to S50 (see FIG. 7). Moreover, various items of information (instructions) apart from the aforementioned instructions can be input to the multi-function device 50. For example, it is possible to input an instruction to the multi-function device 50 commanding a document to be scanned utilizing the scanner 52, or to input an instruction commanding image data to be printed utilizing the printing device 62. The multi-function device 50 is capable of executing various processes (the scanning process, printing process, etc.) apart from the processes shown in FIGS. 7 and 8.

(Sending Test Process of the Multi-Function Device)

Figure 9:
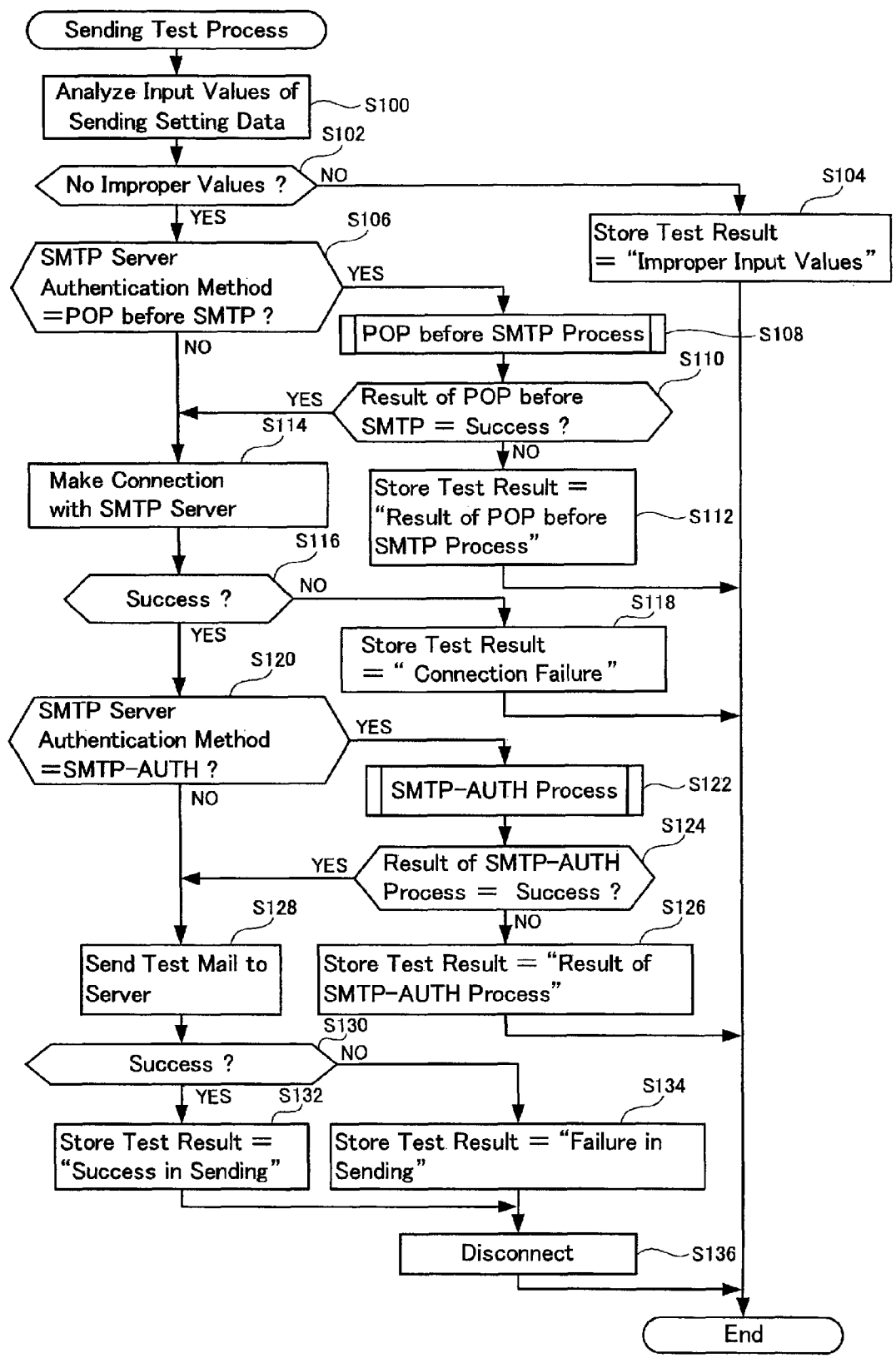
FIG. 9 shows a flow chart of a sending test process.

The contents of the sending test process executed by the multi-function device 50 (S57 of FIG. 7 or S70 of FIG. 8) will now be described in detail. The sending setting data stored in the sub setting data storage area 56*b* in S56 is utilized in the sending test process of S57 of FIG. 7. Further, the sending setting data stored in the sub setting data storage area 56*b* in S69 is utilized in the sending test process of S70 of FIG. 8. FIG. 9 shows a flow chart of the sending test process. The multi-function device 50 analyzes (S100) the sending setting data that was stored in the sub setting data storage area 56*b* in S56 of FIG. 7 (or in S69 of FIG. 8). The multi-function device 50 determines whether improper input values are present in the sending setting data (S102). For example, in the case where data was not input in the setting items 110, 112, etc. in the window 100 of FIG. 4, NO is determined in S102. In the case where S102 is NO, the multi-function device 50 stores the information "Improper Input Values" as the sending test result (S104). This information is stored in the temporary storage area 56*c*.

In the case where S102 is YES, the multi-function device 50 determines whether the authentication method included in the sending setting data is "POP before SMTP" (S106). In the case where "POP before SMTP" was selected in the setting item 112 of FIG. 4, YES is determined in this step. In the case where S106 is YES, the multi-function device 50 executes the POP before SMTP process (S108). Moreover, POP before SMTP will be simplified to "PbS" below. In the case where S106 is NO, the process proceeds to S114.

A simple description of the PbS authentication will now be given. In the case where the SMTP server 82 does not have the user authentication function, the PbS authentication may be executed utilizing the POP3 server 80. In order to execute the PbS authentication, a database (referred to below as a common database) that both the SMTP server 82 and the POP3 server 80 can access is incorporated into the system 40. First, the multi-function device 50 accesses the POP3 server 80. The multi-function device 50 outputs the receiving setting data (the setting items 130, 132, 134, 136 of FIG. 4) to the POP3 server 80. The POP3 server executes the user authentication based on the receiving setting data that was input. In the case where the user authentication was successful, the POP3 server 80 stores the information in the common database showing that the user authentication concerning the multi-function device 50 was successful. After outputting the receiving setting data to the POP3 server 80, the multi-function device 50 accesses the SMTP server 82. That is, the multi-function device 50 outputs information ordering the sending of e-mail to the SMTP server 82. In this case, the SMTP server 82 accesses the common database, and obtains the information showing whether the user authentication concerning the multi-function device 50 was successful. In the case where the user authentication concerning the multi-function device 50 was successful, the SMTP server 82 is authorized to send the e-mail.

Figure 10:
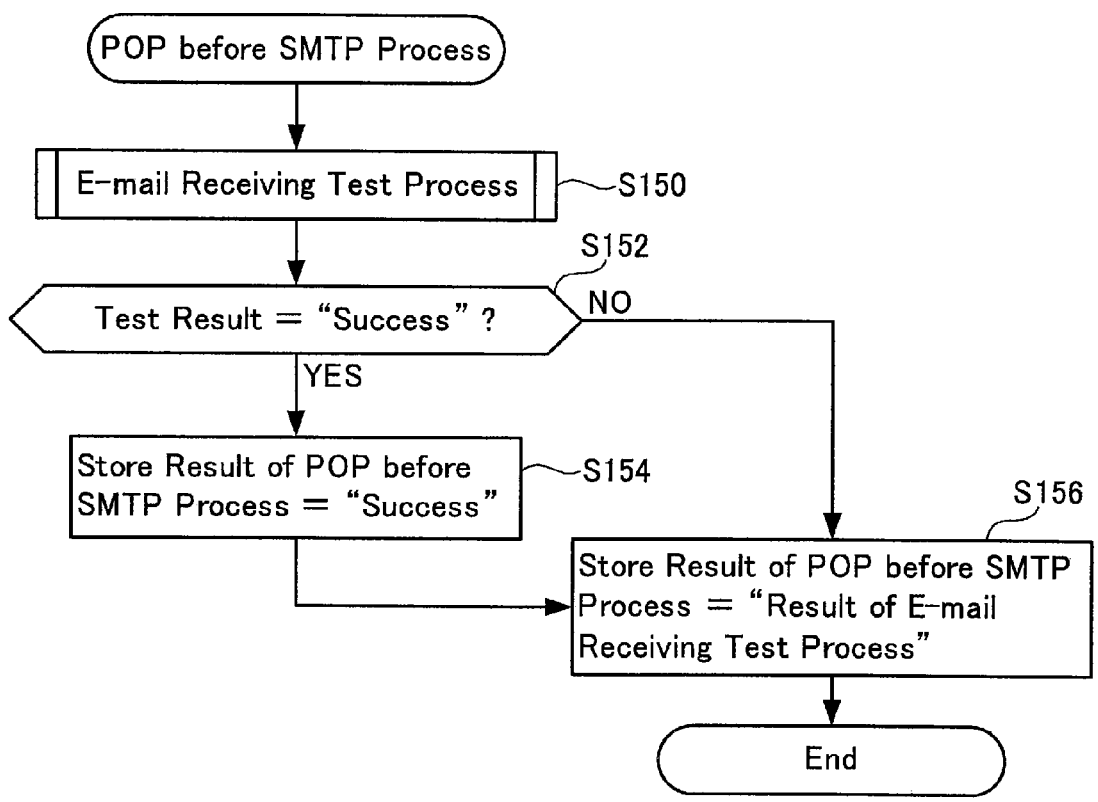
FIG. 10 shows a flow chart of a POP before SMTP process.

FIG. 10 shows a flow chart of the PbS process. The e-mail sending test is executed in the PbS process (S150). In the sending test process, the user authentication is executed by the POP3 server 80 utilizing the receiving setting data stored in the sub setting data storage area 56*b*. In the case where PbS was selected in the setting item 112 of FIG. 4, both the sending setting data and the receiving setting data are input in S55 (see FIG. 7). As a result, both the sending setting data and the receiving setting data are stored in the sub setting data storage area 56*b* in S56. The receiving setting data input in S55 are utilized in the sending test process of S150. The contents of the receiving test process will be described in detail later.

The receiving test result is obtained when the receiving test process has been executed. The receiving test result is stored in the temporary storage area 56*c*. The multi-function device 50 determines whether the receiving test process is "Success"

(S152). In the case where S152 is YES, the information "Success" is stored as the PbS process result. This information is stored in the temporary storage area 56c. In the case where S152 is NO, this means that the receiving test process was not successful. Although this will be described in detail later, the reason why the receiving test process was not successful is stored. In the case where S152 is NO, the receiving test result (the cause of the receiving test not succeeding) is stored as the PbS process result (S156). This receiving test result is stored in the temporary storage area 56c.

When the PbS process of FIG. 9 (S108) ends, it is determined whether the PbS process result is "Success" (S110). In the case where S110 is NO, the multi-function device 50 stores the PbS process result (the cause of the process not succeeding) as the sending test result (S112). The PbS process result is stored in the temporary storage area 56c. In the case where S110 is YES, the process proceeds to S114. The multi-function device 50 accesses the SMTP server 82 in S114. The multi-function device 50 tries to establish a TCP connection with the SMTP server 82. When this is successful, YES is determined in S116. In the case where S116 is YES, the process proceeds to S120. Alternatively, in the case where the SMTP server 82 is not functioning correctly (for example, in the case where the SMTP server 82 does not answer a SYN/ACK signal), the multi-function device 50 is unable to establish the TCP connection with the SMTP server 82. In this case, S116 is determined to be NO. In the case where S116 is NO, the multi-function device 50 stores the information "SMTP Server Connection Failure" as the sending test result (S118). This information is stored in the temporary storage area 56c. In the case where S116 is YES, the multi-function device 50 determines whether the authentication method included in the sending setting data is "SMTP-AUTH" (S120). This step is determined as YES in the case where "SMTP-AUTH" was selected in the setting item 112 of FIG. 4. In the case where S120 is YES, the multi-function device 50 executes the SMTP-AUTH process (S122).

A simple description of the SMTP-AUTH will now be given. As described above, SMTP servers include those that do not have a user authentication function. There are also SMTP servers that do have a user authentication function. The user authentication executed by the SMTP servers is termed the SMTP-AUTH. In the case where the user authentication was successful, the SMTP server authorizes e-mail to be sent. In the SMTP-AUTH, the user authentication is executed utilizing the user name and password (the setting items 114 and 116 of FIG. 4) included in the sending setting data. The multi-function device 50 outputs the user name and password to the SMTP server 82. The user name and password for authorizing e-mail to be sent are registered in the SMTP server 82. In the case where the user name and password output from the multi-function device 50 have been registered in the SMTP server 82, the SMTP server 82 authorizes e-mail to be sent from the multi-function device 50 via the SMTP server 82.

A plurality of types of user authentication method is known to exist. For example, there are the methods "PLAIN", "LOGIN", "CRAM-MD5", etc. These are termed authentication mechanisms. SMTP servers include those capable of executing a plurality of authentication mechanisms, and those capable of executing only one authentication mechanism. In CRAM-MD5, the password output from the multi-function device 50 to the SMTP server 82 is encrypted. In PLAIN and LOGIN, the password is not encrypted. In PLAIN, the user name and the password are sent simultaneously to the SMTP server 82. In LOGIN, the user name alone is sent first to the SMTP server 82, and in the case where the user name is registered in the SMTP server 82, the password is then sent to the SMTP server 82. Since the password is encrypted in CRAM-MD5, this is the most secure mechanism of the aforementioned three authentication mechanisms. The next most secure mechanism is the LOGIN, and the least secure mechanism is the PLAIN.

Figure 11:
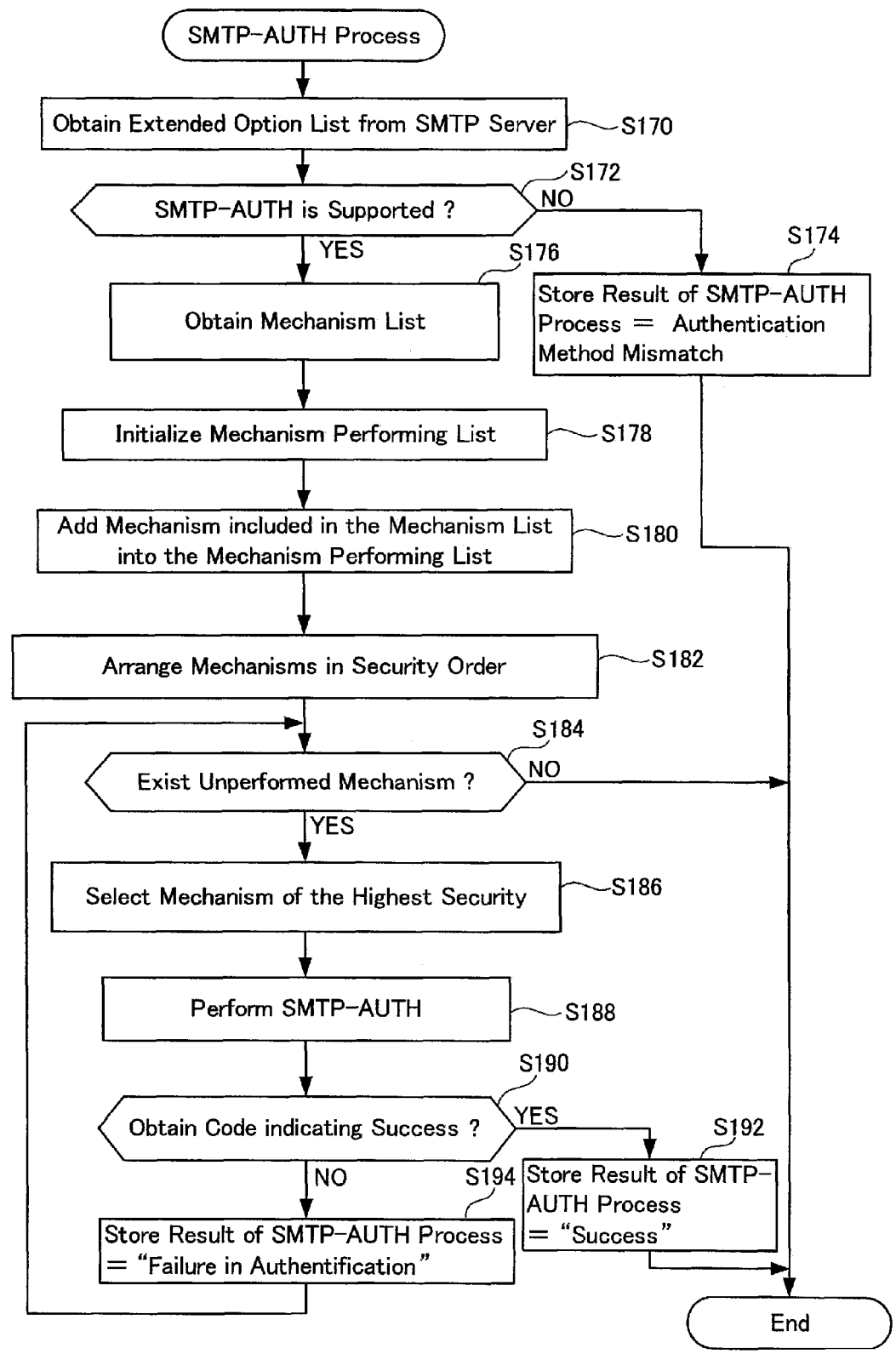
FIG. 11 shows a flow chart of an SMPT-AUTH process.

FIG. 11 shows a flow chart of the SMTP-AUTH process. The multi-function device 50 obtains an ESMTP extended option list (S170) by sending an EHLO command to the SMTP server 82. In S170, various items of information are exchanged between the multi-function device 50 and the SMTP server 82. For example, in the case where the SMTP server 82 has the function to execute SMTP-AUTH, the SMTP server 82 outputs a list of the authentication mechanisms it is able to execute. The multi-function device 50 verifies whether the SMTP server 82 supports SMTP-AUTH (S172). In the case where S172 is NO, the multi-function device 50 stores the information "SMTP Server Authentication Method Mismatch" as the SMTP-AUTH process result (S174). This information is stored in the temporary storage area 56c. In the case where S172 is YES, the multi-function device 50 obtains the list of the authentication mechanisms the SMTP server 82 is able to execute (S176). Next, the multi-function device 50 initializes an authentication mechanism performing list (S178). This list is stored in the temporary storage area 56c. A list obtained earlier is erased in S178.

The multi-function device 50 specifies which of the authentication mechanisms it is able to execute out of the authentication mechanisms obtained in S176. The multi-function device 50 stores the specified authentication mechanism(s) in the authentication mechanism performing list (S180). That is, the specified authentication mechanism(s) are stored in the temporary storage area 56c. Next, the multi-function device 50 arranges the specified authentication mechanisms in the authentication mechanism performing list in order of security level (S182). For example, in the case where PLAIN, LOGIN, and CRAM-MD5 are included in the authentication mechanism performing list, these are arranged in the sequence: CRAM-MD5, LOGIN, PLAIN.

The multi-function device 50 determines whether authentication mechanisms that are unused are present in the authentication mechanism performing list (S184). That is, the multi-function device 50 determines whether authentication mechanisms that are unused in S188 (to be described) are present. In the case where S184 is YES, the multi-function device 50 selects (S186) the authentication method that is the most secure out of the user authentication mechanisms that have not been executed. In the case of the above example, CRAM-MD5 is selected. The multi-function device 50 outputs the user name and password (the setting items 114 and 116 of FIG. 4) included in the sending setting data to the SMTP server 82 utilizing the authentication mechanism selected in S186. The SMTP server 82 thus executes the SMTP-AUTH (S188). The SMTP server 82 outputs the SMTP-AUTH result to the multi-function device 50.

The multi-function device 50 monitors whether code showing that the SMTP-AUTH was successful has been input (S190). In the case where S190 is YES, the multi-function device 50 stores the information "Success" as the SMTP-AUTH process result (S192). This information is stored in the temporary storage area 56c. When the process of S192 ends, the multi-function device 50 ends the SMTP-AUTH process. In the case where S190 is NO, the multi-function device 50 stores the information "Failure in Authentication" as the SMTP-AUTH process result (S194). This information is stored in the temporary storage area 56c. When the process of S194 ends, the multi-function device 50 returns to S184, and determines whether other unused authentication mechanisms are present. In the case where the SMTP-AUTH executed utilizing another authentication mechanism is successful (in the case where S190 is YES), the SMTP-AUTH process result that was stored as "Failure in Authentication" for the most secure authentication mechanism is updated to "Success" (S192).

When the SMTP-AUTH process of FIG. 9 (S122) ends, it is determined whether the SMTP-AUTH process result is "Success" (S124). In the case where S124 is NO, the multi-function device 50 stores the information "SMTP Server Authentication Method Mismatch" or "Failure in Authentication" as the sending test result (S126). That is, the reason for lack of success is stored as the sending test result. The sending test result is stored in the temporary storage area 56c. In the case where S120 is NO, or in the case where S124 is YES, the multi-function device 50 executes the process of S128. The case where S120 is NO means that "No Authentication" was selected in the setting item 112 of FIG. 4. In this case, user authentication relating to sending e-mail is not executed. In S128 the sending of a test mail is attempted. As shown in FIG. 4, the mail address of the setting item 118 and the mail address of the setting item 120 are included in the sending setting data. The sending of the test mail is attempted to both of these mail addresses. The test mail is sent via the SMTP server 82. The SMTP server 82 outputs code showing that the sending of the test mail was successful, or code showing that the sending of the test mail failed, to the multi-function device 50.

The multi-function device 50 monitors whether the sending of the test mail was successful (S130). In the case where the code showing that the sending of the test mail was successful is input, the multi-function device 50 determines YES, and in the case where the code showing that the sending of the test mail failed is input, the multi-function device 50 determines NO. In the case where S130 is YES, the multi-function device 50 stores the information "Success in Sending" as the sending test result (S132). In the case where S130 is NO, the multi-function device 50 stores the information "Failure in Sending" as the sending test result (S134). These sending test results are stored in the temporary storage area 56c. When the multi-function device 50 has executed the process of S132 or S134, the connection with the SMTP server 82 is disconnected (S136).

As described above, the multi-function device 50 outputs the sending test result to the terminal device 70 when the sending test process ends (S58 of FIG. 7 or S71 of FIG. 8). The information stored as the sending test result is any out of: "Improper Input Values" (S1104), "PbS Process Result (Cause of Process not Succeeding)" (S112), "SMTP Server Connection Failure" (S118), "SMTP Server Authentication Method Mismatch" (S174), "SMTP Server Failure in Authentication" (S194), "Success in Sending" (S132), and "Failure in Sending" (S134). The information corresponding to the sending test result is displayed on the display 74 (see FIG. 2) of the terminal device 70. The user can thus learn the sending test result. In particular, in the case where the sending test failed, the reason for this is displayed. The user can consequently improve the sending test data based on the reason for failure.

(Receiving Test Process of the Multi-Function Device)

Next, the contents of the receiving test process executed by the multi-function device 50 (S62 of FIG. 7, S75 of FIG. 8, or S150 of FIG. 10) will now be described in detail. The receiving setting data stored in the sub setting data storage area 56b in S61 is utilized in the receiving test process of S62 of FIG. 7. The receiving setting data stored in the sub setting data storage area 56b in S74 is utilized in the receiving test process of S75 of FIG. 8. Further, the receiving setting data stored in the sub setting data storage area 56b in S56 of FIG. 7 is utilized in the receiving test process of S150 of FIG. 10 (in the case where PbS (see the setting item 112 of FIG. 4) was selected from among the sending setting data).

Figure 12:
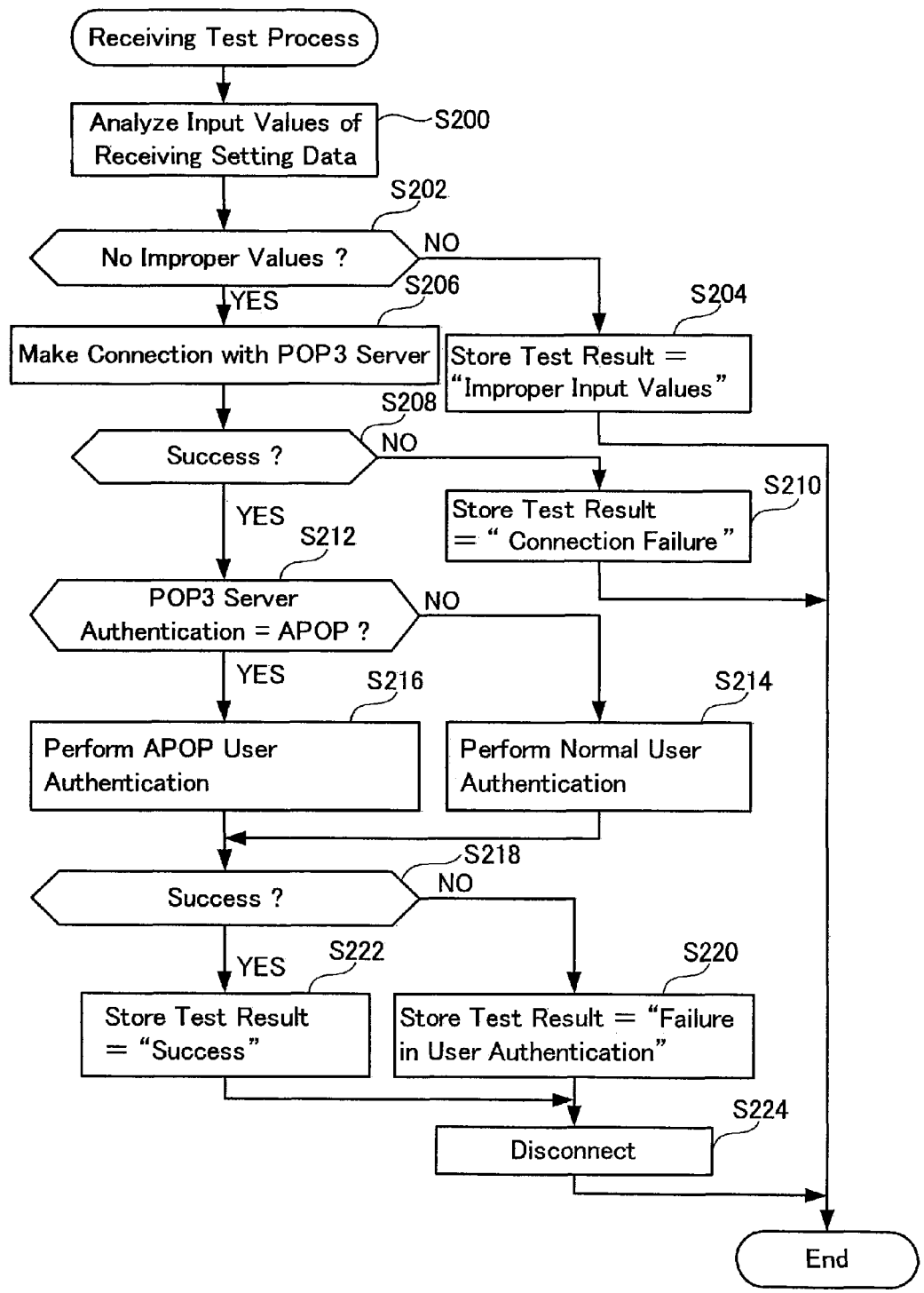
FIG. 12 shows a flow chart of a receiving test process.

FIG. 12 shows a flow chart of the receiving test process. The multi-function device 50 analyzes (S200) the receiving setting data stored in the sub setting data storage area 56b in S61 of FIG. 7 (or S74 of FIG. 8 or S56 of FIG. 7). The multi-function device 50 determines whether improper input values are present in the receiving setting data (S202). In the case where S202 is NO, the multi-function device 50 stores the information "Improper Input Values" as the receiving test result (S204). This information is stored in the temporary storage area 56c. In the case where S202 is YES, the process proceeds to S206. In S206, the multi-function device 50 accesses the POP3 server 80. The multi-function device 50 tries to establish a TCP connection with the POP3 server 80. When this is successful, YES is determined in S208. In the case where S208 is YES, the process proceeds to S212. Alternatively, in the case where the POP3 server 80 is not functioning correctly (for example, in the case where the POP3 server 80 does not answer a SYN/ACK signal), the multi-function device 50 is unable to establish the TCP connection with the POP3 server 80. In this case, S208 is determined to be NO. In the case where S208 is NO, the multi-function device 50 stores the information "POP3 Server Connection Failure" as the sending test result (S210). This information is stored in the temporary storage area 56c. In the case where S208 is YES, the multi-function device 50 determines whether the authentication method included in the receiving setting data is "APOP" (S212). This step is determined as YES in the case where "APOP" was selected in the setting item 136 of FIG. 4, and is determined as NO in the case where "APOP" was not selected. In the case where S212 is NO, the multi-function device 50 executes the normal POP3 authentication process (S214). In the case where S212 is YES, the multi-function device 50 executes the APOP authentication process (S216).

A simple description of the POP3 server user authentication will now be given. The POP3 server 80 executes the user authentication utilizing the user name and the password (the setting items 132 and 134 of FIG. 4) included in the receiving setting data. The multi-function device 50 outputs the user name and password to the POP3 server 80. The user name and password for authorizing e-mail to be received are registered in the POP3 server 80. In the case where the user name and password output from the multi-function device 50 have been registered in the POP3 server 80, the POP3 server 80 authorizes the multi-function device 50 to receive e-mail. POP3 servers include those that are capable of executing both the normal POP3 authentication and the APOP authentication, and those that are capable of executing only normal POP3 authentication. In the APOP authentication, the password output from the multi-function device 50 to the POP3 server 80 is encrypted. As a result, this can be considered an authentication method having a high security level. In the normal POP3 authentication, the password is not encrypted.

In S214, the multi-function device 50 outputs the user name and password included in the receiving setting data to the POP3 server 80. This password is not encrypted. In the case where the user name and password are registered in the POP3 server 80, the POP3 server 80 outputs code showing that the user authentication was successful to the multi-function device 50. In the case where at least one of the user name and password are not registered in the POP3 server 80, the POP3 server 80 outputs code showing that the user authentication failed to the multi-function device 50. In the case where the code showing that the user authentication was successful is input, the multi-function device 50 determines YES in S218. In the case where the code showing that the user authentication failed is input, the multi-function device 50 determines NO in S218.

In S216, the multi-function device 50 outputs the user name and password included in the receiving setting data to the POP3 server 80. This password is encrypted. In the case where the POP3 server 80 cannot execute the APOP authentication (in the case where only the POP3 authentication can be executed), an error code is output to the multi-function device 50. In the case where the error code is input, the multi-function device 50 determines NO in S218. In the case where the user name and password have been registered in the POP3 server 80, the POP3 server 80 outputs code showing that the user authentication was successful to the multi-function device 50. In the case where at least one of the user name and password have not been registered in the POP3 server 80, the POP3 server 80 outputs code showing that the user authentication failed to the multi-function device 50. In the case where the code showing that the user authentication was successful is input, the multi-function device 50 determines YES in S218. In the case where the code showing that the user authentication failed is input, the multi-function device 50 determines NO in S218. In the case where the S218 is NO, the multi-function device 50 stores the information "Failure in User Authentication" as the receiving test result (S220). In the case where the S218 is YES, the multi-function device 50 stores the information "Success" as the receiving test result (S222). The receiving test result is stored in the temporary storage area 56c. When the multi-function device 50 has executed the process of S220 or S222, the connection with the POP3 server 80 is disconnected (S224).

As described above, the multi-function device 50 outputs the receiving test result to the terminal device 70 when the receiving test process ends (S63 of FIG. 7 or S76 of FIG. 8). The information stored as the receiving test result is any out of: "Improper Input Values" (S204), "POP3 Server Connection Failure" (S210), "Failure in User Authentication" (S220), and "Success" (S222). The information corresponding to the receiving test result is displayed on the display 74 (see FIG. 2) of the terminal device 70. The user can thus learn the receiving test result. In particular, in the case where the receiving test failed, the reason for this is displayed. The user can consequently improve the receiving test data based on the reason for failure.

In the multi-function device 50 of the present embodiment, it is possible to perform e-mail communication by utilizing the main communication setting data. The user can store the sub communication setting data in the multi-function device 50. The multi-function device 50 can test (perform the receiving test and/or the sending test) whether the sub communication setting data is data that functions correctly. The user can test new communication setting data before saving it in the main setting data storage area 56a. For example, in the case where a test result is obtained confirming that the new communication setting data is not data that functions correctly, the user can prevent this communication setting data from being stored in the main setting data storage area 56a. According to the multi-function device 50 of the present embodiment, it is possible to suppress the phenomenon where communication setting data that does not function correctly is stored in the main setting data storage area 56a. As a result, it is possible to suppress the phenomenon where the multi-function device 50 becomes unable to execute the e-mail communication function.

In the multi-function device 50 of the present embodiment, the e-mail sending process (S51 of FIG. 7), the e-mail receiving process (S53), the sending test process (S57 or S70), and the receiving test process (S62 or S75) are executed by the single controller 54. If only the flow charts of FIG. 7 and FIG. 8 are viewed, the controller 54 appears to execute the above processes serially. However, the controller 54 of the present embodiment is programmed such that if an e-mail sending instruction or e-mail receiving instruction is input while the controller is executing the sending test process (S57 or S70) or the receiving test process (S62 or S75), this test process will be interrupted, and the e-mail sending process (S51) or the e-mail receiving process (S53) will be executed. That is, the multi-function device 50 can also execute e-mail communication during the period between the test process starting and ending.

The multi-function device 50 is shared by a plurality of terminal devices. For example, the multi-function device 50 may be commanded by a first terminal device (for example, 70) to execute a test process, and may be commanded by a second terminal device to execute an e-mail communication while the multi-function device 50 is executing this test process. In this case, also, the multi-function device 50 can execute the e-mail communication based on the command from the second terminal device.

Further, after executing a communication test (sending test, sending retest, receiving test, or receiving retest) on the communication setting data (the sending setting data or the receiving setting data) stored in the sub setting data storage area 56b, the multi-function device 50 continues to continuously utilize the communication setting data stored in the main setting data storage area 56a. The multi-function device 50 is capable of automatically utilizing the communication setting data stored in the main setting data storage area 56a after the test result has been obtained without the user performing an operation to command the utilization of this communication setting data.

Next, other embodiments will be described. FIG. 13 shows a summary of the other embodiments. In the first embodiment, the communication setting data that has been tested is stored by the terminal device 70. As a result, "Terminal Device" is written in the column "Device for Storing Test Setting Data" in FIG. 13. Further, in the first embodiment, the terminal device 70 continuously stored only one pattern of the communication setting data (the sending setting data and the receiving setting data). As a result, "1" is written in the column "Number of Patterns" in FIG. 13. The embodiments described below can be understood easily with reference to FIG. 13.

Second Embodiment

In the first embodiment, the storage 77 (see FIG. 2) of the terminal device 70 stores the sending setting data that has most recently undergone the sending test, but does not store the sending setting data that was tested prior to this. By contrast, the storage 77 of the present embodiment cumulatively stores a plurality of patterns of the sending setting data that have undergone the sending test (this may be all the patterns, or there may be an upper limit on the number of patterns). Further, in the first embodiment, the storage 77 stores the receiving setting data that has most recently undergone the receiving test, but does not store the receiving setting data that was tested prior to this. The storage 77 of the present embodiment cumulatively stores a plurality of the patterns of the receiving setting data that have undergone the receiving test (this may be all the patterns, or there may be an upper limit on the number of patterns).

(Main Process of the Terminal Device)

Figure 14:
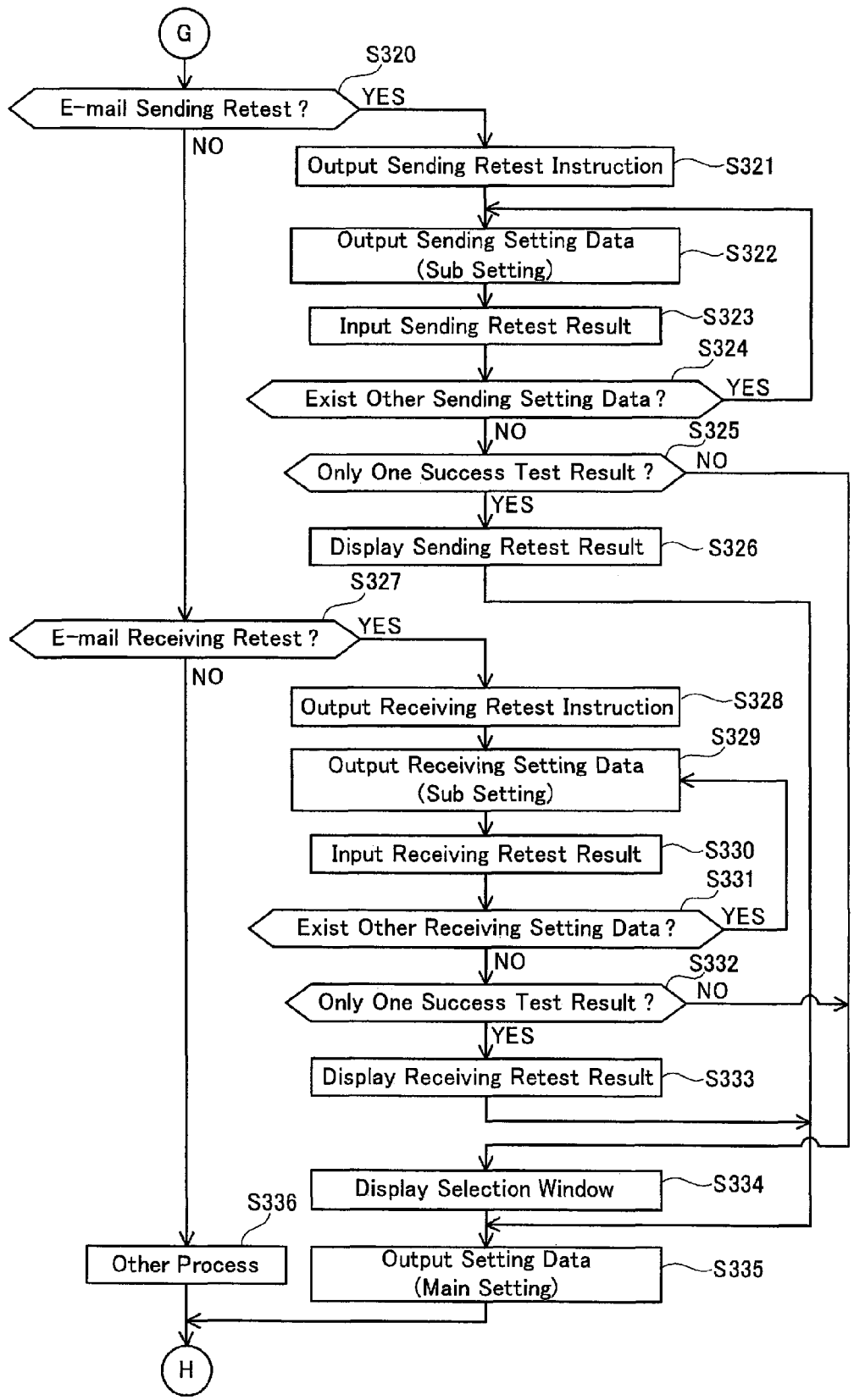
FIG. 14 shows a flow chart of a main process of the terminal device (second embodiment).

In the present embodiment, the contents of the main process of the terminal device 70 differ from those of the first embodiment. In particular, the contents of the process after S19 (the process of FIG. 6) differ from those of the first embodiment. FIG. 14 shows a flow chart of the main process of the terminal device 70 after S19. S320 to S323 of FIG. 14 are the same as S20 to S23 of FIG. 6. Therefore, a description of S320 to S323 will be omitted. In S324, it is determined whether other stored sending setting data is present. The storage 77 is storing a plurality of the patterns of the sending setting data that have undergone the sending test. In S322, one pattern of the sending setting data is output to the multi-function device 50. In S324, it is determined whether sending setting data that was not output in S322 is present. In the case where this is YES, the terminal device 70 returns to S322, and outputs the sending setting data that has not been output to the multi-function device 50.

In the case where S324 is NO, this means that all of the patterns of the sending setting data stored in the storage 77 have been output to the multi-function device 50. In the case where S324 is NO, the multi-function device 50 determines whether the sending setting data that had the sending retest result "Success in Sending" was only one pattern of the sending setting data (S325). In the case where the sending setting data that had the sending retest result "Success in Sending" was two or more patterns (in the case where S325 is NO), the process proceeds to S334. The contents of S334 will be described later. Further, in the case where there was no pattern of the sending setting data that had the sending retest result "Success in Sending", NO is determined in S325. In this case, the terminal device 70 displays the sending retest result, and skips S334 and S335. Alternatively, in the case where S325 is YES, the sending retest result is displayed (S326).

Figure 15:
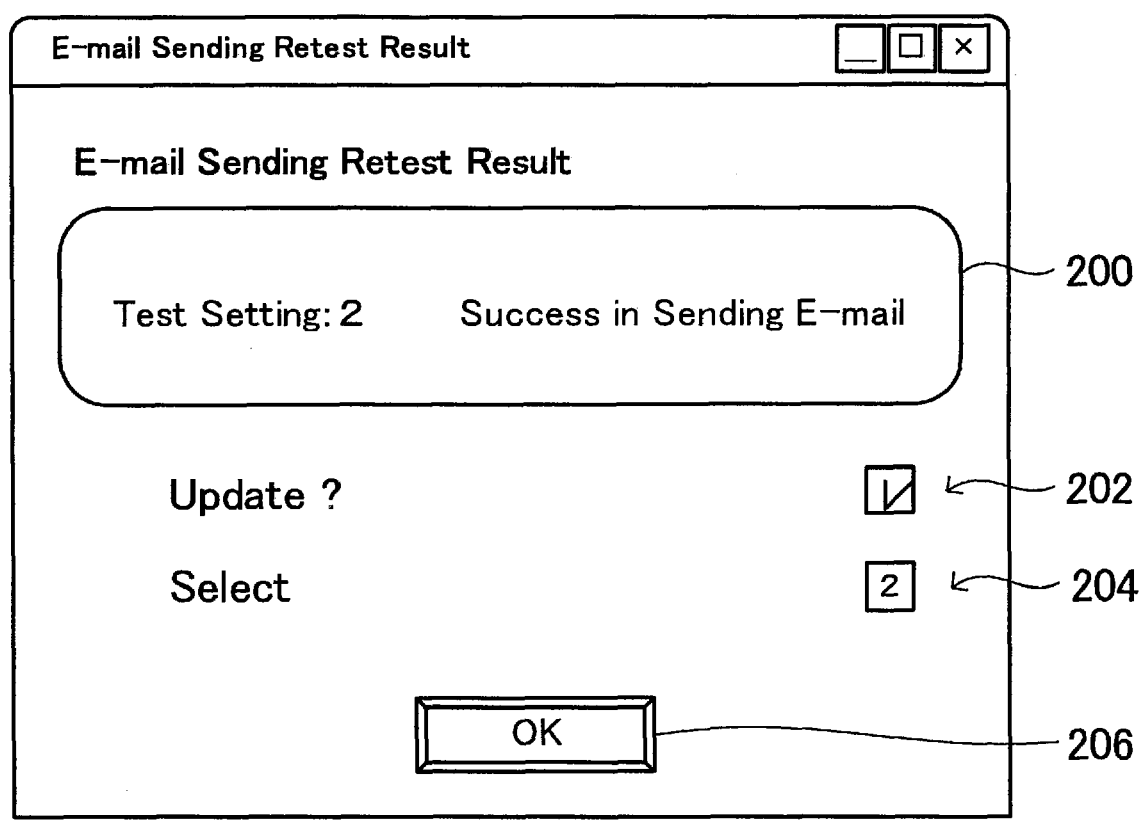
FIG. 15 shows an example of a display showing a sending retest result.

FIG. 15 shows an example of a display screen displayed in S326. This display screen includes a region 200 that displays a number specifying sending setting data that had a good test result, a box 202 for commanding the sending setting data to be updated, a select box 204, and an OK button 206. When the box 202 is checked, the number displayed in the region 200 is displayed in the select box 204. If, in this state, the OK button 206 is clicked on, S335 of FIG. 14 is executed. In S335, the sending setting data displayed in the region 200 is output to the multi-function device 50. Code specifying that this is for the main setting is added to the sending setting data. As a result, the multi-function device 50 stores the sending setting data that was output in S335 in the main setting data storage area 56a. The sending setting data in the main setting data storage area 56a is thus updated. Moreover, in the case where the OK button 206 is clicked on in the state where the box 202 of FIG. 15 has not been checked, S335 is skipped. The box 202 of FIG. 15 may equally well not be displayed. In the case where only one pattern of the sending setting data had the sending retest result "Success in Sending", this sending setting data will be output to the multi-function device 50. In this case, the sending setting data in the main setting data storage area 56a will be updated.

Although S327 to S333 of FIG. 14 differ from S320 to S326 in being for the process for the receiving retest, the contents of that process are substantially the same as S320 to S326. Therefore, a description of S327 to S333 will be omitted. Next, the contents of S334 executed after S325 or S332 will be described. Below, the contents of S334 executed after S332 will be described.

Figure 16:
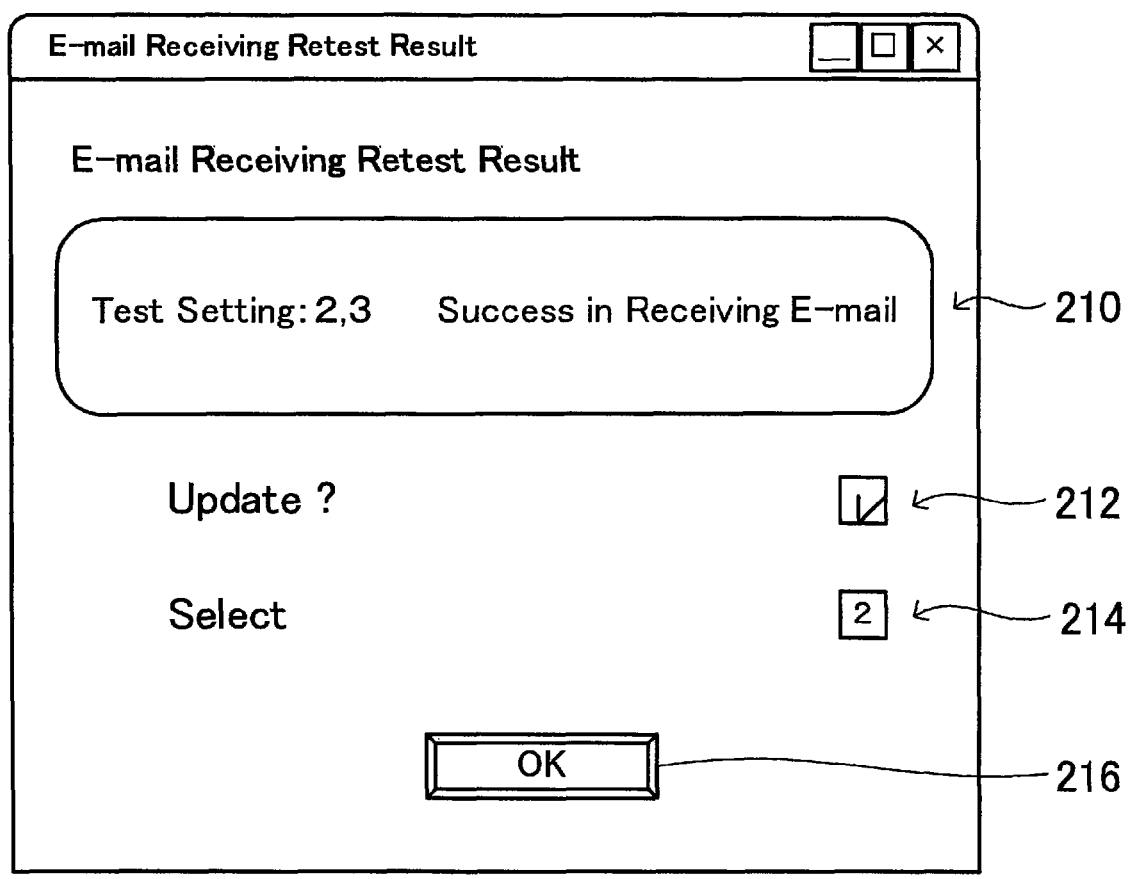
FIG. 16 shows an example of a display showing a sending retest result.

FIG. 16 shows an example of a display screen displayed in S334. This display screen includes a region 210 that displays a number specifying receiving setting data that had a good test result, a box 212 for commanding the receiving setting data to be updated, a select box 214, and an OK button 216. The user selects a number displayed in the select box 214 while the box 212 is in a checked state. Any of the numbers displayed in the region 210 can be selected in the select box 214. If the OK button 216 is clicked on, the process of S335 is executed. In S335, the number of the receiving setting data selected in the select box 214 is output to the multi-function device 50. Code specifying that this is for the main setting is added to the receiving setting data. The multi-function device 50 stores the receiving setting data that was output in S335 in the main setting data storage area 56a. The receiving setting data in the main setting data storage area 56a is thus updated. Moreover, in the case where the OK button 216 is clicked on in the state where the box 212 of FIG. 16 has not been checked, the process of S335 is skipped.

Third Embodiment

As with the second embodiment, the storage 77 (see FIG. 2) of the present embodiment cumulatively stores a plurality of patterns of the communication setting data (the sending setting data and the receiving setting data) that have undergone testing. Moreover, with the terminal device 70 of the second embodiment, when the retest instruction (the sending retest instruction or the receiving retest instruction) is input, all of the communication setting data that has undergone testing is output to the multi-function device 50 (see FIG. 14). By contrast, the terminal device 70 of the present embodiment outputs only one selected pattern of the communication setting data to the multi-function device 50. The multi-function device 50 retests the selected pattern of communication setting data.

Figure 17:
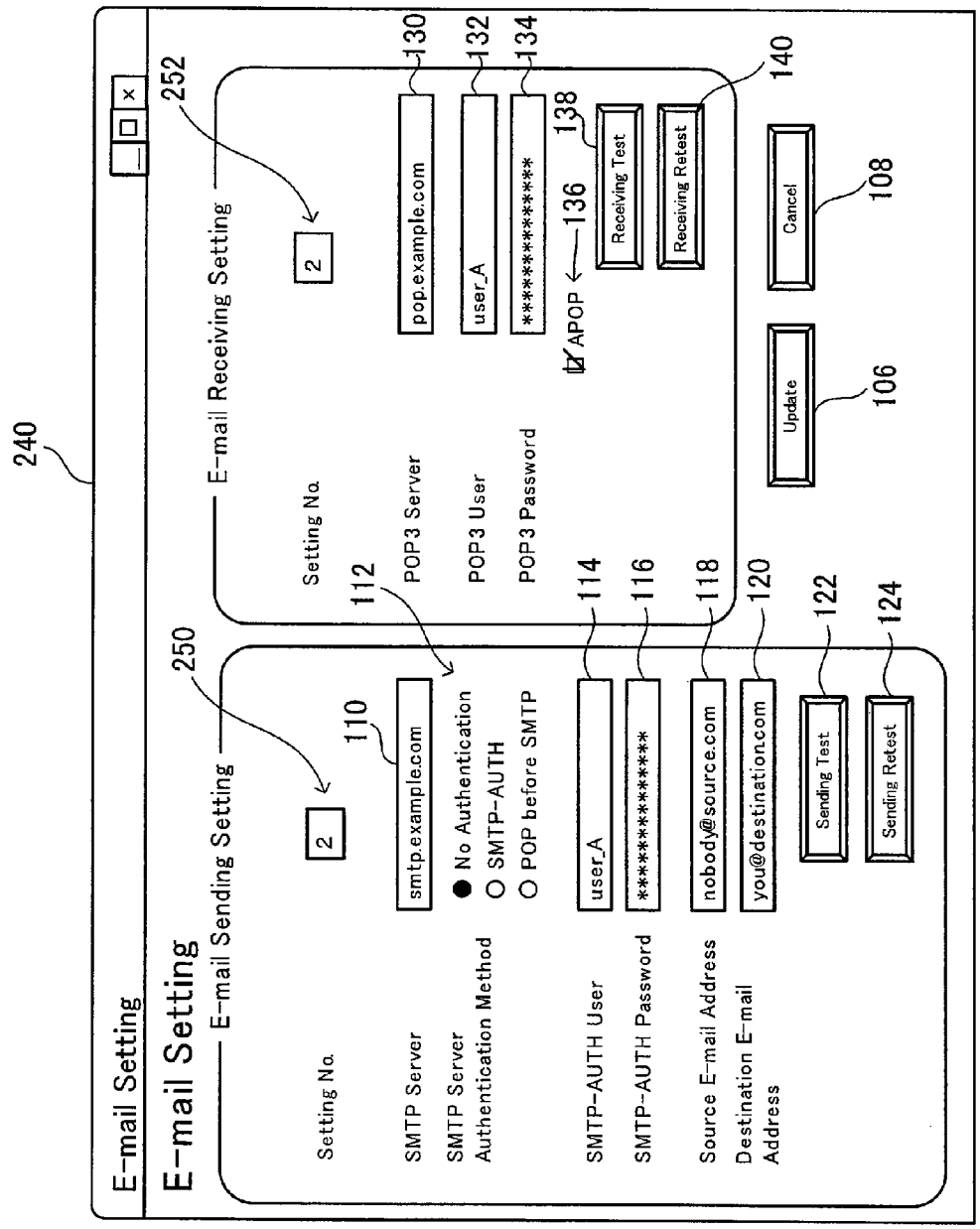
FIG. 17 shows a window for inputting communication setting data (third embodiment).

FIG. 17 shows an example of a window 240 displayed on the terminal device 70 of the present embodiment. The window 240 is substantially the same as the window 100 of FIG. 4. The window 240 differs from the window 100 of FIG. 4 on the issue of having boxes 250 and 252. When a number is entered into the box 250, the terminal device 70 displays the sending setting data (sending setting data that has undergone the sending test) corresponding to that number in the setting items 110 to 120. The user can verify the contents of the sending setting data that has undergone the sending test. When, in this state, the sending retest button 124 is clicked on, the sending setting data displayed in the setting items 110 to 120 is output to the multi-function device 50. The multi-function device 50 executes the sending retest based on the sending setting data output from the terminal device 70.

When a number is entered into the box 252, the terminal device 70 displays the receiving setting data (receiving setting data that has undergone the receiving test) corresponding to that number in the setting items 130 to 136. When, in this state, the receiving retest button 140 is clicked on, the receiving setting data displayed in the setting items 130 to 136 is output to the multi-function device 50. The multi-function device 50 executes the receiving retest based on the receiving setting data output from the terminal device 70.

Fourth Embodiment

In the first embodiment, the communication setting data that has been tested is stored by the terminal device 70. In the present embodiment, by contrast, the communication setting data that has been tested is stored by the multi-function device 50. The multi-function device 50 stores the communication setting data has most recently undergone testing. The sub setting data storage area 56b of the multi-function device 50 serves both as a storage region for storing the sending setting data while testing is being executed, and as a storage region for continuously storing the sending setting data after the testing.

(Main Process of the Terminal Device)

Figure 18:
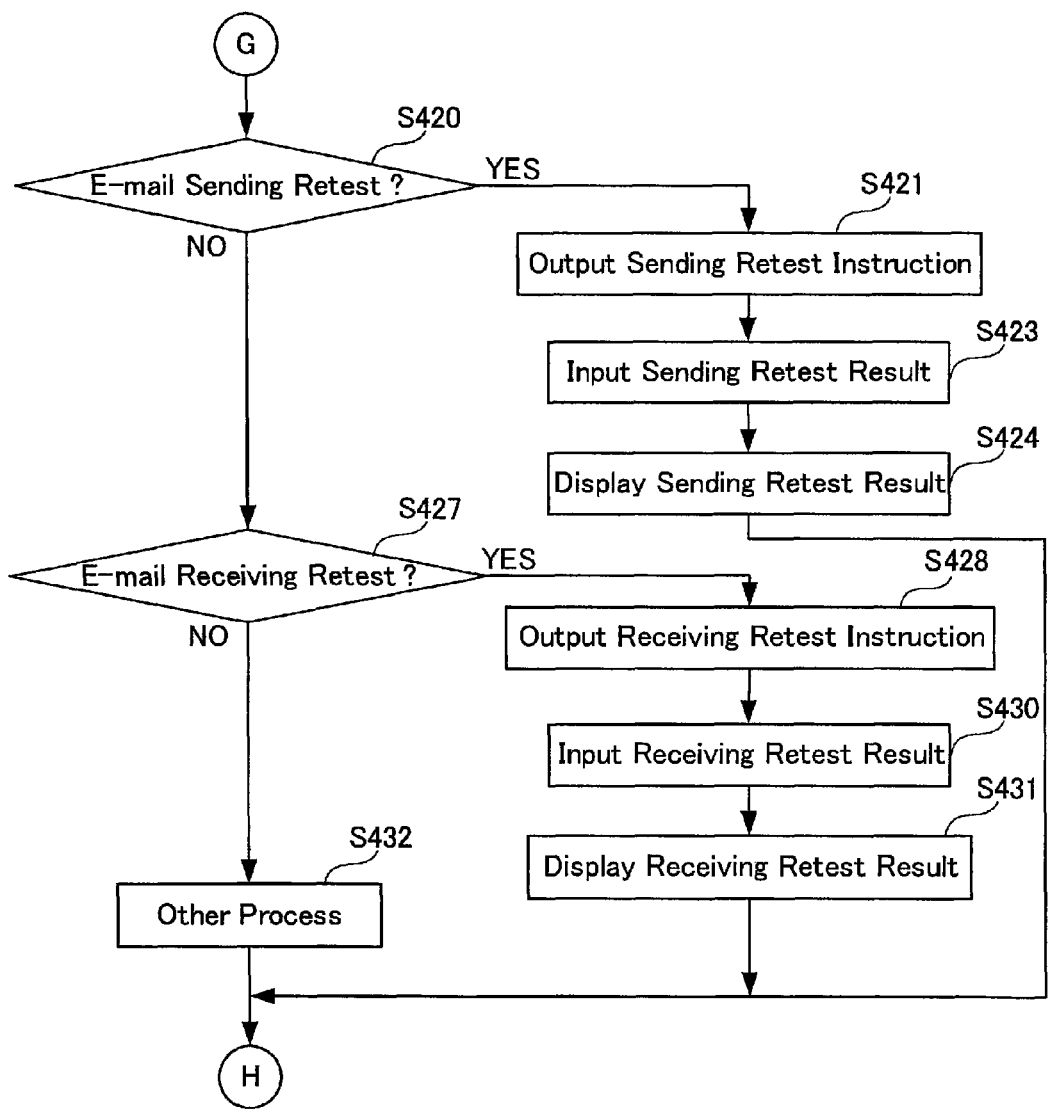
FIG. 18 shows a flow chart of a main process of the terminal device (fourth embodiment).

In the present embodiment, the contents of the main process of the terminal device 70 differ from those of the first embodiment. In particular, the contents of the process after S19 (the process of FIG. 6) differ from those of the first embodiment. FIG. 18 shows a flow chart of the main process of the terminal device after S19. S420 to S424 of FIG. 18 are substantially the same as S20 to S24 of FIG. 6. However, the process of outputting the sending setting data between S421 to S423 (a process equivalent to S22 of FIG. 6) is not executed in the present embodiment. This is because the terminal device 70 is not storing the sending setting data that has undergone the sending test. Further, S427 to S432 are substantially the same as S25 to S30 of FIG. 6. However, the process of outputting the receiving setting data between S428 to S430 (a process equivalent to S27 of FIG. 6) is not executed in the present embodiment. This is because the terminal device 70 is not storing the receiving setting data that has undergone the receiving test. Moreover, in the present embodiment, the user of the terminal device 70 can input an instruction to the terminal device 70 commanding the contents stored in the main setting data storage area 56a of the multi-function device 50 to be updated. In this case, the terminal device 70 outputs the setting change instruction to the multi-function device 50. Even though the terminal device 70 outputs the setting change instruction, it does not output the communication setting data. This issue differs from the setting update instruction (S17, S18 of FIG. 5).

(Main Process of the Multi-Function Device)

Figure 19:
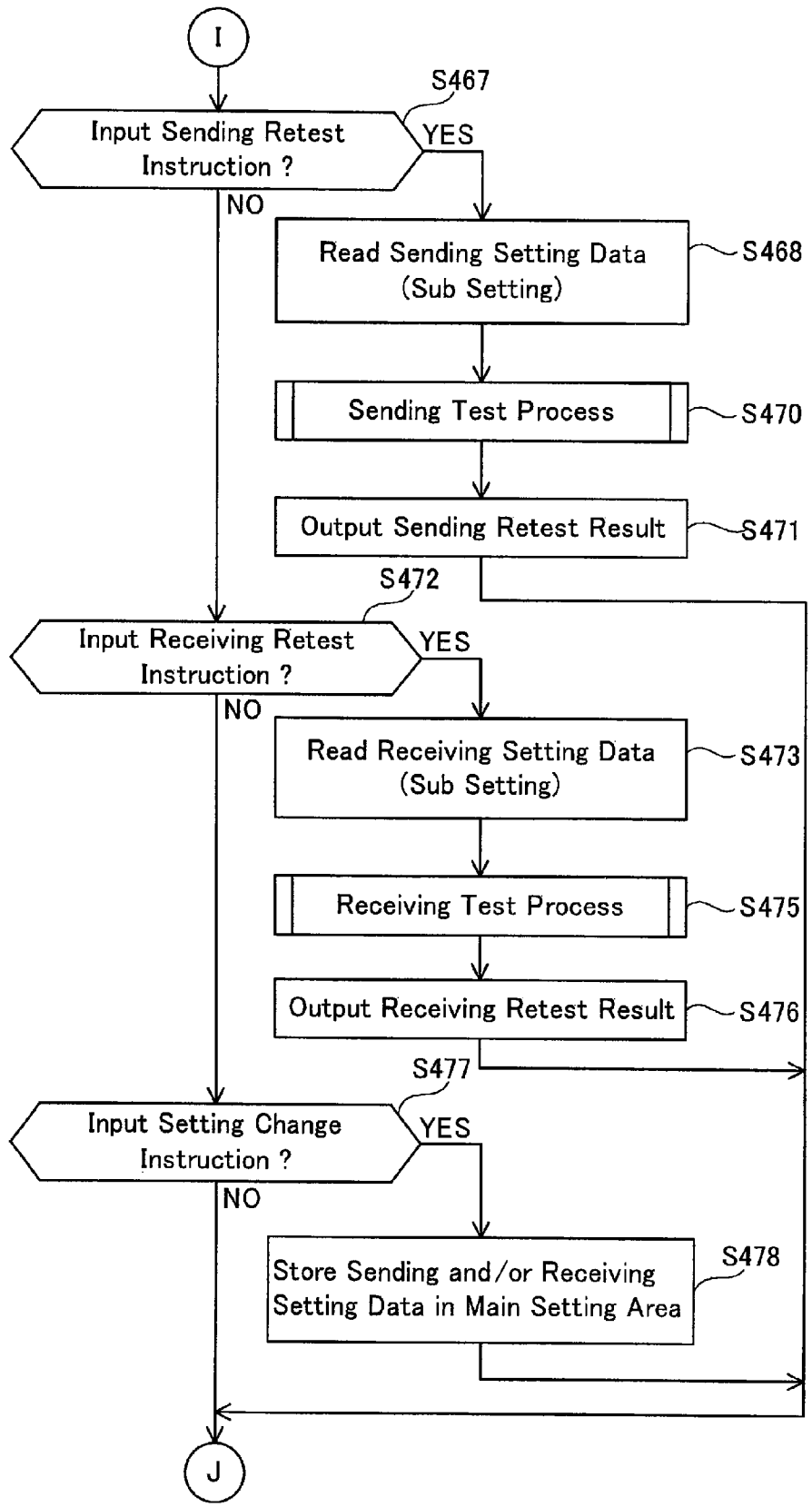
FIG. 19 shows a flow chart of a main process of the multi-function device.

In the present embodiment, the contents of the main process of the multi-function device 50 differ from those of the first embodiment. In particular, the contents of the process after S66 (the process of FIG. 8) differ from those of the first embodiment. FIG. 19 shows a flow chart of the main process of the multi-function device after S66. When the sending retest instruction is input to the multi-function device 50 (in the case where S467 is YES), the multi-function device 50 reads the sending setting data being stored in the sub setting data storage area 56b (S468). Next, the multi-function device 50 executes the sending test process (S470) utilizing the sending setting data read in S468. S470 and S471 are the same as S70 and S71 of FIG. 8. Although S472 to S476 differ from S467 to S471 in being a process for the receiving retest, the contents of the process are substantially the same as S467 to S471. Therefore, a description of S472 to S476 is omitted. The multi-function device 50 monitors whether the setting change instruction has been input (S477). In the case where S477 is YES, the multi-function device causes the communication setting data that was being stored in the sub setting data storage area 56b to be stored in the main setting data storage area 56a (S478). The communication setting data in the main setting data storage area 56a is thus updated. The setting change instruction may be a command to update only the sending setting data, a command to update only the receiving setting data, or a command to update both. The multi-function device 50 updates the sending setting data and/or the receiving setting data in the main setting data storage area 56a based on the setting change instruction that was input.

Fifth Embodiment

In the aforementioned embodiments, the user input the retest instruction to the terminal device 70. In this case, the retest instruction is output from the terminal device 70 to the multi-function device 50, and the retest is executed by the multi-function device 50. By contrast, in the present embodiment, the retest instruction is input directly to the multi-function device 50 by the user operating the operation device 60 (see FIG. 2) of the multi-function device 50.

Figure 20:
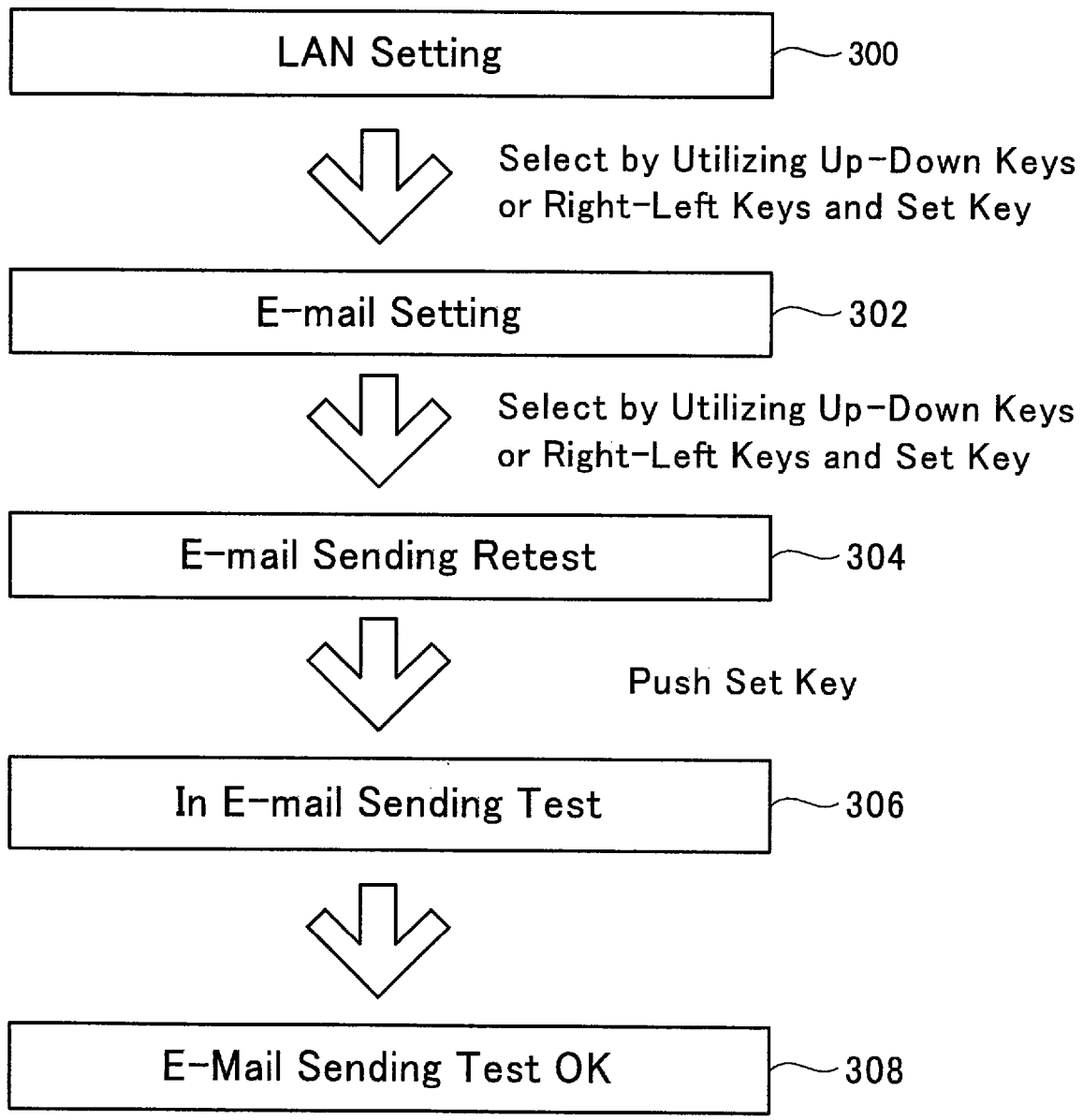
FIG. 20 shows change between display screens of the multi-function device.

FIG. 20 shows how the display contents change of the display 58 (see FIG. 2) of the multi-function device 50 when the retest instruction is input to the multi-function device 50. When the operation device 60 of the multi-function device 50 is operated, "LAN Setting" is displayed (reference number 300). When the operation device 60 is operated again, "E-mail Setting" is displayed (reference number 302). When the operation device 60 is operated again, "E-mail Sending Retest" is displayed (reference number 304). When, in this state, a set key of the operation device 60 is operated, the sending retest instruction is input to the multi-function device 50. The sending test is thus executed. "In E-mail Sending Test" is displayed (reference number 306) while the sending test is being executed. When the sending test ends, the sending test result (sending retest result) is displayed. In the example in FIG. 20, "E-mail Sending Test OK" is displayed (reference number 308). In FIG. 20 an example is described where the sending retest instruction was input. However, the receiving retest instruction is input in the same manner.

(Main Process of the Multi-Function Device)

Figure 21:
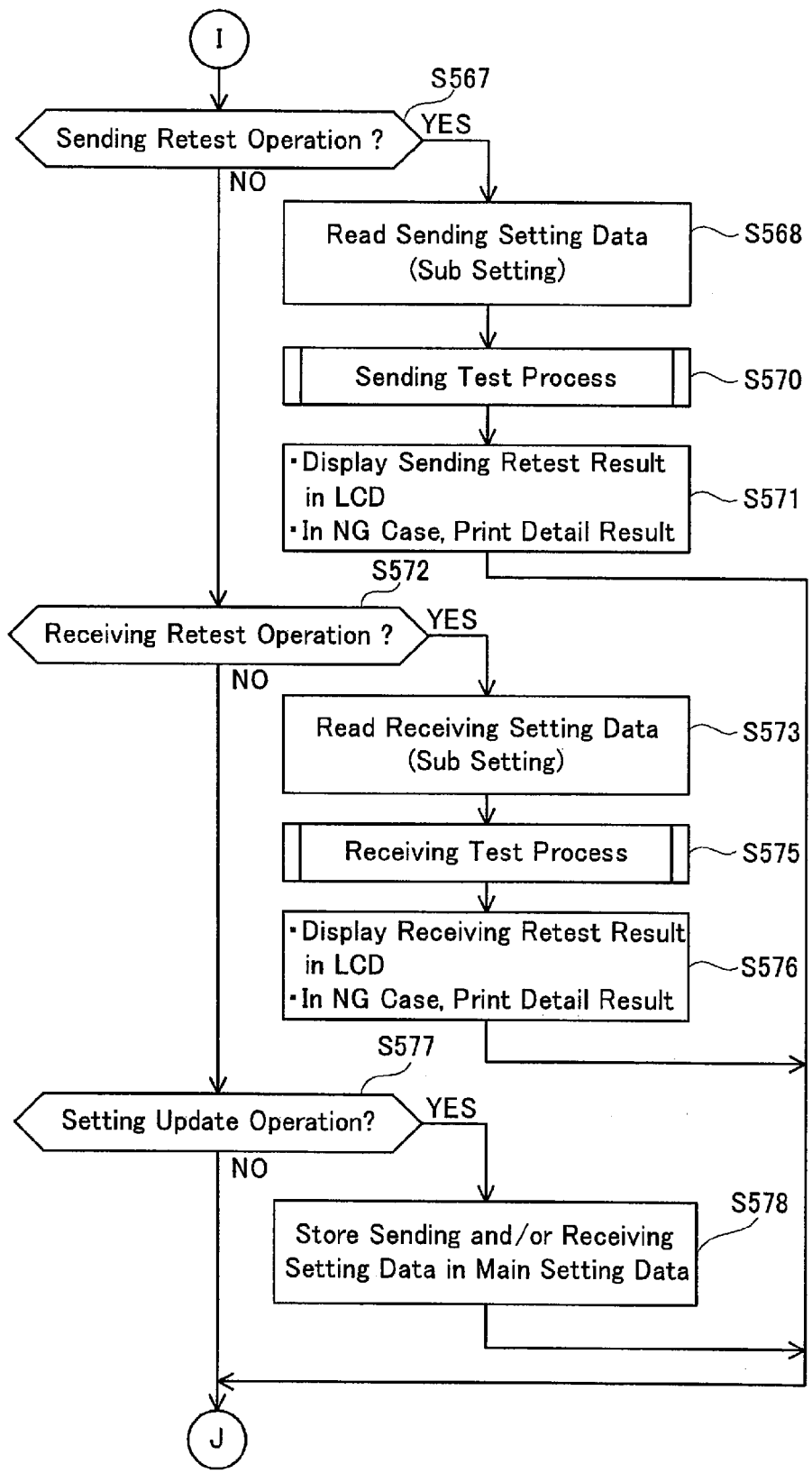
FIG. 21 shows a flow chart of a main process of the multi-function device (fifth embodiment).

In the present embodiment, the contents of the main process of the multi-function device 50 differ from those of the first embodiment. In particular, the contents of the process after S66 (the process of FIG. 8) differ from those of the first embodiment. FIG. 21 shows a flow chart of the main process of the multi-function device after S66. The multi-function device 50 monitors whether the sending retest operation has been executed by the user (S567). That is, the multi-function device 50 monitors whether the sending retest instruction has been input by operating the operation device 60. In the case where S567 is YES, the process proceeds to S568. S568 and S570 are the same as S468 and S470 of FIG. 19. In S571, the sending retest result is displayed (see the reference number 308 of FIG. 20) in the display 58 (see FIG. 2). In the case where the sending retest result is not good, the contents of the sending retest result (the reason for failure) are printed by the printing device 62 (see FIG. 2). Although S572 to S576 differ from S567 to S571 in being a process for the receiving retest, the contents of the process are substantially the same as S567 to S571. Therefore, a description of S572 to S576 is omitted. The user can update the contents stored in the main setting data storage area 56a by operating the operation device 60 of the multi-function device 50. The multi-function device 50 monitors whether the setting update operation has been executed by the user (S577). In the case where S577 is YES, the multi-function device 50 causes the communication setting data that was being stored in the sub setting data storage area 56b to be stored in the main setting data storage area 56a

(S578). The communication setting data in the main setting data storage area 56a is thus updated. S578 is the same as S478 of FIG. 19.

Sixth Embodiment

The sub setting data storage area 56b of the multi-function device 50 cumulatively stores a plurality of patterns of the communication setting data that have undergone testing. In the present embodiment, the retest instruction is output from the terminal device 70 to the multi-function device 50. When the retest instruction is input, the multi-function device 50 retests all the communication setting data.

(Main Process of the Terminal Device)

Figure 22:
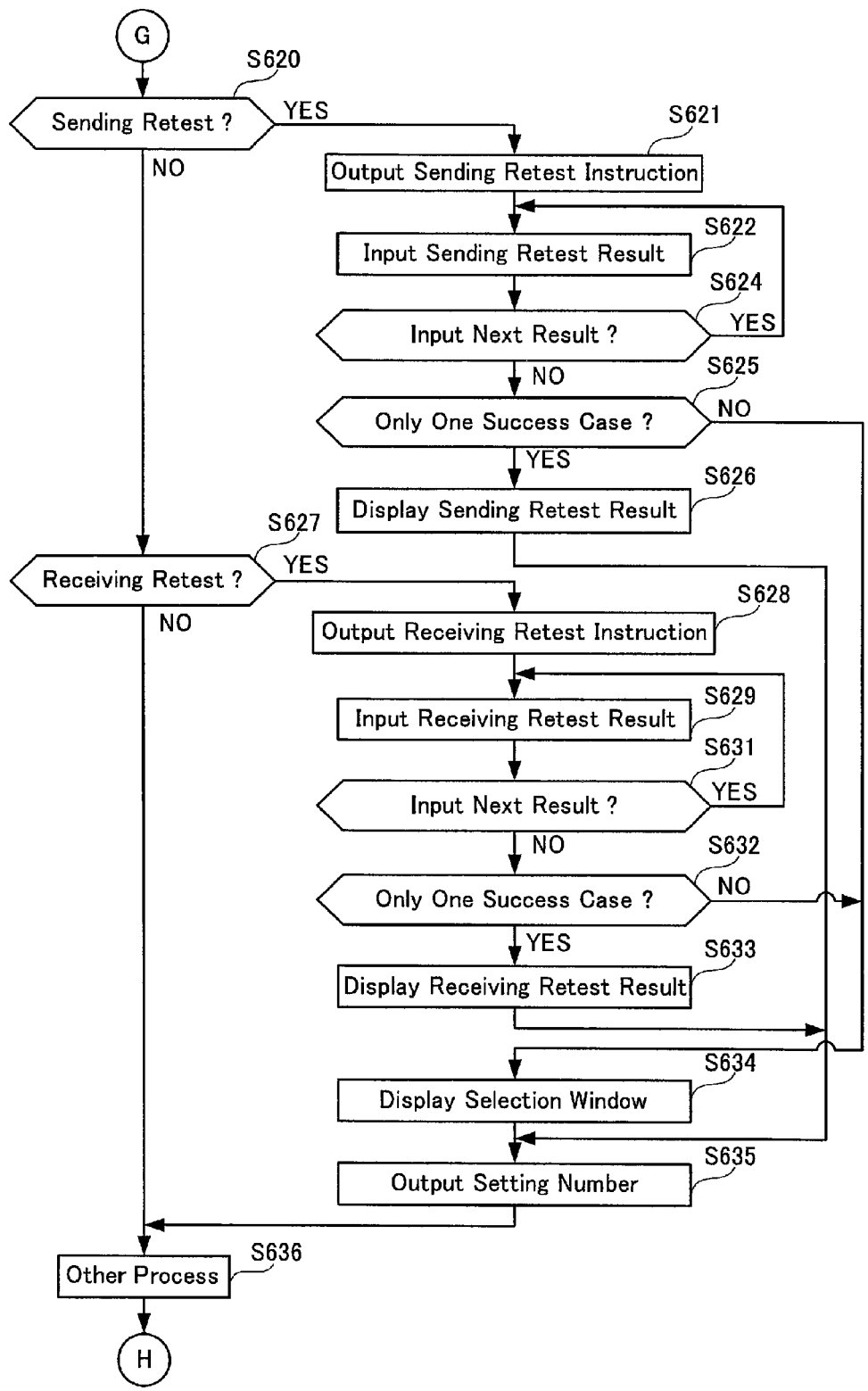
FIG. 22 shows a flow chart of a main process of the terminal device (sixth embodiment).

In the present embodiment, the contents of the main process of the terminal device 70 differ from those of the first embodiment. In particular, the contents of the process after S19 (the process of FIG. 6) differ from those of the first embodiment. FIG. 22 shows a flow chart of the main process of the terminal device after S19. In the case where S620 of FIG. 22 is YES, the terminal device 70 outputs the sending retest instruction to the multi-function device 50 (S621). Next, the terminal device 70 inputs the sending retest result (S622). The terminal device 70 determines whether the next sending retest result has been input (S624). In the case where S624 is YES, the process returns to S622. In the case where S624 is NO, this means that all the sending retest results have been input. In the case where S624 is NO, the multi-function device 50 determines whether the sending setting data having the sending retest result "Success in Sending" was only one pattern (S625). In the case where there were two or more patterns of sending setting data having the sending retest result "Success in Sending" (in the case where S625 is NO), the process proceeds to S634. Moreover, in the case where there was no sending setting data having the sending retest result "Success in Sending", S625 is determined as NO. In this case, the terminal device 70 displays the sending retest result, and skips S634 and S635. In S634, setting numbers corresponding to the two or more patterns of the sending setting data that had good sending retest results are displayed. For example, the display screen shown in FIG. 16 is displayed. The terminal device 70 outputs the setting number selected by the user to the multi-function device 50 (S635). The multi-function device 50 thus stores the sending setting data corresponding to the setting number in the main setting data storage area 56a. In the case where S625 is YES, the terminal device 70 displays the setting number corresponding to the one pattern of the sending setting data that had a good sending retest result (S626). For example, the display screen shown in FIG. 15 is displayed. The terminal device 70 outputs this setting number to the multi-function device 50 (S635). Although S627 to S633 differ from S620 to S626 in being a process for the receiving retest, the contents of the process are substantially the same as S620 to S626. Therefore, a description of S627 to S633 is omitted.

(Main Process of the Multi-Function Device)

Figure 23:
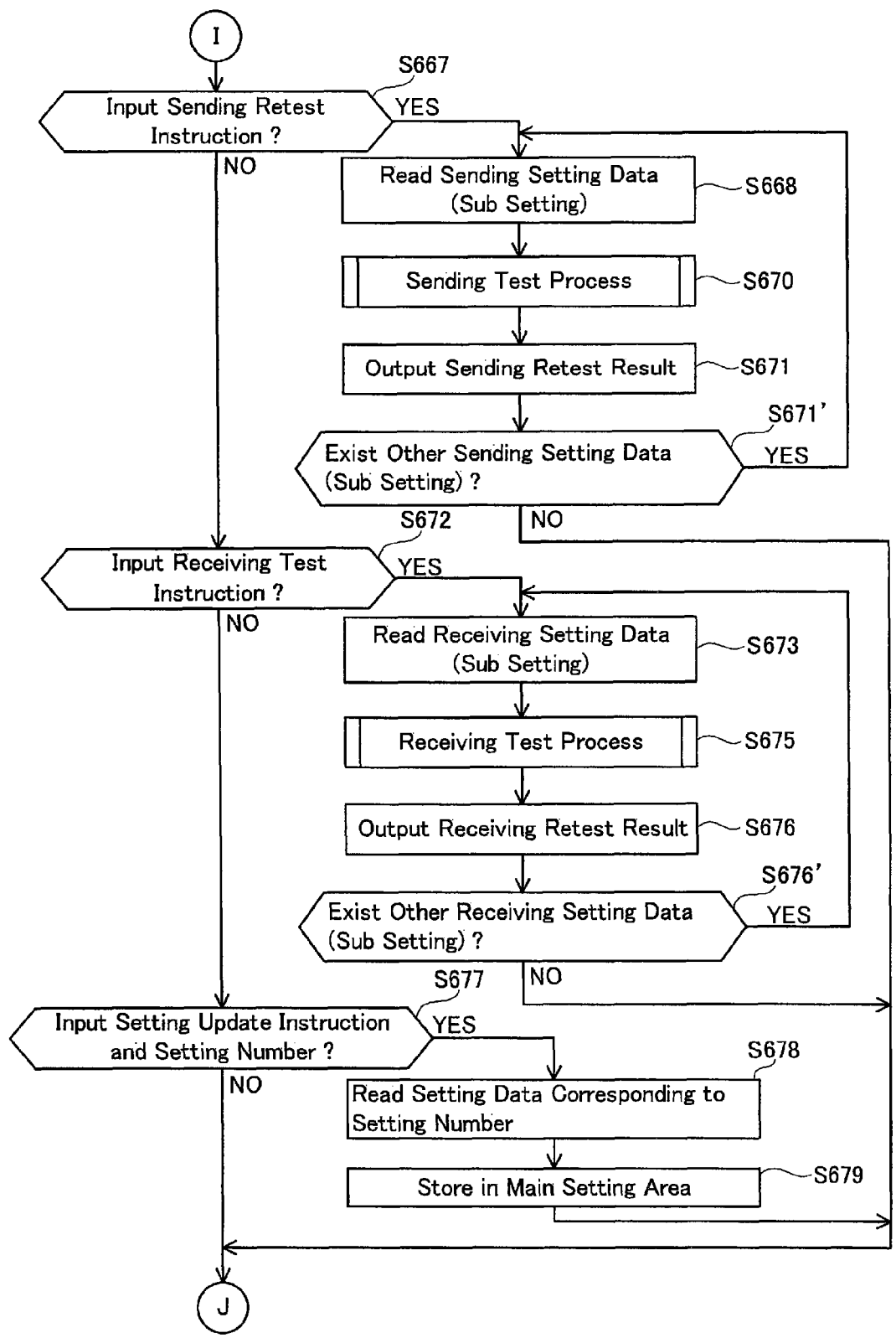
FIG. 23 shows a flow chart of a main process of the multi-function device.

In the present embodiment, the contents of the main process of the multi-function device 50 differ from those of the first embodiment. In particular, the contents of the process after S66 (the process of FIG. 8) differ from those of the first embodiment. FIG. 23 shows a flow chart of the main process of the multi-function device after S66. S667 to S671 are the same as S467 to S471 of FIG. 19. The multi-function device 50 determines whether the sending setting data not read in S668 is present in the sub setting data storage area 56b (S671'). In the case where S671' is YES, the process returns to S668, and the other sending setting data is read. In the case where S671' is NO, this means that the sending retest has been executed for all the sending setting data. Although S672 to S676' differ from S667 to S671' in being a process for the receiving retest, the contents of the process are substantially the same as S667 to S671'. Therefore, a description of S672 to S676' is omitted. The multi-function device 50 monitors whether the setting number output from the terminal device 70 in S635 of FIG. 22 has been input (S677). In the case where S677 is YES, the multi-function device 50 reads the sending setting data or the receiving setting data corresponding to the input setting number from the sub setting data storage area 56b (S678). Next, the multi-function device 50 causes the sending setting data or the receiving setting data that was read in S678 to be stored in the main setting data storage area 56a (S679). The sending setting data or the receiving setting data of the main setting data storage area 56a is thus updated.

Seventh Embodiment

The sub setting data storage area 56b of the multi-function device 50 cumulatively stores a plurality of patterns of the communication setting data that have undergone testing. Further, in the present embodiment, the user inputs the retest instruction to the terminal device 70. The user can select one pattern of the communication setting data to be retested. The terminal device 70 outputs the setting number corresponding to the selected communication setting data to the multi-function device 50. The multi-function device 50 executes the retest of the communication setting data that was selected.

(Main Process of the Terminal Device)

Figure 24:
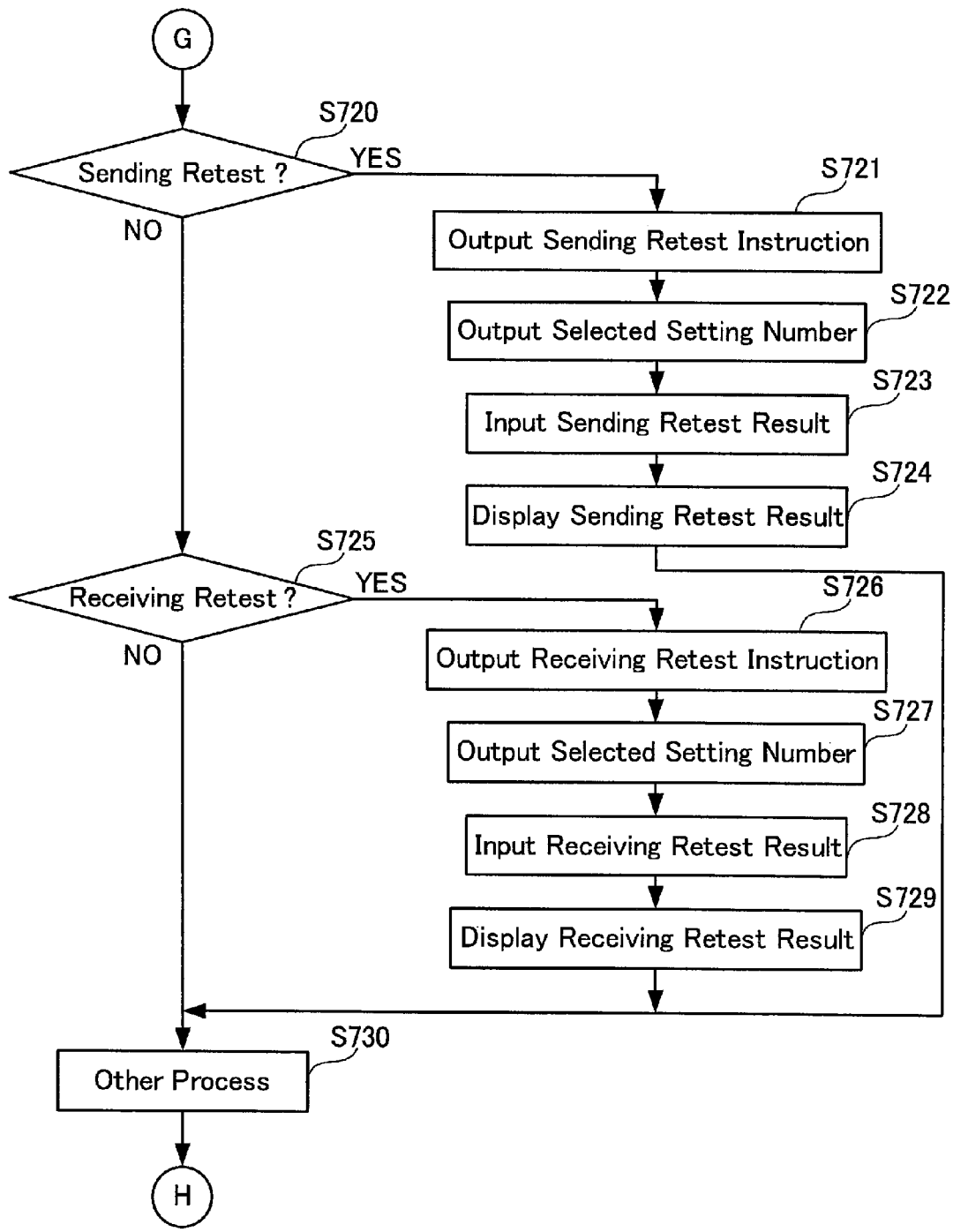
FIG. 24 shows a flow chart of a main process of the terminal device (seventh embodiment).

In the present embodiment, the contents of the main process of the terminal device 70 differ from those of the first embodiment. In particular, the contents of the process after S19 (the process of FIG. 6) differ from those of the first embodiment. FIG. 24 shows a flow chart of the main process of the terminal device after S19. S720 to S724 is substantially the same as S20 to S24 of FIG. 6. However, in the present embodiment, instead of executing the process of outputting the sending setting data (S22), the setting number corresponding to the sending setting data selected by the user is output to the multi-function device 50 (S722). Further, S725 to S730 is substantially the same as S25 to S30 of FIG. 6. However, in the present embodiment, instead of executing the process of outputting the receiving setting data (S27), the setting number corresponding to the receiving setting data selected by the user is output to the multi-function device 50 (S727). Moreover, in the present embodiment, the user of the terminal device 70 can input an instruction commanding that the contents are updated that are stored in the main setting data storage area 56a of the multi-function device 50. In this case, the terminal device 70 outputs the setting number of the communication setting data and the setting update instruction to the multi-function device 50.

(Main Process of the Multi-Function Device)

Figure 25:
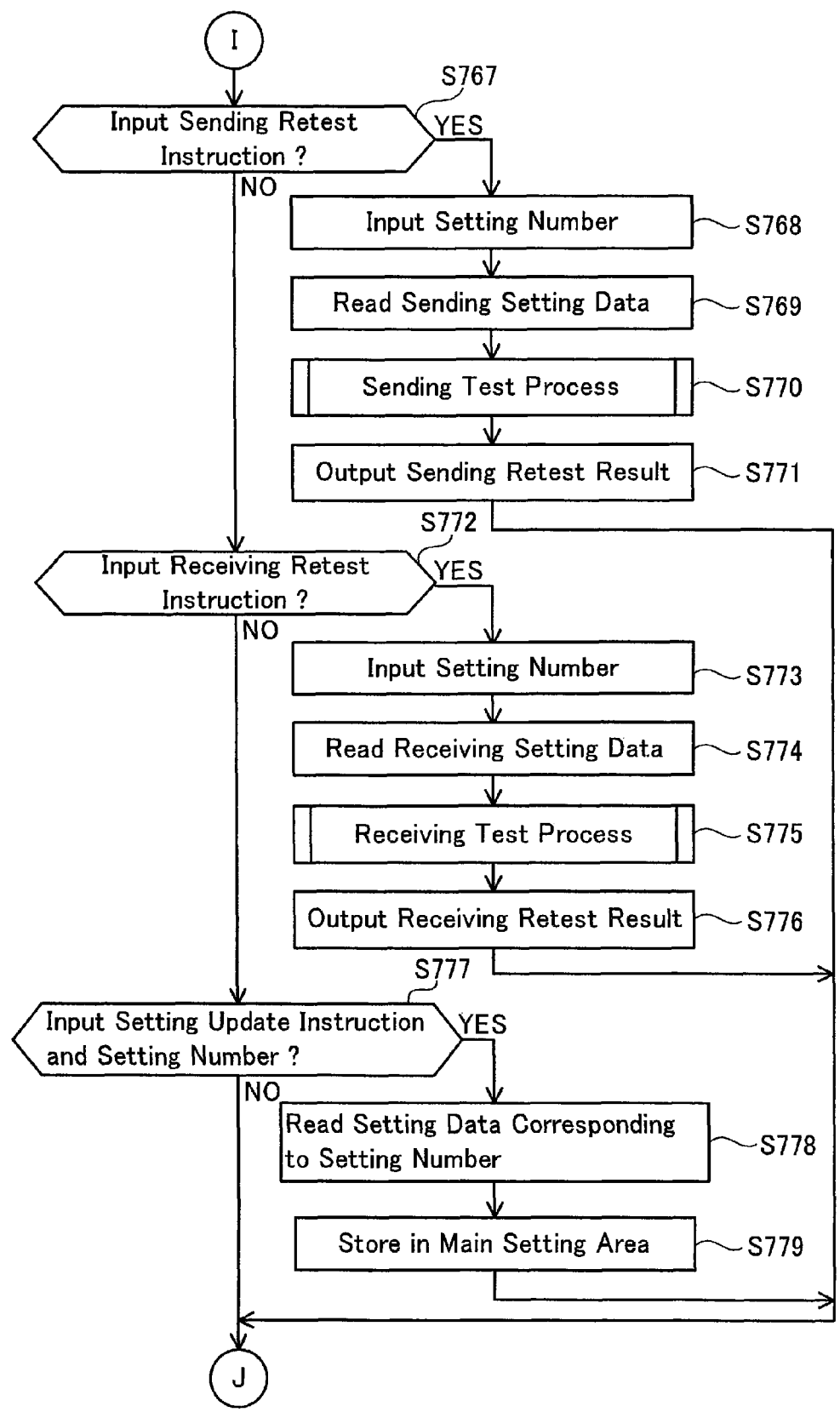
FIG. 25 shows a flow chart of a main process of the multi-function device.

In the present embodiment, the contents of the main process of the multi-function device 50 differ from those of the first embodiment. In particular, the contents of the process after S66 (the process of FIG. 8) differ from those of the first embodiment. FIG. 25 shows a flow chart of the main process of the multi-function device after S66. S767 to S771 have substantially the same contents as S67 to S71 of FIG. 8. However, in the present embodiment, instead of executing the process of inputting the sending setting data (S68), the setting number corresponding to the sending setting data selected by the user is input (S768). Further, instead of executing the process of storing the sending setting data in the sub setting data storage area 56*b* (S69), a process is executed of reading the sending setting data corresponding to the setting number input in S768 from the sub setting data storage area 56*b* (S769). The sending setting data read in S769 is utilized in the sending test process of S770. Although S772 to S776 differ from S767 to S771 in being a process for the receiving retest, the contents of the process are substantially the same as S767 to S771. Therefore, a description of S772 to S776 is omitted. The multi-function device 50 monitors whether the setting number of the sending setting data or the receiving setting data and the setting update instruction have been input (S777). In the case where S777 is YES, the multi-function device 50 reads the sending setting data or the receiving setting data corresponding to the input setting number from the sub setting data storage area 56*b* (S778). Next, the multi-function device 50 causes the sending setting data or the receiving setting data that was read in S778 to be stored in the main setting data storage area 56*a* (S779). The sending setting data or the receiving setting data of the main setting data storage area 56*a* is thus updated.

Eighth Embodiment

The sub setting data storage area 56*b* of the multi-function device 50 cumulatively stores a plurality of patterns of the communication setting data that have undergone testing. Further, in the present embodiment, the retest instruction is input directly to the multi-function device 50 by the user operating the operation device 60 (see FIG. 2) of the multi-function device 50.

(Main Process of the Multi-Function Device)

Figure 26:
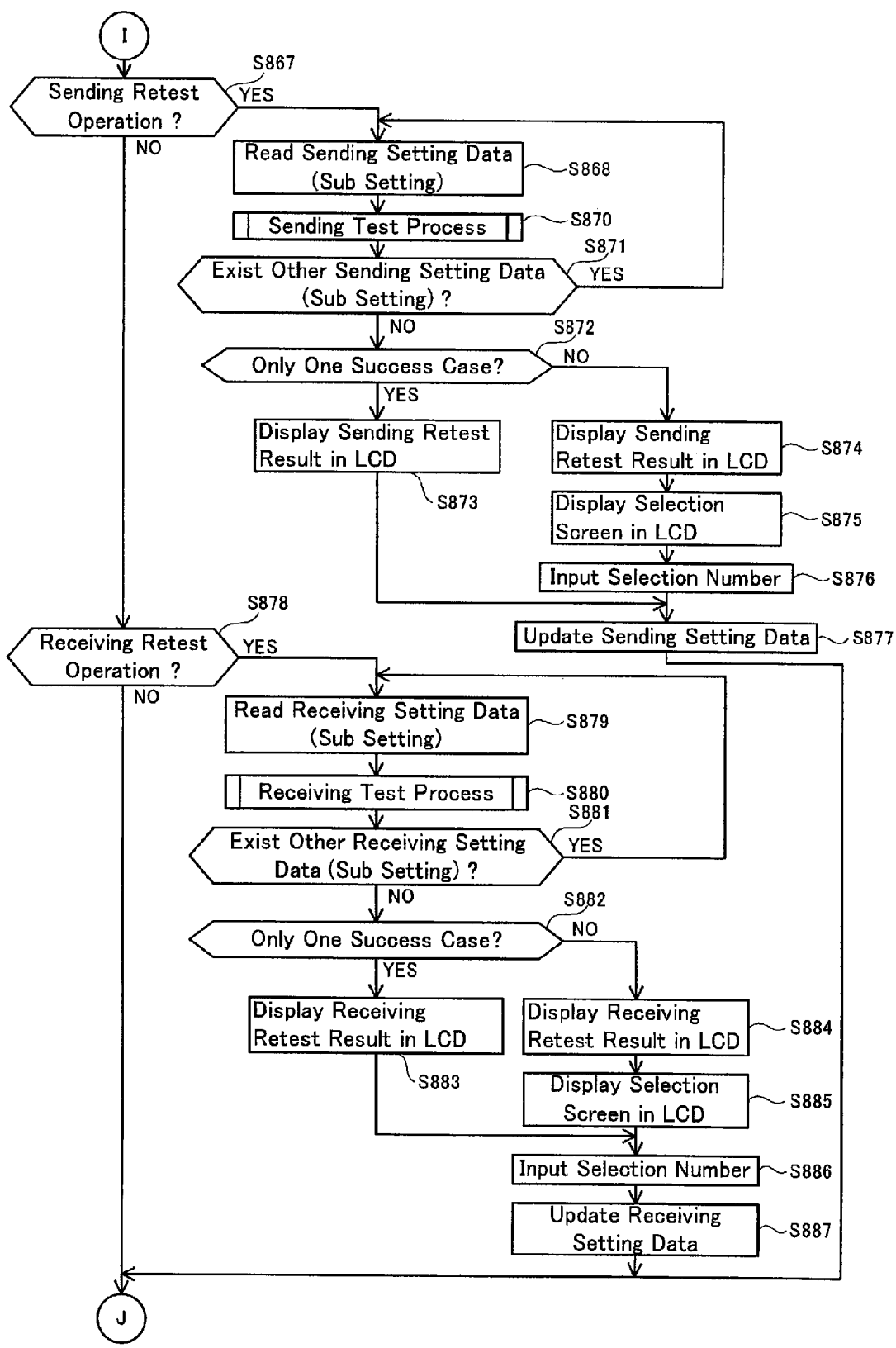
FIG. 26 shows a flow chart of a main process of the multi-function device (eighth embodiment).

In the present embodiment, the contents of the main process of the multi-function device 50 differ from those of the first embodiment. In particular, the contents of the process after S66 (the process of FIG. 8) differ from those of the first embodiment. FIG. 26 shows a flow chart of the main process of the multi-function device after S66. When the operation commanding the sending retest has been executed (in the case where S867 is YES), the process proceeds to S868. S868 and S870 are the same as S468 and S470 of FIG. 19. The multi-function device 50 determines whether sending setting data that was not read in S868 is being stored in the sub setting data storage area 56*b* (S871). In the case where S871 is YES, the process returns to S868 and sending setting data that has not yet been read is now read. In the case where S871 is NO, this means that the sending retest has been executed for all the sending setting data being stored in the sub setting data storage area 56*b*. In the case where S871 is NO, the multi-function device 50 determines whether the sending setting data having the sending retest result "Success in Sending" was only one pattern of the sending setting data (S872). In the case where S872 is YES, the sending retest result is displayed (S873) in the display 58 (see FIG. 2). Next, S877 is executed. In S877, the contents stored in the main setting data storage area 56*a* are updated to the one pattern of the sending setting data having the good sending retest result.

Figure 27:
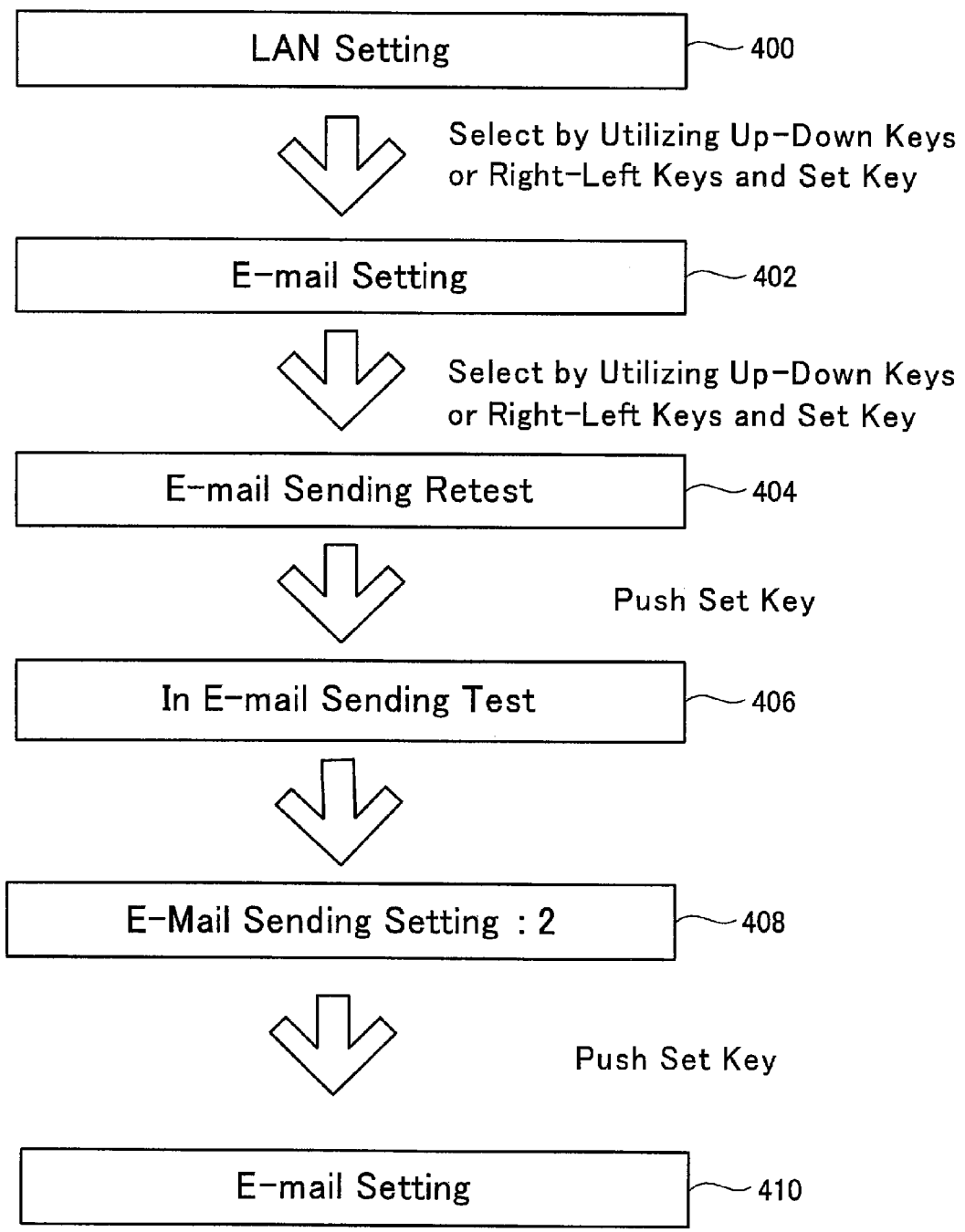
FIG. 27 shows change between display screens of the multi-function device.

FIG. 27 shows how the display contents change of the display 58. "LAN Setting" (reference number 400), "E-mail Setting" (reference number 402), "E-mail Sending Retest" (reference number 404), and "In E-mail Sending Test" (reference number 406) are displayed in sequence. As described above, in the case where there was only one pattern of the sending setting data having a good sending retest result (the case where S872 is YES), the sending setting data in the main setting data storage area 56*a* is updated (S877). In this case, the reference number 408 is displayed. In the example in FIG. 27, "E-mail Sending Setting: 2" is displayed. This means that the sending retest result was good only for the sending setting data having the setting number "2", and that this sending setting data has been stored in the main setting data storage area 56*a*. If the set key is operated while the reference number 408 is being displayed, the display screen "E-mail Setting" (reference number 410) is returned to.

In the case where S872 of FIG. 26 is NO, the multi-function device 50 displays (S874) the sending retest result on the display 58 (see FIG. 2). In the case where there are two or more patterns of the sending setting data having a good sending retest result, a selection screen is displayed on the display 58 (S875). The user can select one out of the two or more patterns of sending setting data having a good sending retest result. The multi-function device 50 inputs the selected setting number (S876). The multi-function device 50 updates the contents stored in the main setting data storage area 56*a* to the sending setting data corresponding to the selected setting number (S877). Moreover, in the case where there was no sending setting data having a good sending retest result, NO is determined in S872. In this case, S875 to S877 are skipped.

Figure 28:
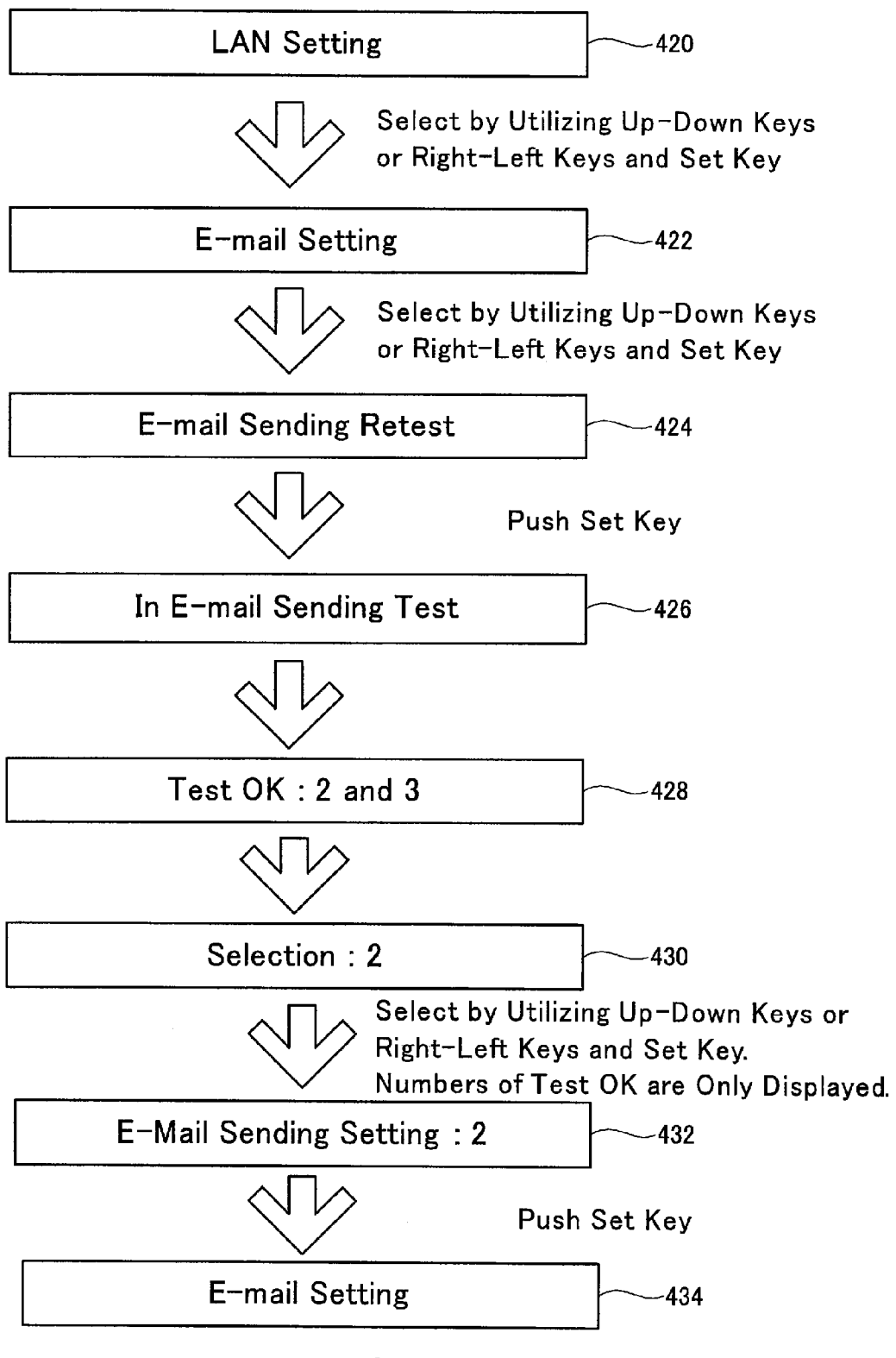
FIG. 28 shows change between display screens of the multi-function device.

FIG. 28 shows how the display screens change of the display 58. The reference numbers 420 to 426 are the same as the reference numbers 400 to 406 of FIG. 27. In the case where there are two or more patterns of the sending setting data having a good sending retest result (in the case where S872 is NO), the reference number 428 is displayed. In the example in FIG. 28, "E-mail Sending Test OK: 2 and 3" is displayed. Next, the selection screen of reference number 430 is displayed (S876). Next, the fact is displayed (reference number 432) that the contents stored in the main setting data storage area 56*a* have been updated to the selected sending setting data in S877. If the set key is operated while the screen of reference number 432 is being displayed, the "E-mail Setting" display screen (reference number 434) is returned to.

Although S878 to S887 of FIG. 26 differ from S867 to S877 in being a process for the receiving retest, the contents of the process are substantially the same as S867 to S877. Therefore, a description of S878 to S887 is omitted.

Ninth Embodiment

The sub setting data storage area 56*b* of the multi-function device 50 cumulatively stores a plurality of patterns of the communication setting data that have undergone testing. Further, in the present embodiment, the retest instruction is input directly to the multi-function device 50 by the user operating the operation device 60 (see FIG. 2) of the multi-function device 50. The user can select one pattern of the communication setting data to be retested. When the retest instruction is input to the multi-function device 50, the multi-function device 50 executes the retest of the selected communication setting data.

(Main Process of the Multi-Function Device)

Figure 29:
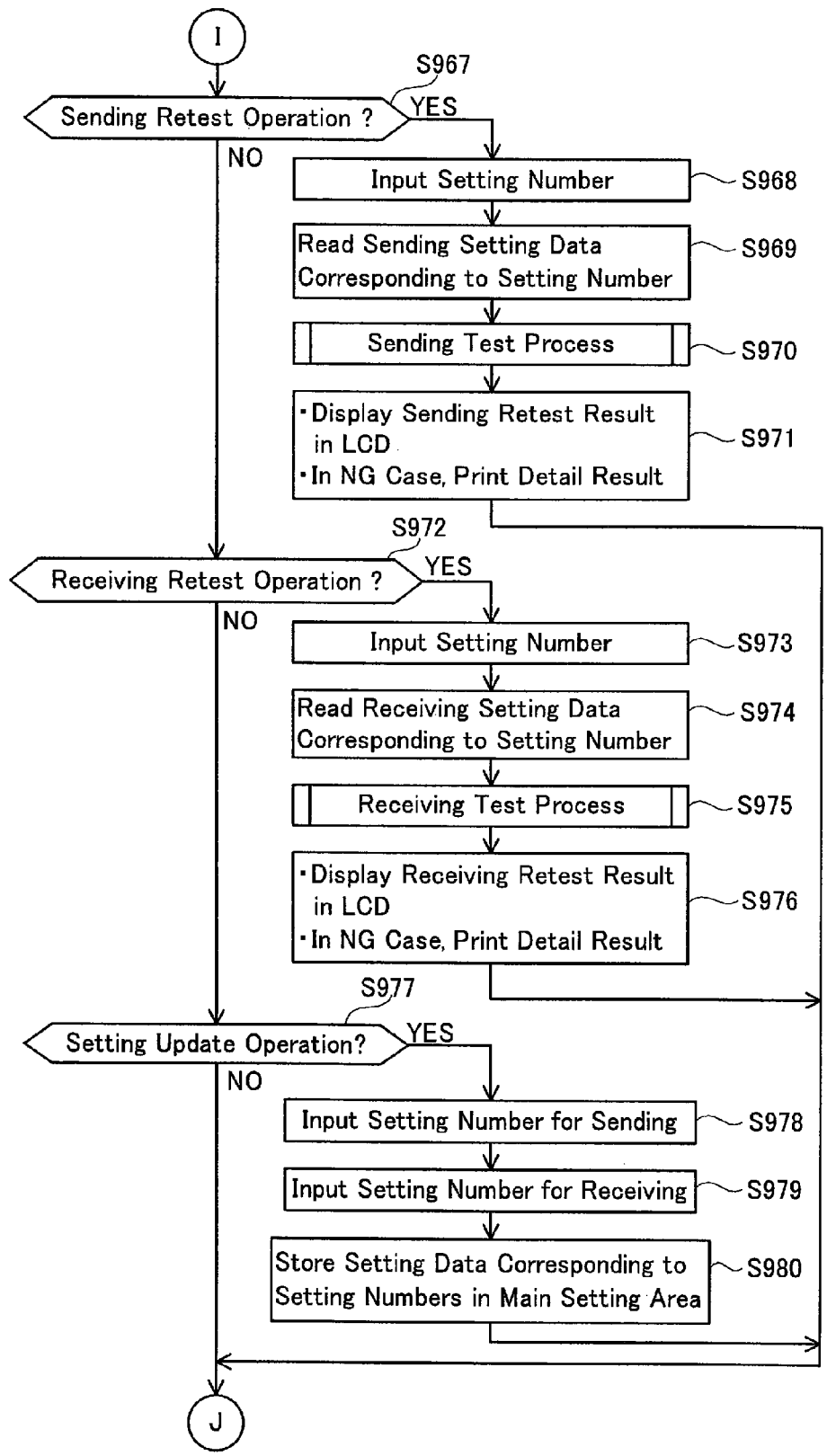
FIG. 29 shows a flow chart of a main process of the multi-function device (ninth embodiment).

In the present embodiment, the contents of the main process of the multi-function device 50 differ from those of the first embodiment. In particular, the contents of the process after S66 (the process of FIG. 8) differ from those of the first embodiment. FIG. 29 shows a flow chart of the main process of the multi-function device after S66. When the operation commanding the sending retest has been executed (in the case where S967 is YES), the process proceeds to S968. The multi-function device 50 inputs the setting number that was selected by the user (S968). Next, the multi-function device 50 reads (S969) the sending setting data corresponding to the setting number that was input in S968. In S970, the sending retest process is executed utilizing the sending setting data that was read in S969. The multi-function device 50 displays (S971) the sending retest result on the display 58 (see FIG. 2). In the case where the sending retest result is not good, the sending retest result (the reason for failure) is printed by the printing device 62.

Figure 30:
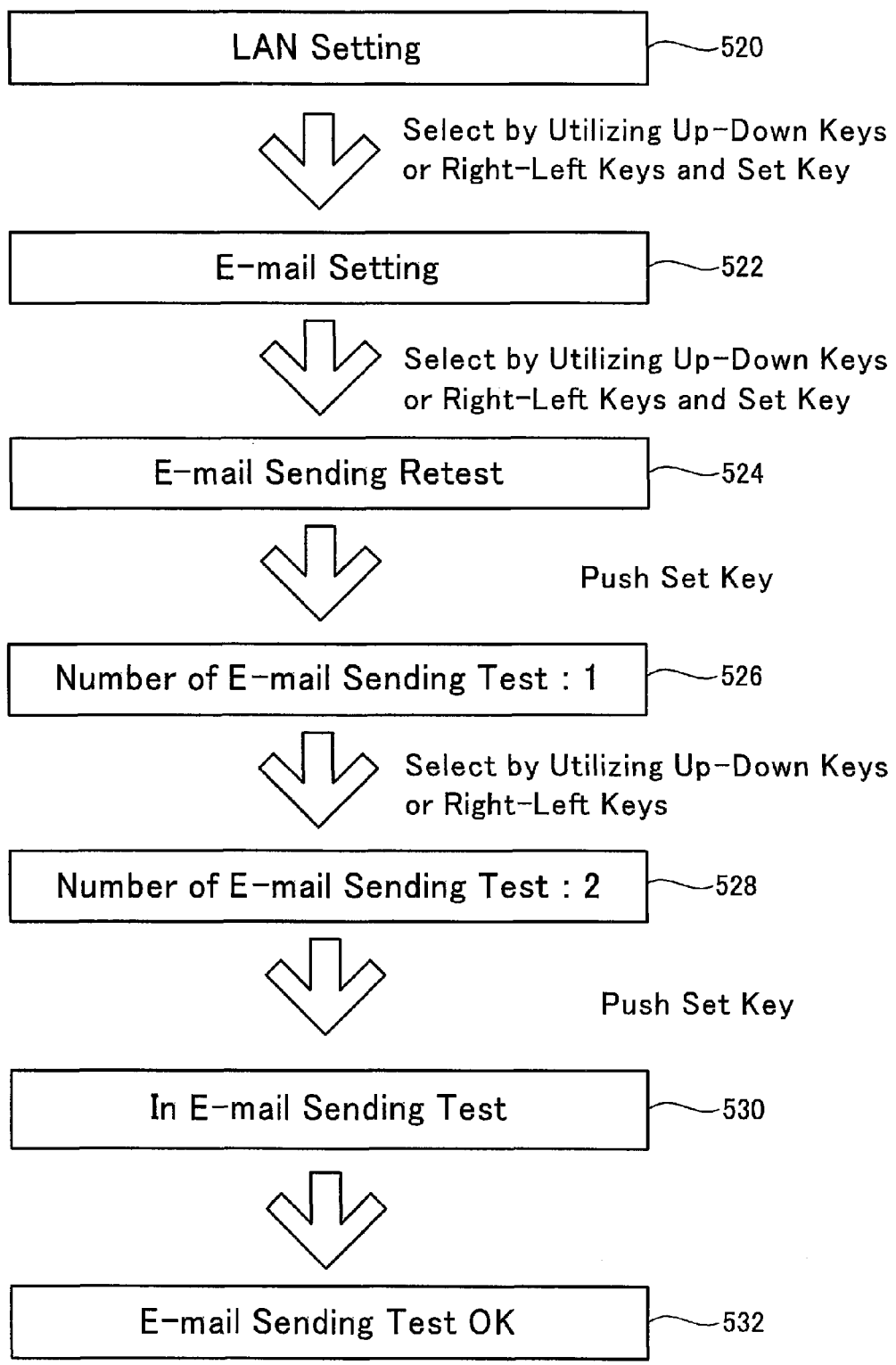
FIG. 30 shows change between display screens of the multi-function device.

FIG. 30 shows how the display screens change of the display 58. The reference numbers 520 to 524 are the same as the reference numbers 400 to 404 of FIG. 27. If the set key is operated while the screen of reference number 524 is being displayed, the screen for selecting the sending setting data to undergo the sending retest is displayed (reference numbers 526 and 528). When the sending setting data is selected and input utilizing the set key (in the case where S967 is YES), the screen of reference number 530 is displayed. The fact that the sending retest result was good is displayed in the screen of reference number 532.

Although S972 to S976 of FIG. 29 differ from S967 to S971 in being a process for the receiving retest, the contents of the process are substantially the same as S967 to S971. Therefore, a description of S972 to S976 is omitted. The user can command the contents stored in the main setting data storage area 56a to be updated by operating the operation device 60 of the multi-function device 50. The multi-function device 50 monitors whether the setting update operation has been executed by the user (S977). In the case where S977 is YES, the multi-function device 50 inputs the setting number of the sending setting data selected by the user from among the plurality of patterns of the sending setting data being stored in the sub setting data storage area 56b (S978). Next, the multi-function device 50 inputs the setting number of the receiving setting data selected by the user from among the plurality of patterns of the receiving setting data being stored in the sub setting data storage area 56b to be stored in the main setting data storage area 56a (S979). The multi-function device 50 updates the contents stored in the main setting data storage area 56a to the sending setting data and receiving setting data corresponding to the setting numbers input in S978 and S979.

Figure 31:
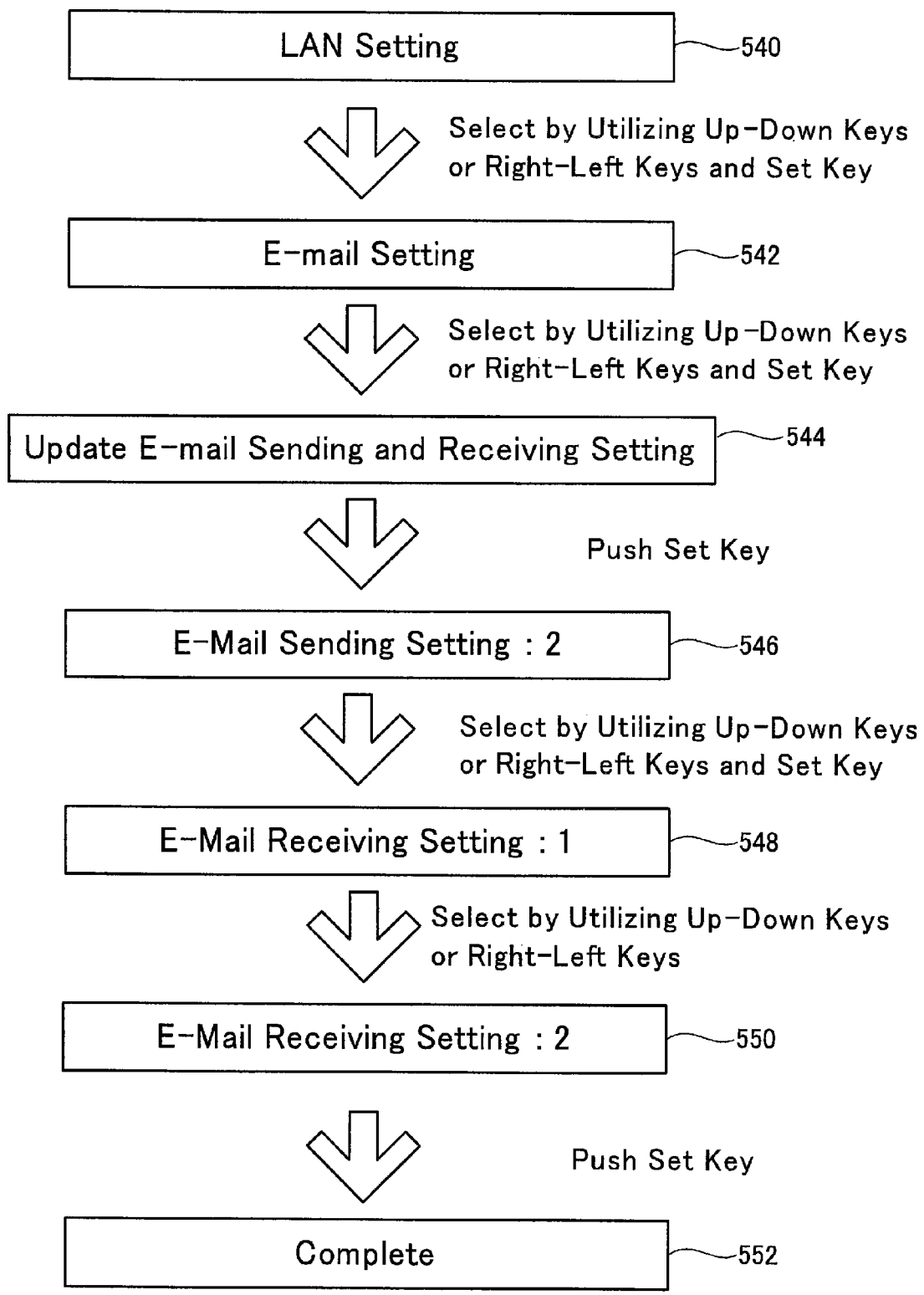
FIG. 31 shows change between display screens of the multi-function device.

FIG. 31 shows how the display screens change of the display 58. The reference numbers 540 to 542 are the same as the reference numbers 400 to 402 of FIG. 27. When the operation device 60 (see FIG. 2) is further operated while the screen of reference number 542 is being displayed, "Update E-mail Sending Setting" is displayed (reference number 544). When the set key is operated while this screen is being displayed, a screen for selecting the setting number of the sending setting data is displayed (reference number 546). When the setting number of the sending setting data is selected and the set key is operated, the screen for selecting the setting number of the receiving setting data is displayed (reference numbers 548 and 550). When the setting number of the receiving setting data is selected and the set key is operated, the process of S978 to S980 is executed, and the screen of reference number 522 is displayed.

Tenth Embodiment

Figure 32:
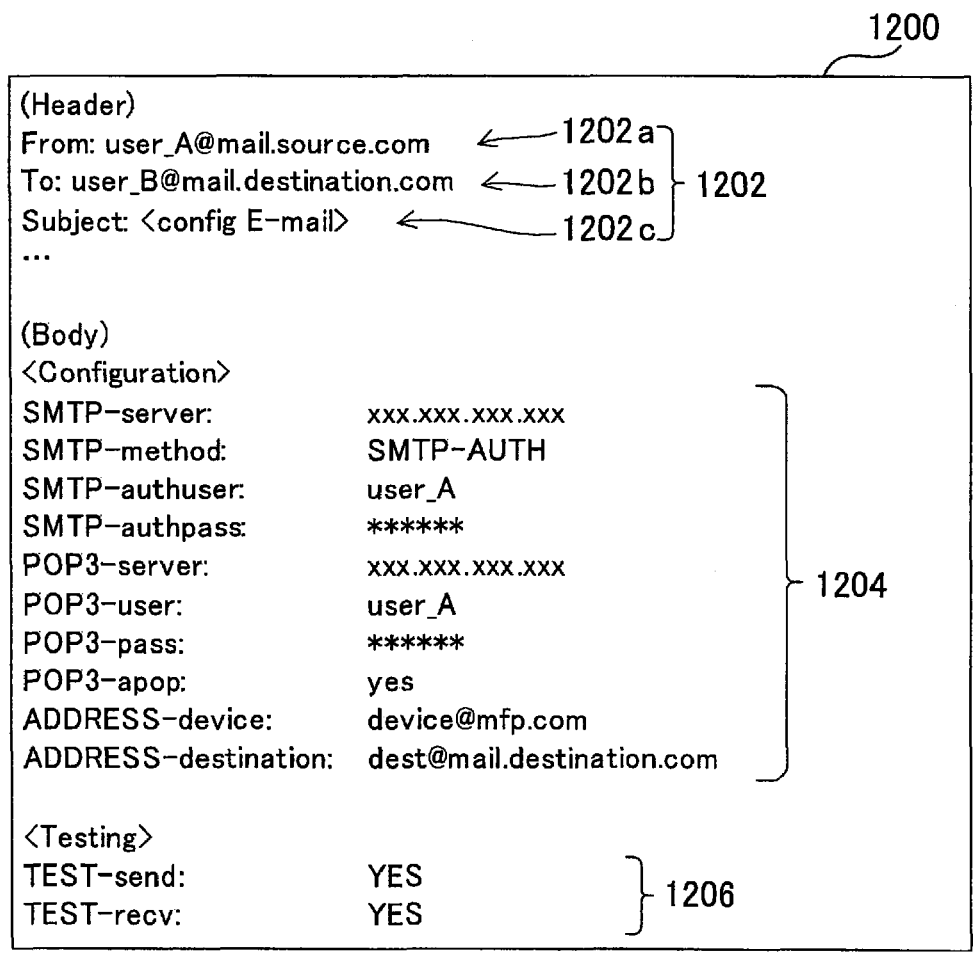
FIG. 32 shows communication setting data described in e-mail (tenth embodiment).

In the first embodiment, the communication setting data is sent from the terminal device 70 to the multi-function device 50 utilizing the LAN communication line 92a (see FIG. 2). In the present embodiment, the communication setting data is sent from the terminal device 70 to the multi-function device 50 via the internet 90. That is, the terminal device 70 is capable of sending the communication setting data by e-mail. The user of the terminal device 70 can create communication setting data utilizing software for sending and receiving e-mail. FIG. 32 shows an example of communication setting data input in an e-mail. An e-mail 1200 has a header region 1202, a body region 1204, and a test setting region 1206. The header region 1202 includes a mail address 1202a of the terminal device 70, a mail address 1202b of the multi-function device 50, and a subject name 1202c. The body region 1204 includes communication setting data (sending setting data and receiving setting data). The sending setting data includes data specifying the SMTP server 82 (xxx. xxx. xxx. xxx), data specifying the authentication method of the SMTP server 82 (SMTP-AUTH), a user name (user_A), and a password (****). The user name and the password are input in the case where the SMTP-AUTH authentication method has been selected. The receiving setting data includes data specifying the POP3 server 80 (xxx. xxx. xxx. xxx), a user name (user_A), a password (****), and data specifying the authentication method of the POP3 server 80. "ADDRESS-device" in the body region 1204 is the mail address of the multi-function device 50. "ADDRESS-destination" in the body region 1204 is the mail address of a destination of a test mail. These mail addresses are also included in the sending setting data. The test setting region 1206 includes data showing whether the receiving test is to be executed (YES), and whether the sending test is to be executed (YES).

(E-Mail Receiving Process of the Multi-Function Device)

Figure 33:
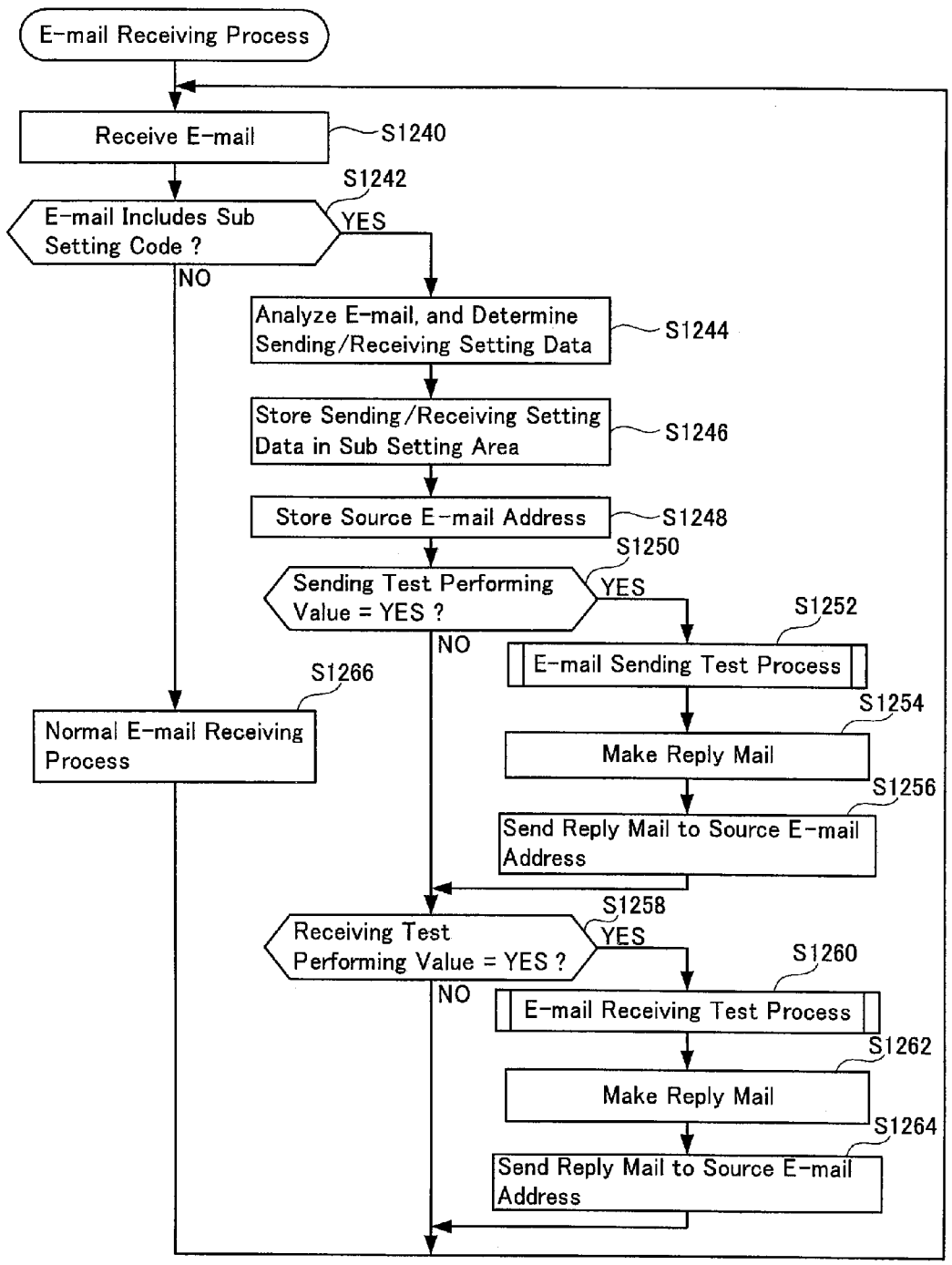
FIG. 33 shows a flow chart of a mail receiving process.

The contents of an e-mail receiving process executed by the multi-function device 50 of the present embodiment will be described. The e-mail receiving process of the first embodiment is shown in S53 of FIG. 7. FIG. 33 shows a flow chart of the e-mail receiving process of the present embodiment. The multi-function device 50 receives an e-mail (S1240). S1240 is executed utilizing the receiving setting data stored in the main setting data storage area 56a (see FIG. 2). The multi-function device 50 determines whether the e-mail that has been received includes the sub setting code (S1242). This step is determined as YES in the case where "Config E-mail" is included in the subject name 1202c of the header region 1202 of FIG. 32. In the case where this is YES, the multi-function device 50 executes the process of S1244. In the case where this is NO, the multi-function device 50 executes the normal e-mail receiving process (S1266). That is, the multi-function device 50 utilizes the printing device 62 (see FIG. 2) to print the contents of the e-mail.

In the case where S1242 is YES, the multi-function device 50 analyzes the contents of the e-mail (S1244). The sending setting data and the receiving setting data are specified from these contents. Next, the multi-function device 50 stores (S1246) the sending setting data and the receiving setting data in the sub setting data storage area 56b (see FIG. 2). The multi-function device 50 stores (S1248) the mail address of the destination of the e-mail (the mail address of the terminal device 70). This mail address is stored in the temporary storage area 56c. The multi-function device 50 determines whether the sending test performing value is YES (S1250). This step is determined as YES in the case where "YES" was input for "TEST-send" in the test setting region 1206 of FIG. 32. NO is determined is S1250 in the case where "NO" was input for "TEST-send" in the test setting region 1206. In the case where S1250 is YES, the multi-function device 50 executes the e-mail sending test process (S1252). This sending test process is the same as the process of S57 of FIG. 7. The multi-function device 50 creates a reply mail in which the sending test result is in the body of the mail (S1254). FIG. 34 shows an example of a reply mail 1210 created in S1254. Next, the multi-function device 50 sends the reply mail created in S1254 to the source mail address. That is, the multi-function device 50 sends the reply mail to the terminal device 70 (S1256). The source mail address is stored in the temporary storage area 56c in S1248. The process of S1256 is executed utilizing the sending setting data stored in the main setting data storage area 56a.

In the case where S1250 is NO, or in the case where S1256 has ended, the multi-function device 50 determines whether the receiving test performing value is YES (S1258). This step is determined as YES in the case where "YES" was input for "TEST-recv" in the test region 1206 of FIG. 32. S1258 is determined as NO in the case where "NO" was input for "TEST-recv" in the test region 1206. In the case where S1258 is YES, the multi-function device 50 executes the e-mail receiving test process (S1260). This receiving test process is the same as the process of S62 of FIG. 7. The multi-function device 50 creates a reply mail in which the receiving test result is in the body of the mail (S1262). FIG. 35 shows an example of a reply mail 1212 created in S1262. Next, the multi-function device 50 sends (S1264) the reply mail created in S1262 to the source mail address (the mail address of the terminal device 70). The process of S1264 is executed utilizing the sending setting data stored in the main setting data storage area 56a.

According to the present embodiment, the user of the terminal device 70 can utilize e-mail to send the communication setting data to the multi-function device 50. The communication setting data can be sent from the terminal device 70 even when the multi-function device 50 and the terminal device 70 are not connected by the LAN communication line 92a.

Eleventh Embodiment

Figure 36:
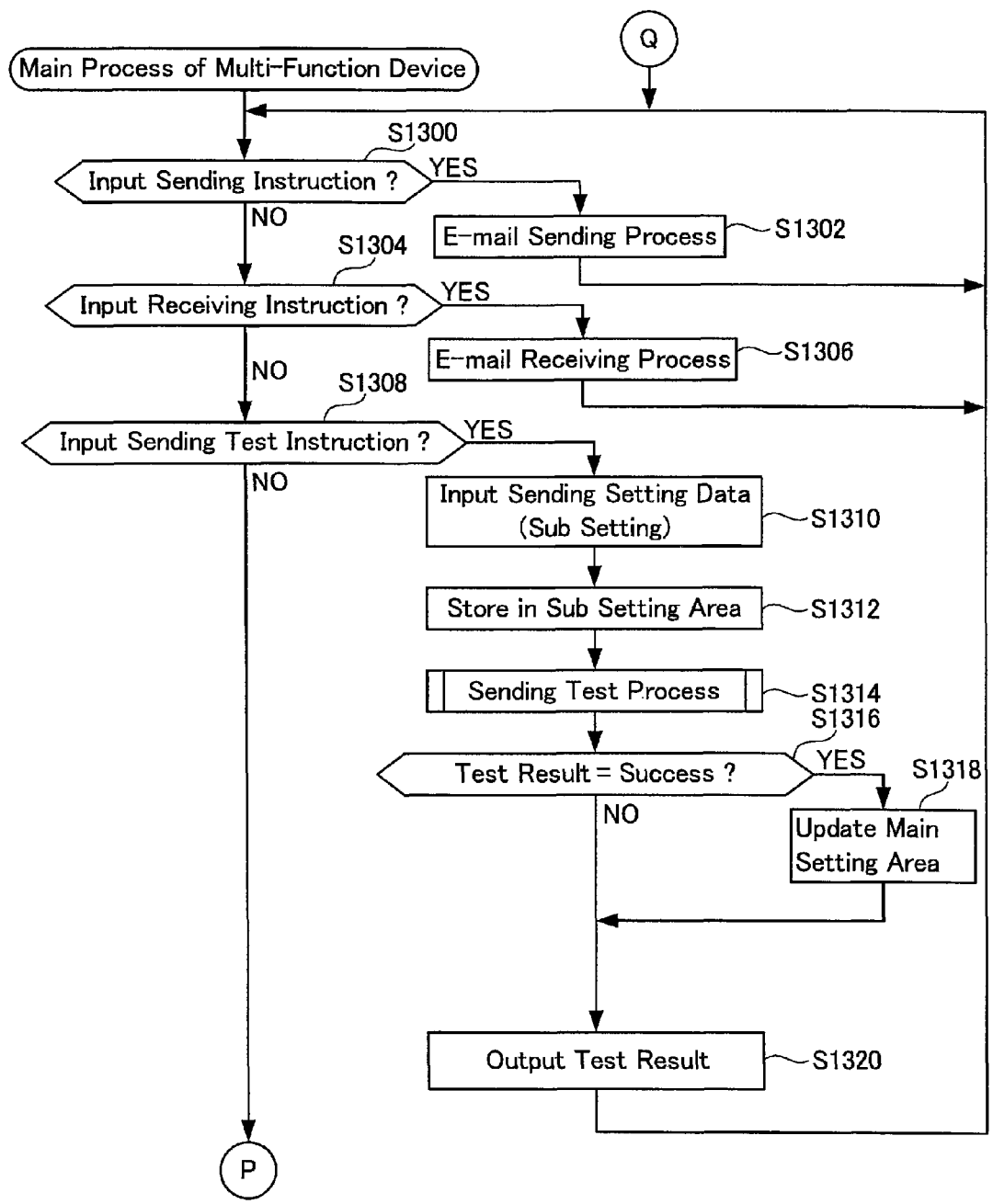
FIG. 36 shows a flow chart of a main process of the multi-function device (eleventh embodiment).
Figure 37:
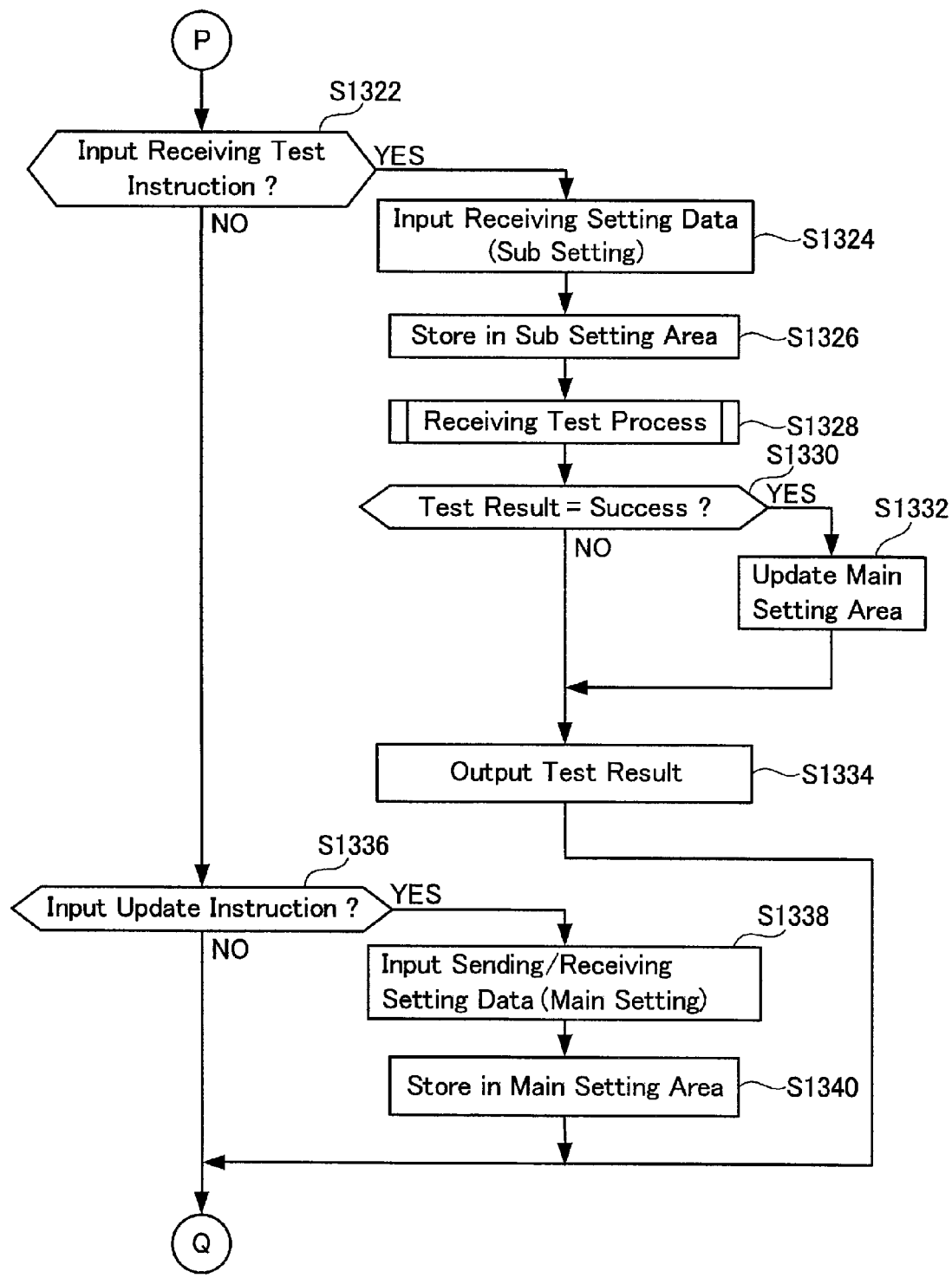
FIG. 37 shows the flow chart of the main process of the multi-function device (continued from FIG. 36).

In the present embodiment, the contents of the main process executed by the multi-function device 50 differ from those of the first embodiment. FIG. 36 and FIG. 37 show a flow chart of the main process of the multi-function device of the present embodiment. The process of S1300 to S1314 of FIG. 36 is the same as the process of S50 to S57 of FIG. 7. Therefore, a description of S1300 to S1314 is omitted. When the sending test process (S1314) ends, the multi-function device 50 determines whether the sending test result is "Success in Sending" (S1316). In the case where S1316 is YES, the multi-function device 50 shifts the sending setting data being stored in the sub setting data storage area 56b (see FIG. 2) to the main setting data storage area 56a (S1318). The contents stored in the main setting data storage area 56a are thus updated to the sending setting data that was successful in the sending test. In the case where S1316 is NO, the process proceeds to S1320. In the case where S1318 has ended, also, the process proceeds to S1320. S1320 is the same as the process S58 of FIG. 7.

FIG. 37 shows a continuation of the flow chart of FIG. 36. The process of S1322 to S1328 of FIG. 37 is the same as the process of S59 to S62 of FIG. 7. Therefore, a description of S1322 to S1328 is omitted. When the receiving test process S1328 ends, the multi-function device 50 determines whether the receiving test result is "Success" (S1330). In the case where S1330 is YES, the multi-function device 50 shifts the receiving setting data being stored in the sub setting data storage area 56b (see FIG. 2) to the main setting data storage area 56a (S1332). The contents stored in the main setting data storage area 56a are thus updated to the receiving setting data that was successful in the receiving test. In the case where S1330 is NO, the process proceeds to S1334. In the case where S1332 has ended, also, the process proceeds to S1334.

The process of S1334 is the same as the process of S63 of FIG. 7. The process of S1336 to S1340 of FIG. 37 is the same as the process of S64 to S66 of FIG. 7. Therefore, a description of S1336 to S1340 is omitted.

According to the present embodiment, the contents stored in the main setting data storage area 56a are automatically updated to the communication setting data that was successful in the setting test or the receiving test (S1318 of FIG. 36, and S1332 of FIG. 37). The user does not need to execute the operation to store the communication setting data that was successful in the test in the main setting data storage area 56a.

Twelfth Embodiment

Figure 38:
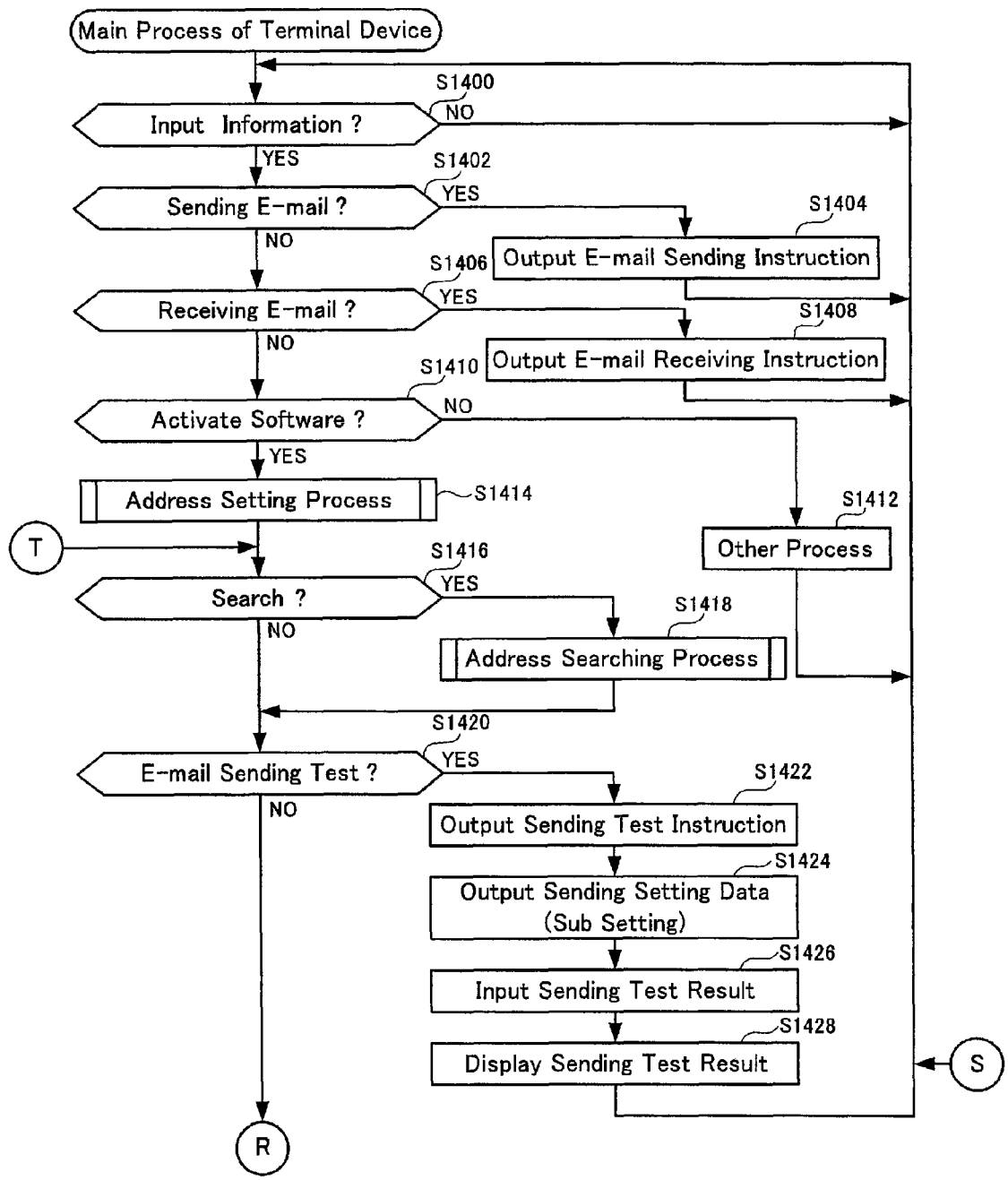
FIG. 38 shows a flow chart of a main process of the terminal device (twelfth embodiment).
Figure 39:
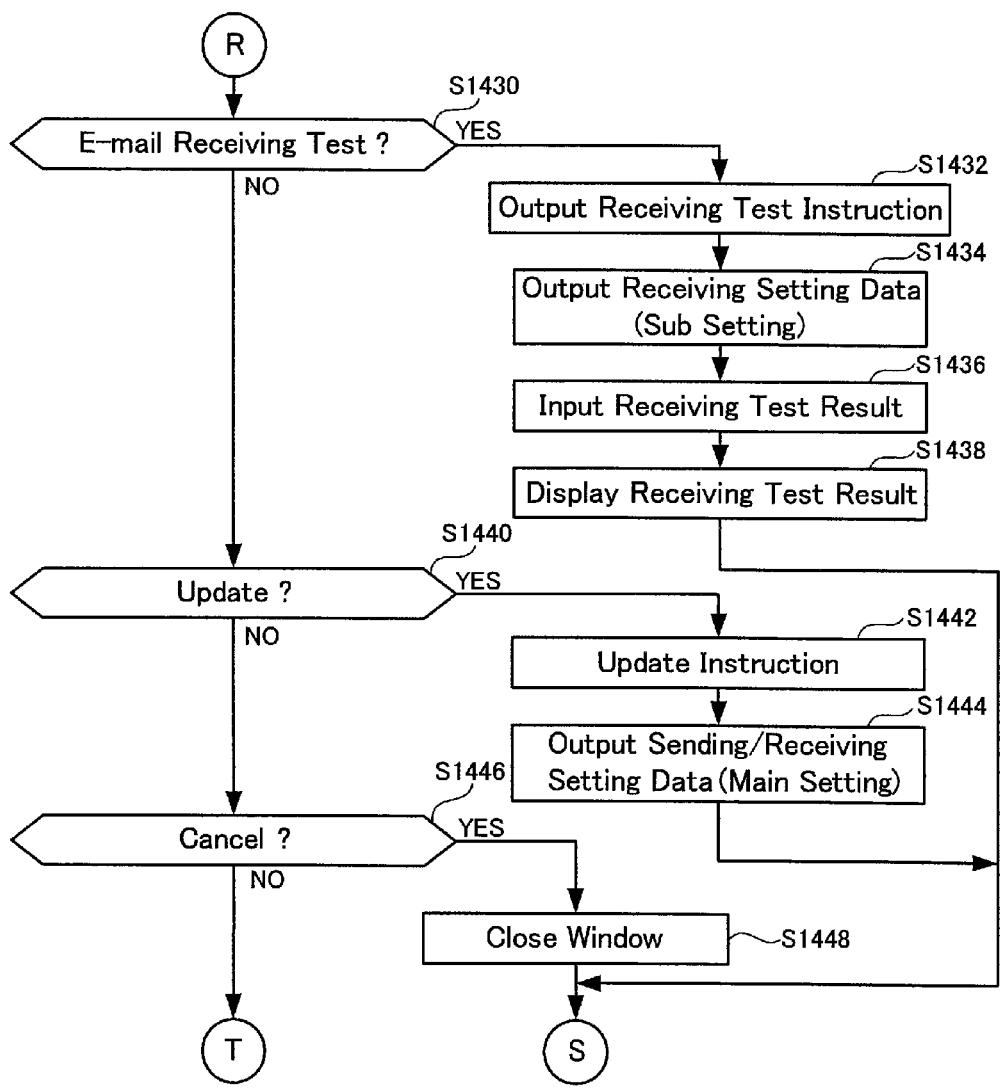
FIG. 39 shows the flow chart of the main process of the terminal device (continued from FIG. 38).
Figure 40:
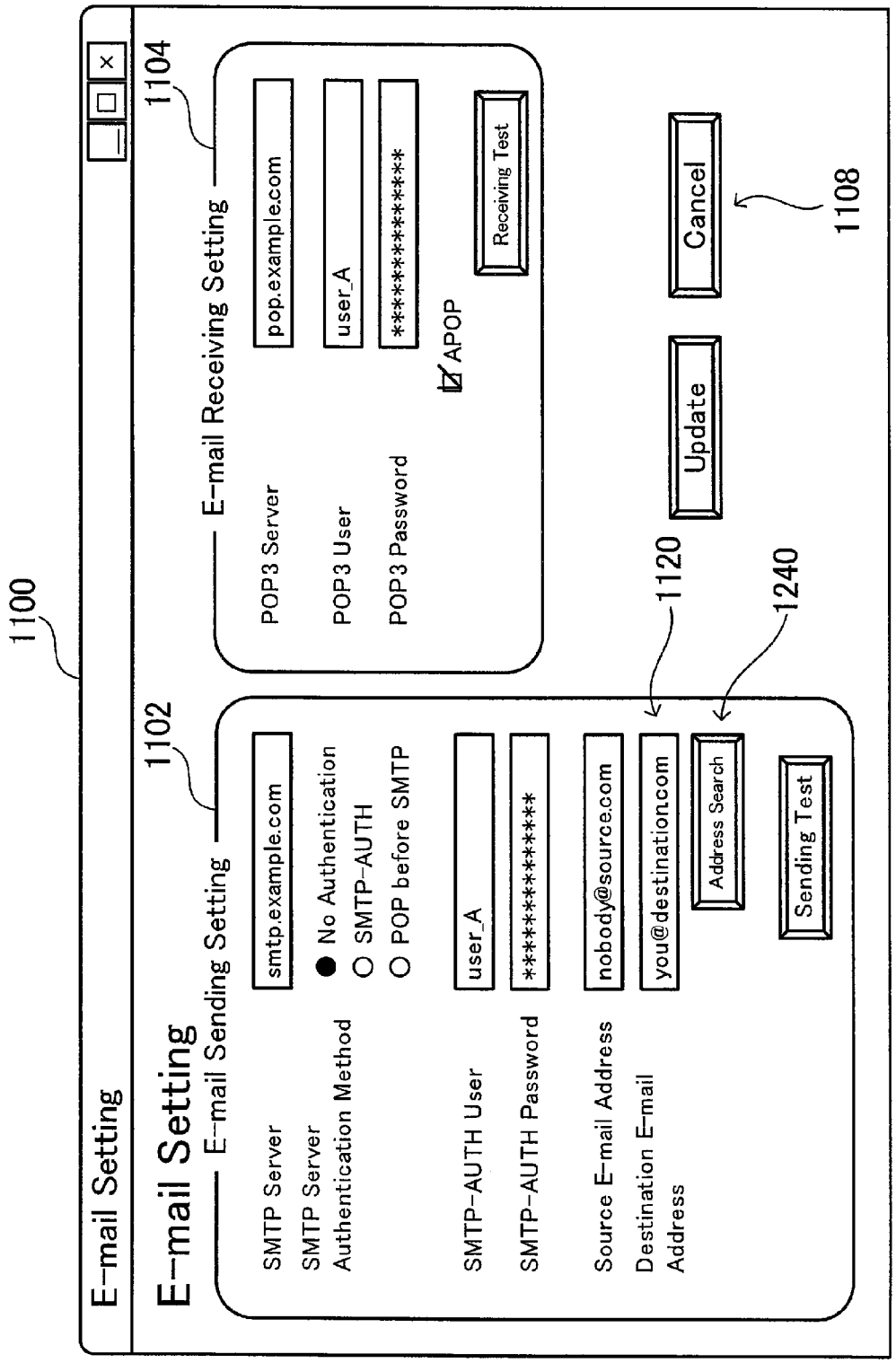
FIG. 40 shows a window for inputting communication setting data.

In the present embodiment, the mail address of an administrator of the multi-function device 50 is stored in the temporary storage area 56c (see FIG. 2) of the multi-function device 50. Further, in the present embodiment, the contents of the main process executed by the terminal device 70 differ from those of the first embodiment. FIG. 38 and FIG. 39 show a flow chart of the main process of the terminal device of the present embodiment. The process of S1400 to S1408 of FIG. 38 is the same as the process of S1 to S5 of FIG. 5. Therefore, a description of S1400 to S1408 is omitted. In the case where S1406 is NO, the terminal device 70 proceeds to S1410. In S1410, it is determined whether the information input in S1400 is a command for activating software for inputting the communication setting data. In the case where S1410 is NO, the terminal device 70 executes another process (S1412). In the case where S1410 is YES, the window 1100 of FIG. 40 is displayed on the display 74 (see FIG. 2). Next, the terminal device 70 executes an address setting process (S1414).

Figure 41:
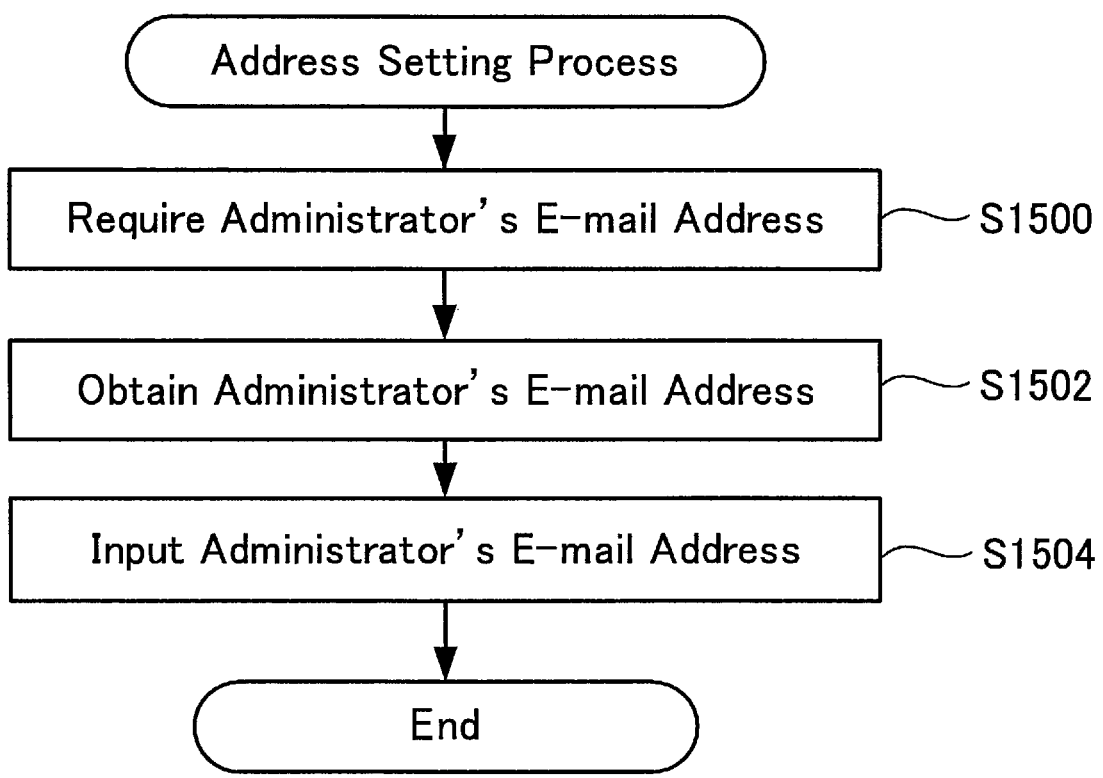
FIG. 41 shows a flow chart of an address setting process.

FIG. 41 shows a flow chart of the address setting process. The terminal device 70 outputs an instruction to the multi-function device 50 commanding that the administrator's mail address is output (S1500). When this instruction is input, the multi-function device 50 outputs the administrator's mail address that is being stored in the temporary storage area 56c. The terminal device 70 obtains the administrator's mail address (S1502). Next, the terminal device 70 inputs the administrator's mail address into the setting item 1120 of FIG. 40 (S1504).

Figure 42:
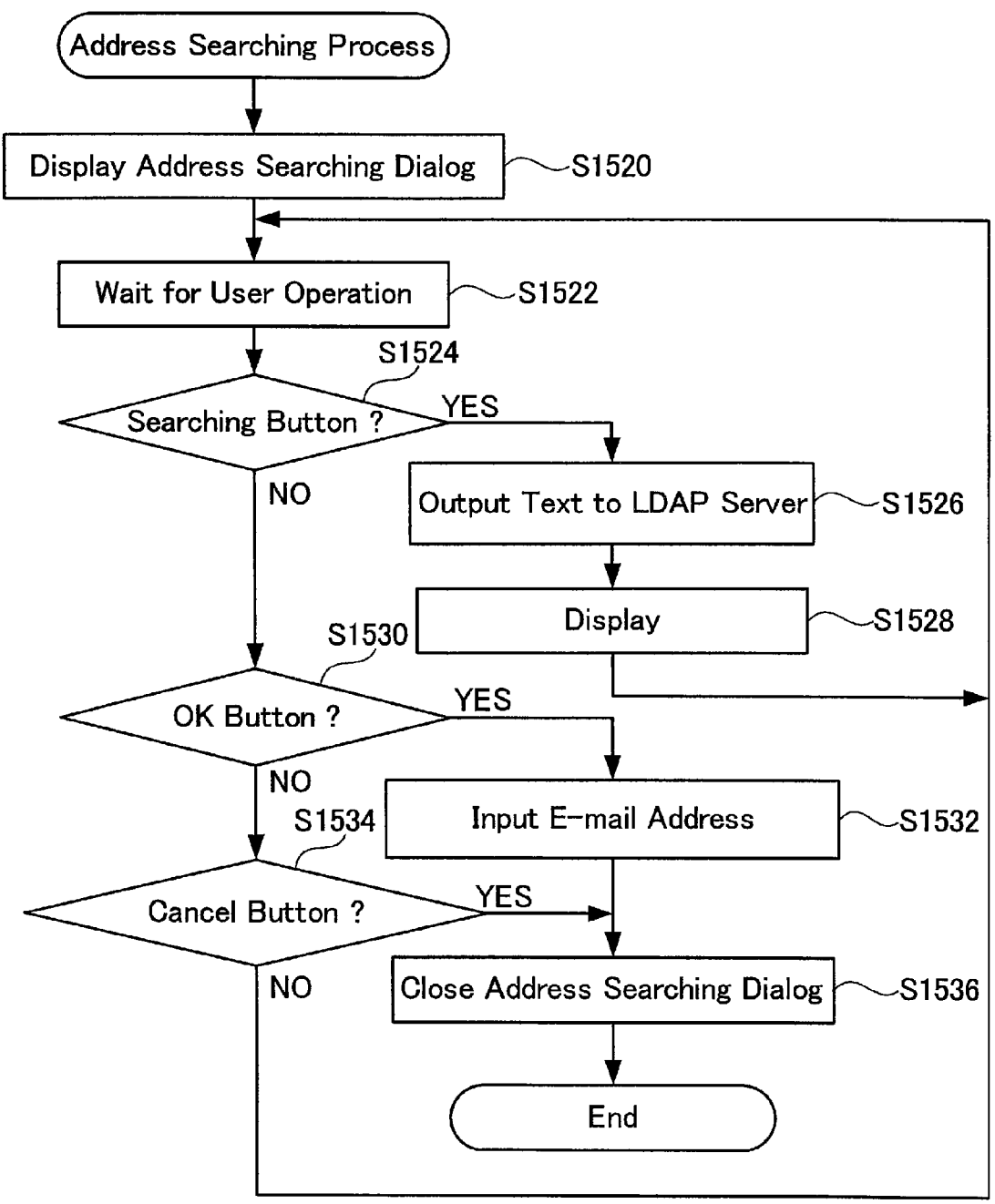
FIG. 42 shows a flow chart of an address searching process
Figure 43:
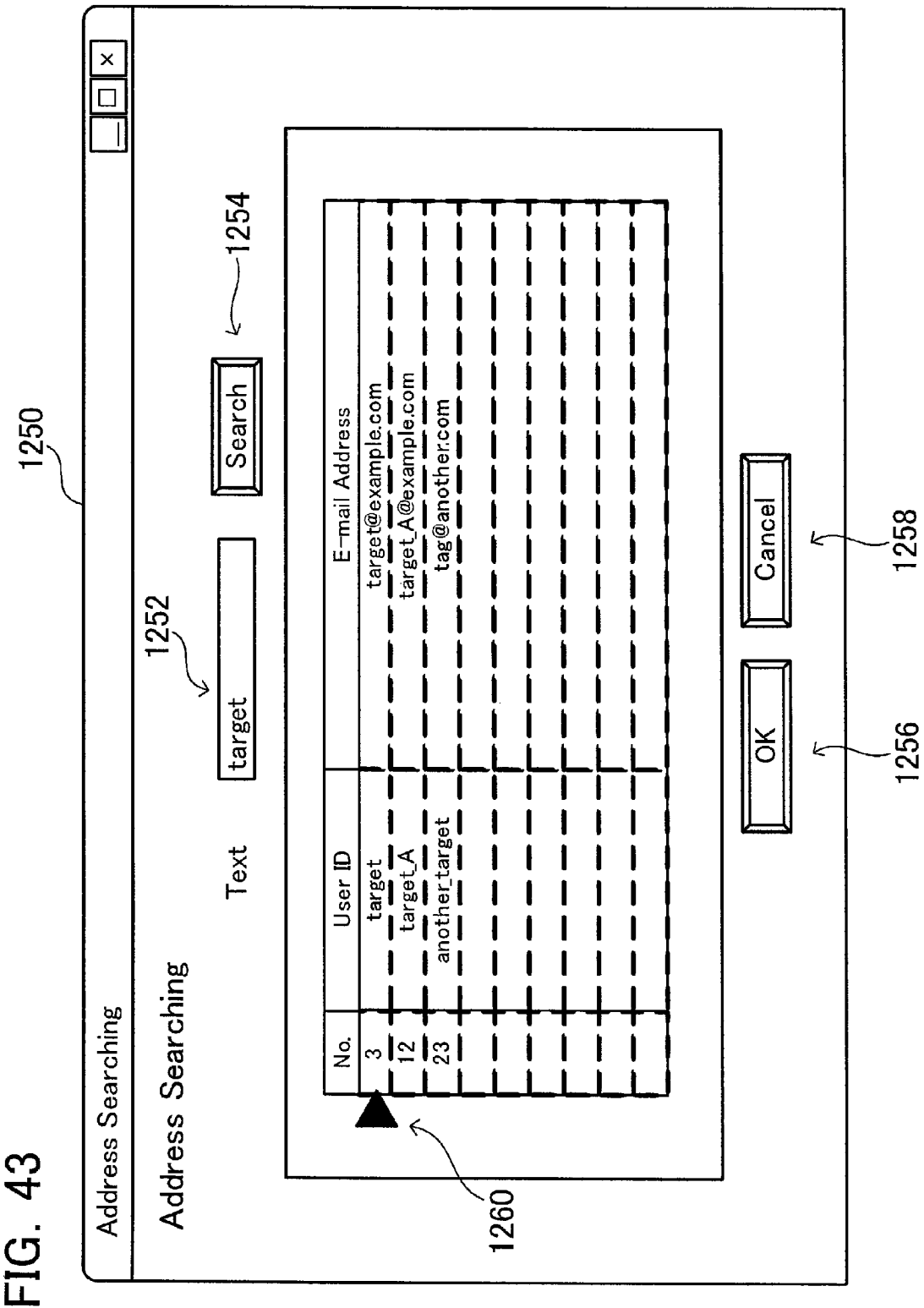
FIG. 43 shows an example of an address searching dialogue.

When the address setting process of S1414 of FIG. 38 ends, the terminal device 70 executes S1416. In S1416, it is determined whether an address searching button 1240 of FIG. 40 has been clicked on. In the case where S1416 is YES, the terminal device 70 executes an address searching process (S1418). FIG. 42 shows a flow chart of the address searching process. The terminal device 70 displays an address searching dialogue (S1520). FIG. 43 shows an example of a dialogue (window) 1250. The dialogue 1250 includes a region 1252 for inputting a search text, an address searching button 1254, an OK button 1256, a cancel button 1258, and a cursor 1260.

In S1522 of FIG. 42, the terminal device 70 waits until information has been input by the user into the dialogue 1250. The terminal device 70 determines whether the address searching button 1254 has been clicked on (S1524). In the case where S1524 is YES, the terminal device 70 accesses (S1526) the LDAP server 86 (see FIG. 2). The terminal device 70 outputs to the LDAP server 86 the text that has been input into the region 1252 of the dialogue 1250. In the example of FIG. 43, "target" is output to the LDAP server 86. The LDAP server 86 stores a multiple of combinations of user IDs and mail addresses. The LDAP server 86 specifies a user ID, among the user IDs that it is storing, conforming with the text output from the terminal device 70. For example, user ID including 'target' is specified in the example of FIG. 43. The LDAP server 86 outputs the specified user ID and the mail address combined with this user ID to the terminal device 70. The terminal device 70 displays the user ID and mail address output from the LDAP server 86 (S1528). In the example of FIG. 43, three sets of search results are shown.

The user can select one user ID from among the plurality of user IDs (mail addresses) displayed. This is executed by moving the cursor 1260 of FIG. 43. The terminal device 70 determines whether the OK button 1256 has been clicked on (S1530). In the case where S1530 is YES, the mail address selected using the cursor 1260 is input to the setting item 1120 of FIG. 40 (S1532). When S1532 ends, the process proceeds to S1536. In the case where S1530 is NO, the terminal device 70 determines whether the cancel button 1258 has been clicked on (S1534). In the case where S1534 is YES, the process proceeds to S1536. In the case where S1534 is NO, the process returns to S1522. In S1536 the dialogue window is closed. The address searching process thus ends.

When the address searching process ends, the terminal device 70 proceeds to S1420 of FIG. 38. In the case where S1416 is NO, also, the terminal device 70 proceeds to S1420. The process of S1420 to S1428 of FIG. 38 is the same as the process of S6 to S10 of FIG. 5. Therefore, a description of S1420 to S1428 is omitted. FIG. 39 shows a continuation of the flow chart of FIG. 38. The process of S1430 to S1444 of FIG. 39 is the same as the process of S11 to S18 of FIG. 5. Therefore, a description of S1430 to S1444 is omitted. In the case where the cancel button 1108 of FIG. 40 has been clicked on (in the case where S1446 is YES), the terminal device 70 closes the window 1100 of FIG. 40 (S1448).

According to the present embodiment, the terminal device 70 executes the address setting process (S1414 of FIG. 38). The mail address (the setting item 1120 of FIG. 40) of the test mail sending destination is thus input automatically. The user of the terminal device 70 does not need to input the mail address of the test mail sending destination. Further, the terminal device 70 executes the address searching process (S1418 of FIG. 38). The user can learn candidate mail addresses of the test mail sending destination by inputting text into the region 1252 of FIG. 43. The mail address is input automatically into the setting item 1120 of FIG. 40 by selecting one mail address out of these candidates. The user can thus easily set the mail address of the test mail sending destination.

Specific examples are described above in detail, but these examples are merely illustrative and place no limitation on the scope of the claims. The technology described in the embodiments also encompasses various changes and modifications to the specific examples described above.

(1) When an e-mail communication instruction (a sending instruction or a receiving instruction) is input to the multi-function device 50 of the first embodiment during the period between the communication test (the sending test or the receiving test) starting and ending, an interrupt process is executed and the e-mail communication is executed. However, the multi-function device 50 may equally well not execute the interrupt process. The multi-function device 50 can automatically execute the e-mail sending process or receiving process after the communication test has ended. That is, the multi-function device 50 can utilize the main communication setting data to continuously execute the sending process or the receiving process without the user performing an operation commanding that the correctly functioning communication setting data is utilized to execute the sending process or the receiving process.

(2) The controller for executing the e-mail communication process (S51 and S53 of FIG. 7) and the controller for executing the communication test process (S57, S62, S70, S75) may be configured separately. In this case, the two controllers can execute the communication process and the communication test process in parallel.

(3) The multi-function device 50 and the servers 80 and 82 may be connected by a LAN communication line.

(4) The technical characteristics of the multi-function device 50 can also be applied to other network devices. For example, these technical characteristics can be applied to a personal computer, a server, a telephone (including a portable telephone), etc.

In the above embodiments, the storage 56 is capable of continuously storing the communication setting data. The term "continuously storing" includes either of (1) and (2) below.

(1) The storage may, for example, continuously store the communication setting data that has been tested. In this case, when for example the user inputs an instruction to retest the communication setting data after the test has been executed a first time, the user does not need to perform the operation of re-inputting the communication setting data. Retesting can be executed easily.

(2) The manufacturers may, for example, store the communication setting data in advance in the storage. In this case, as well, this is equivalent to the storage continuously storing the communication setting data. Testing of the communication setting data can be executed without the user inputting this communication setting data.

Moreover, the term "continuously storing" does not refer only to permanent storage. For example, in the case of (1) above, the storage may continuously store the communication setting data until executing the retest, and may then erase this communication setting data that has been retested.

Furthermore, the technical elements explained in the present specification and drawings provide technical value and utility either independently or through various combinations. The present invention is not limited to the combinations described at the time the claims are filed. Further, the purpose of the example illustrated by the present specification and drawings is to satisfy multiple objectives simultaneously, and satisfying any one of those objectives gives technical value and utility to the present invention.

What is claimed is:

1. A network device comprising:
    a first storage configured to store first communication setting data for sending and receiving an electronic mail;
    a communication device configured to send and receive an electronic mail by utilizing the first communication setting data;
    an electronic mail analyzing device configured to specify, by analyzing an electronic mail received by the communication device, second communication setting data for sending and receiving an electronic mail;
    a second storage configured to store the second communication setting data specified by the electronic mail analyzing device; and
    a communication test device configured to test whether the communication device is able to successfully send and/or receive an electronic mail by utilizing the second communication setting data, while maintaining a state where it is possible for the communication device to send and
    receive an electronic mail by utilizing the first communication setting data, wherein the electronic mail received by the communication device includes first information indicating whether a sending test is to be executed, and second information indicating whether a receiving test is to be executed, the communication test device is configured to test, in a case in which the first information indicates that the sending test is to be executed, whether the communication device has the capability for successfully sending an electronic mail based on communication setting data for sending an electronic mail included in the second communication setting data, and the communication test device is configured to test, in a case in which the second information indicates that the receiving test is to the executed, whether the communication device has the capability for successfully receiving an electronic mail based on communication setting data for receiving an electronic mail included in the second communication setting data.

2. The network device as in claim 1, further comprising: an output device configured to output a test result of the communication test device.

3. The network device as in claim 2, wherein the network device is configured to connect with at least one terminal device in a communicable manner, and the output device outputs the test result of the communication test device to the terminal device.

4. The network device as in claim 1, wherein the first and second communication setting data includes data concerning a server for sending and/or receiving an electronic mail.

5. The network device as in claim 4, wherein the communication test device tests by outputting a signal to the server determined from the second communication setting data, and checking a response from the server.

6. The network device as in claim 4, wherein the second communication setting data includes a user identification and a password, and the communication test device tests by determining whether the user identification and the password included in the second communication setting data are registered in the server determined from the second communication setting data.

7. The network device as in claim 4, wherein the second communication setting data includes data concerning a user authentication method, and the communication test device tests by determining whether the user authentication method determined from the second communication setting data is identical to a user authentication method that the server determined from the second communication setting data is capable of executing.

8. The network device as in claim 4, wherein the second communication setting data includes data concerning a user authentication method, and in a case where the user authentication method determined from the second communication setting data is SMTP-AUTH, the communication test device obtains a list of SMTP-AUTH authentication mechanisms that can be executed by an electronic mail sending server determined from the second communication setting data, and tests by making the electronic mail sending server execute a user authentication with priority the authentication mechanism having the highest security level out of the authentication mechanisms included in the list.

9. The network device as in claim 4, wherein the second communication setting data includes an electronic mail address, and the communication test device tests by attempting to send an electronic mail to the electronic mail address included in the second communication setting data by utilizing an electronic mail sending server determined from the second communication setting data.

10. The network device as in claim 1, wherein the second storage is configured to continuously store the second communication setting data.

11. The network device as in claim 10, wherein the second storage is configured to continuously store the second communication setting data that has been tested by the communication test device.

12. The network device as in claim 11, further comprising:
an input device configured to input a retest instruction, wherein in a case where the retest instruction is input to the input device, the communication test device retests whether the communication device has the capability for successfully sending and/or receiving an electronic mail by utilizing the second communication setting data.

13. The network device as in claim 12, further comprising: an operation device, wherein a user is capable of inputting the retest instruction by utilizing the operation device.

14. The network device as in claim 12, wherein the network device is configured to connect with at least one terminal device in a communicable manner, and the input device inputs the retest instruction output by the terminal device.

15. The network device as in claim 11, wherein the second storage comprises a storage area for storing the second communication setting data while the communication test device is testing, and the storage area is same as a storage area for continuously storing the second communication setting data that has been tested by the communication test device.

16. The network device as in claim 10, wherein the second storage is configured to cumulatively store the second communication setting data that have been tested by the communication test device, and third communication setting data that have been tested by the communication test device.

17. The network device as in claim 16, further comprising:
an input device configured to input a retest instruction, wherein the retest instruction includes information designating at least one communication setting data from the second and third communication setting data that have been tested by the communication test device, and in a case where the retest instruction is input to the input device, the communication test device retests whether the communication device has the capability for successfully sending and/or receiving an electronic mail by utilizing the designated at least one communication setting data in the retest instruction.

18. The network device as in claim 16, further comprising:
an input device configured to input a retest instruction, wherein in a case where the retest instruction is input to the input device, the communication test device retests, for each of the second and the third communication setting data, whether the communication device has the capability for successfully sending and/or receiving an electronic mail by utilizing the communication setting data.

19. The network device as in claim 18, wherein in a case where a retest result is obtained confirming that the communication device has the capability for successfully sending and receiving an electronic mail by utilizing only the second communication setting data, the communication device stops utilizing the first communication setting data stored in the first storage, and utilizes the second communication setting data.

20. A non-transitive computer readable storage medium for a network device, the computer readable medium encoded with computer executable instructions which cause a computer mounted on the network device to perform a process comprising:

storing first communication setting data for sending and receiving an electronic mail in a first storage;

sending and receiving an electronic mail by utilizing the first communication setting data, wherein the electronic mail received includes first information indicating whether a sending test is to be executed and second information indicating whether a receiving test is to be executed;

specifying, by analyzing a specific electronic mail received by utilizing the first communication setting data, second communication setting data for communicating an electronic mail;

storing the specified second communication storing data in a second storage; and testing, in a case in which the first information indicates that the sending test is to be executed, whether it is possible to successfully send an electronic mail based on communication setting data for sending an electronic mail included in the second communication setting data;

testing, in a case in which the second information indicates that the receiving test is to be executed, whether it is possible to successfully receive an electronic mail based on communication setting data for receiving an electronic mail included in the second communication setting data; and testing whether it is possible to successfully send and/or receive an electronic mail by utilizing the second communication setting data while maintaining a state where it is possible to send and receive an electronic mail by utilizing the first communication setting data.

* * * * *